US006990489B2

(12) United States Patent
Kondo et al.

(10) Patent No.: US 6,990,489 B2
(45) Date of Patent: Jan. 24, 2006

(54) INFORMATION PROCESSING APPARATUS, SYSTEM AND METHOD, AND RECORDING MEDIUM

(75) Inventors: Tetsujiro Kondo, Tokyo (JP); Koji Ohta, Tokyo (JP)

(73) Assignee: Sony Corporation, Tokyo (JP)

( * ) Notice: Subject to any disclaimer, the term of this patent is extended or adjusted under 35 U.S.C. 154(b) by 865 days.

(21) Appl. No.: 09/948,393

(22) Filed: Sep. 7, 2001

(65) Prior Publication Data

US 2002/0099763 A1 Jul. 25, 2002

(30) Foreign Application Priority Data

Sep. 8, 2000 (JP) .............................. 2000-272959

(51) Int. Cl.
*G06F 17/30* (2006.01)
(52) U.S. Cl. ..................... 707/8; 707/10; 707/1; 707/3; 709/201; 348/207.1; 348/221.99; 369/47.22; 358/1.16
(58) Field of Classification Search ................. 707/1, 707/6, 3, 10; 709/201, 219, 224
See application file for complete search history.

(56) References Cited

U.S. PATENT DOCUMENTS

| | | | | |
|---|---|---|---|---|
| 6,208,992 B1 * | 3/2001 | Bruckner | ..................... | 707/100 |
| 6,249,817 B1 * | 6/2001 | Nakabayashi et al. | ...... | 709/224 |
| 6,438,233 B1 * | 8/2002 | Yoshimune et al. | ........ | 380/241 |
| 6,782,409 B1 * | 8/2004 | Yoshida | ..................... | 709/201 |

FOREIGN PATENT DOCUMENTS

WO WO 00 02389 1/2000
WO WO 02 08987 1/2002

OTHER PUBLICATIONS

Ayala'R et al: "Internet technology based infrastructure for mobile multimedia services" Wireless Communications and Networking Conference, 1999. WCNC. 1999 IEEE New Orleans, LA, USA Sep. 21-24, 1999, Piscataway, NJ, USA, IEEE, US, Sep. 21, 1999, pp. 109-113, XP010353805 ISBN: 0-7803-5668-3.

Corcoran P M et al: "Internet enable digital photography" IEEE Transactions on Consumer Electronics, IEEE Inc. New York, US, vol. 45, No. 3, Jun. 22, 1999 ISSN: 0098-3063.

(Continued)

*Primary Examiner*—Jean M. Corrielus

(74) *Attorney, Agent, or Firm*—Frommer Lawrence & Haug LLP; William S. Frommer; Thomas F. Presson

(57) ABSTRACT

An information processing apparatus for providing content data to terminal units includes a content data storage unit, a communication unit, an input information storage unit, an analysis unit, and a processing unit. The content data storage unit stores a plurality of pieces of content data. The communication unit transmits content data stored in the content data storage unit to a plurality of terminal units, and receives input information of each user with respect to the transmitted content data. The input information storage unit stores the input information received by the communication unit for each user. The analysis unit analyzes the preference of a target user on the basis of the input information of a similar user, which resembles the input information of the target user, stored in the input information storage unit. The processing unit processes content data to be transmitted to the terminal units in accordance with the analysis results by the analysis unit.

18 Claims, 34 Drawing Sheets

OTHER PUBLICATIONS

Serizawa M et al: "SDL-Net: a wireless access link to broadband multimedia networks". Vehicular Technology Conference, 1996. Mobile Technology for the Human Race., IEEE 46th Atlanta, GA, USA Apr. 28-May 1, 1996, New York, NY, USA, IEEE, US, Apr. 28, 1996, pp. 973-977 XP010162534 ISBN: 0-7803-3157-5.

* cited by examiner

FIG. 8

| (BOOK TITLE) | (AUTHOR) | (PUBLISHING COMPANY) |

(CONTENTS)

(LIST OF RECOMMENDED BOOKS)

FIG. 10A
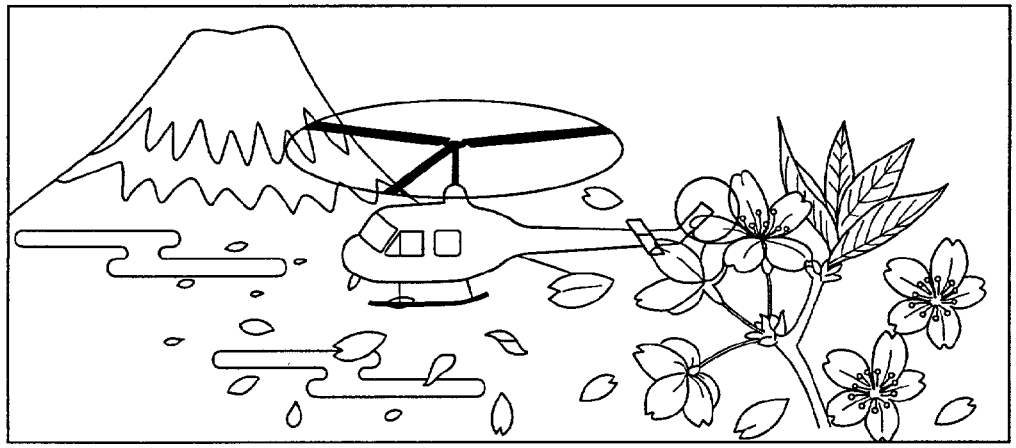
FIG. 10B
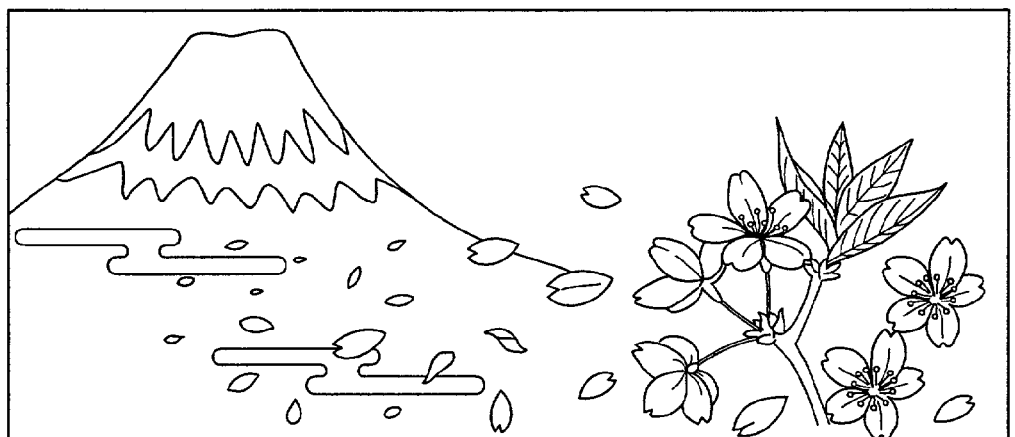
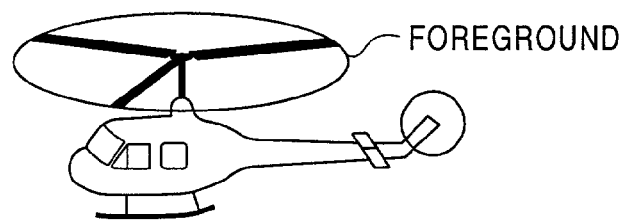

DISTRIBUTION OF STILL CLICKS

DISTRIBUTION OF MOTION CLICKS (AFTER MOTION CONPENSATION)

OBJECT NUMBER IN WHICH INCIDENCE IS HIGHEST WITHIN BLOCK

EXTRACTION RESULT (STILL)

EXTRACTION RESULTS (MOTION)

CALCULATE FOR ALL PIXELS

INFORMATION PROCESSING APPARATUS, SYSTEM AND METHOD, AND RECORDING MEDIUM

BACKGROUND OF THE INVENTION

1. Field of the Invention

The present invention relates to an information processing apparatus, system and method, and a recording medium. More particularly, the present invention relates to an information processing apparatus and an information processing method, which are capable of, for example, providing value-added content to users, and to a recording medium therefor.

2. Description of the Related Art

For example, it is common that merchandise introduction information such as direct mail is prepared according to preference tendencies of individuals and is distributed. Therefore, conventionally, for example, personal information is collected by questionnaires, and based on the analysis results thereof, preference tendencies of individuals are found.

However, in the above-described conventional method, there are problems in that it is difficult to prepare questions for obtaining accurate preference information and that questionnaire results differ depending on the checker of the questionnaire, making it difficult to ascertain accurate preference tendencies. Also, there is a problem in that it takes an enormous amount of time to prepare questionnaires, check them, and analyze them.

Therefore, the applicant of the present invention has previously proposed in, for example, Japanese Unexamined Patent Application Publication No. 2000-48046 (Japanese Patent Application No. 1-144505, U.S. patent Ser. No. 09/463425), a method in which personal information having high correlation with the personal information of a subject user from the personal information of a plurality of users, and based on the personal information, a list of CD (Compact Disc) titles is created, so that a list of CD titles which seem interesting is provided to the subject user.

In the previously proposed method, however, just the titles of CDs and books that a user seems interested in are introduced. Consequently, in the previously proposed method, even if, for example, the contents of the CD selected by the user from the list of CD titles can be provided to the user, the same contents recorded on a CD are provided to all the users.

That is, in the technique disclosed in U.S. patent Ser. No. 09/463425, a method of estimating the preference of each user and providing a list of CD titles appropriate for the preference of each user is disclosed. However, the contents recorded on a CD are fixed regardless of the preference of the user.

However, it is expected that, if content can be provided to users in accordance with the preference of each user, an added value can be given to the content, and the number of users who use those services will increase.

SUMMARY OF THE INVENTION

The present invention has been made in view of such circumstances. An object of the present invention is to provide value-added contents.

To this end, in one aspect, the present invention provides an information processing apparatus comprising: content data storage means for storing a plurality of pieces of content data; communication means for transmitting the content data stored in the content data storage means to a plurality of terminal devices and for receiving input information of each user for the transmitted content data; input information storage means for storing the input information received by the communication means for each user; analysis means for analyzing a preference of a target user on the basis of the input information of a similar user, which resembles the input information of the target user stored in the input information storage means; and processing means for processing content data to be transmitted to the terminal device according to the analysis results by the analysis means.

In another aspect, the present invention provides an information processing apparatus comprising: communication means for transmitting content data to a user terminal and for receiving a user ID transmitted from the user terminal and identification information which specifies a part of the content data; an identification information database for storing the user ID and the identification information in such a manner as to correspond to each other; registration means for registering the user ID and the identification information received by the communication means in the identification information database; an integrated database for integrating and storing the identification information of a plurality of user IDs, registered in the identification information database; extraction means for extracting an ID of a similar user having a preference resembling that of a target user by comparing the identification information corresponding to a target user ID stored in the identification information database with the identification information corresponding to an ID of another user, stored in the identification information database, and for storing, in the integrated database, identification information which is unique to the identification information corresponding to the target user ID within the identification information corresponding to the extracted similar user ID, together with the identification information corresponding to the target user ID, in such a manner as to correspond to the target user ID; preference information creation means for creating preference information corresponding to the target user ID according to the identification information of the target user ID stored in the integrated database; a content database for storing a plurality of pieces of content data; and content data processing means for reading the content data stored in the content database at predetermined intervals from the content database, for processing the content data corresponding to the identification information contained in the preference information, and for outputting the processed content data to the communication means.

The above and further objects, aspects and novel features of the invention will become more fully apparent from the following detailed description when read in conjunction with the accompanying drawings.

BRIEF DESCRIPTION OF THE DRAWINGS

FIG. 8 illustrates electronic book data provided by the content server 7;

FIGS. 10A and 10B illustrate image data provided by the content server 7;

DESCRIPTION OF THE PREFERRED EMBODIMENTS

Figure 1:
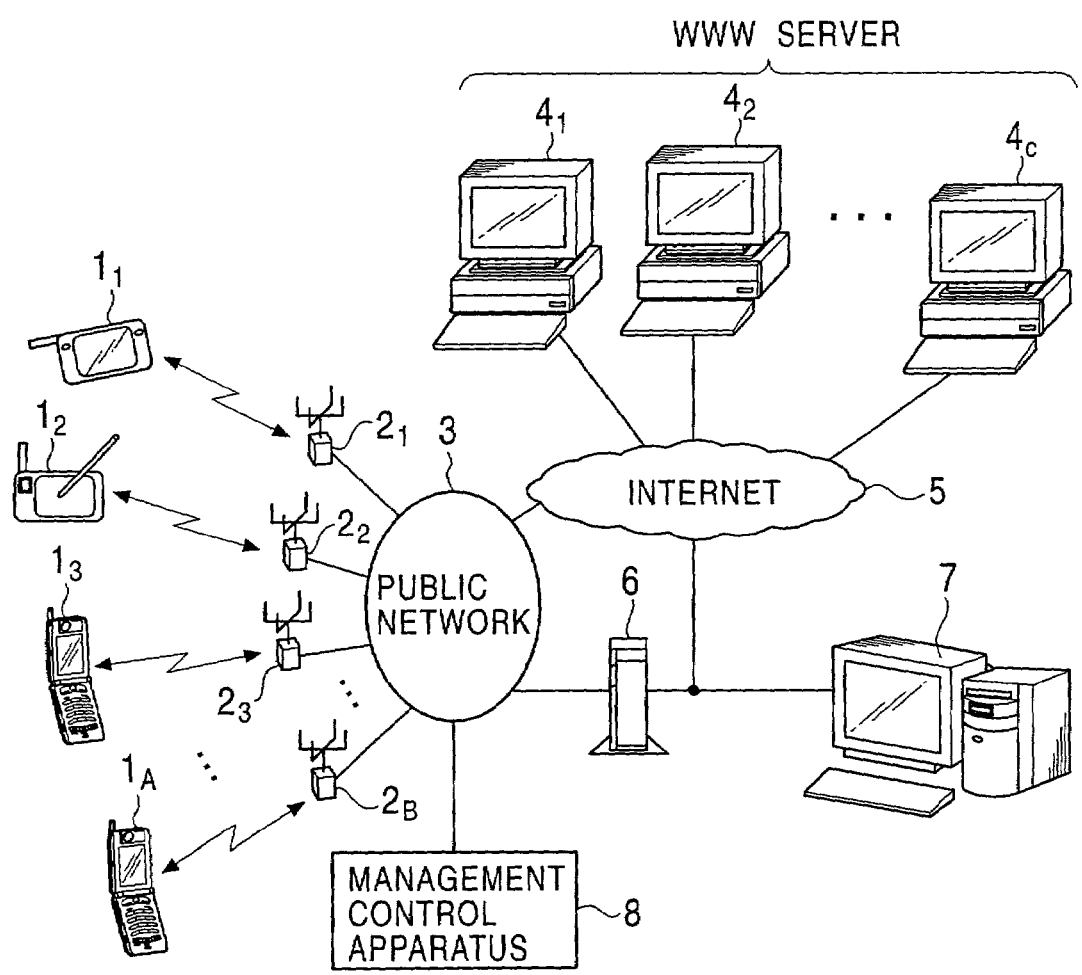
FIG. 1 shows an example of the construction of one embodiment of a network system to which the present invention is applied.

FIG. 1 shows an example of the construction of one embodiment of a network system (the "system" refers to a logical assembly of a plurality of apparatuses, and it does not matter whether or not the apparatus of each construction is in the same housing.) to which the present invention is applied.

A plurality of portable terminals $1_1, 1_2, \ldots, 1_A$ are formed of, for example, portable telephones, PHSs (Personal Handyphone System) (trademark), PDAs (Personal Digital Assistants), etc., which are capable of performing wireless communication.

Base stations $2_1, 2_2, \ldots, 2_B$ are fixed radio stations which are each disposed within a cell in which a communication service providing area is divided into desired sizes. The portable terminals $1_1, 1_2, \ldots, 1_A$, which are mobile radio stations, are wirelessly connected to the base station within the cell where the portable terminals are located.

In this embodiment, between the base stations $2_1$ to $2_B$ (hereinafter described as a "base station 2" unless it is not particularly necessary to be identified) and the portable terminals $1_1$ to $1_A$ (hereinafter described as a "portable terminal 1" unless it is not particularly necessary to be identified), wireless communication is performed by a wide band-code division multiple access (W-CDMA). As a result, between the portable terminal 1 and the base station 2, it is possible to exchange a large-capacity of data at high speed at a data transfer rate of 2 Mbps as a maximum by using a frequency bandwidth of 2 GHz. Since data communication with a large capacity at high speed is possible in this manner, it is possible for the portable terminal 1 to not only perform speech transmission, but also perform a variety of data exchange, such as transmission/reception of electronic mail, browsing of home pages, or transmission/reception of images.

The base station 2 is connected to a public network 3 via a wire circuit, and the Internet 5, many subscriber wire terminals (not shown), a computer network, an Intranet network, etc., are connected to the public network 3. Furthermore, an access server 6 and a content server 7 possessed by an Internet service provider are also connected to the public network 3.

The access server 6 provides connection services to the Internet 5 by a commonly called "dial-up connection". The content server 7, in response to a request from the portable terminal 1 or by commonly called "push-type distribution, provides various contents, such as a file in an HTML (Hyper Text Markup Language) format as Web pages, data of electronic books, audio data of musical pieces stored in a CD, image data (image/video) of moving pictures, etc.

A large number of WWW (World Wide Web) servers $4_1$, $4_2, \ldots, 4_C$ are connected to the Internet 5, making it possible to access these WWW servers $4_1$ to $4_C$ (hereinafter described as a "WWW server 4" unless it is not particularly necessary to be identified) in accordance with the TCP/IP protocol (Transmission Control Protocol/Internet Protocol) from a subscriber wire terminal and the portable terminal 1.

Here, for example, in the section from the portable terminal 1 to the base station 2, communication is performed in accordance with a simplified transport protocol of 2 Mpbs, and in the section from the base station 2 to the WWW server 4 via the Internet 5, communication is performed in accordance with the TCP/IP protocol.

A management control apparatus 8 is connected to the public network 3 and performs a billing process regarding the charge for a telephone call, etc., with respect to the subscriber wire terminal and the portable terminal 1.

Figure 2:
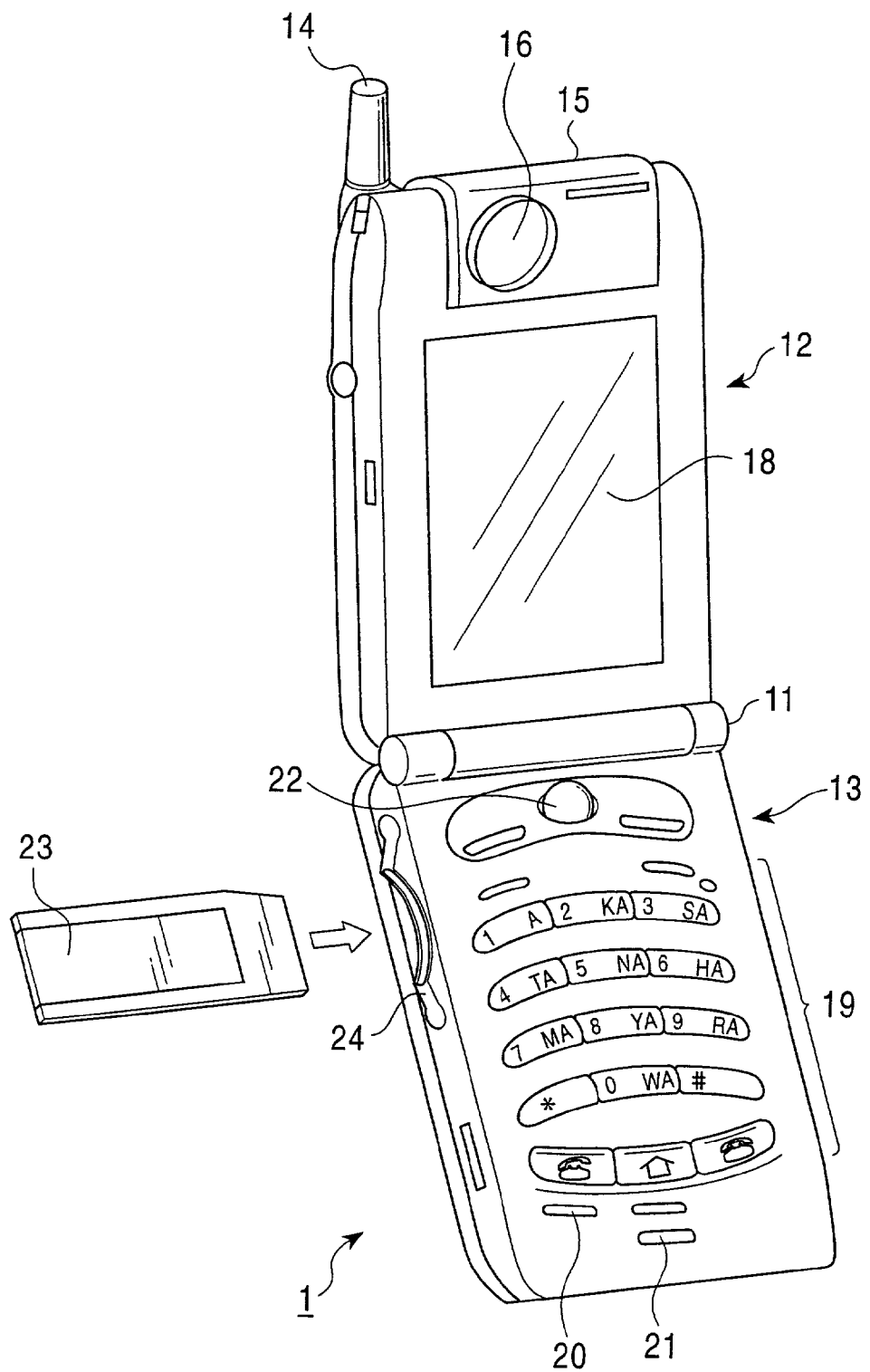
FIG. 2 is a perspective view showing an example of the construction of the exterior of a portable terminal 1.

FIG. 2 shows an example of the construction of the exterior of the portable terminal 1 of FIG. 1.

More specifically, FIG. 2 shows an example of the construction of the exterior in a case where the portable terminal 1 is, for example, a digital portable telephone set with a camera. In FIG. 2, the portable terminal 1 is divided into a display section 12 and a main unit 13 with a hinge section 11 in the center acting as a boundary, and is formed so as to be collapsible via the hinge section 11.

In the display section 12, an antenna 14 for transmission/reception is mounted in the left portion at the upper end thereof in such a manner as to be capable of being retractable, and the antenna 14 transmits and receives radio waves with the base station 2. Also, in the display section 12, a camera section 15 capable of turning at an angle of nearly 180 degrees is provided in the central portion at the upper end thereof. The camera section 15 has a CCD (Charge Coupled Device) camera 16, so that it is possible for the portable terminal 1 to capture an image of a desired subject.

Figure 3:
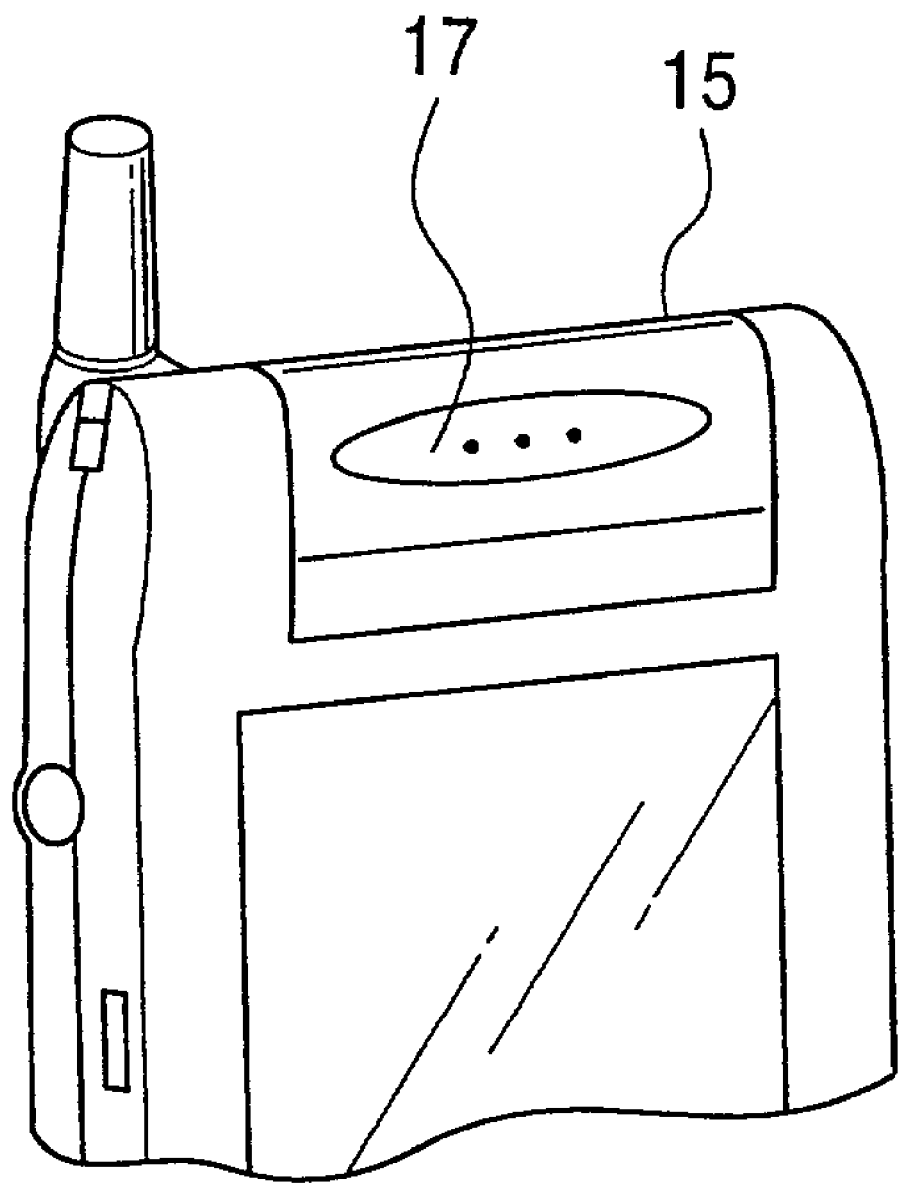
FIG. 3 is a perspective view showing a camera section 15, which is made to turn, of the portable terminal 1.

A speaker 17 is provided on a side (back side) opposite to the side of the camera section 15, on which the CCD camera 16 is provided. That is, when a user turns the camera section 15 by nearly 180 degrees from the state shown in FIG. 2 and performs positioning to that state, as shown in FIG. 3, the speaker 17 provided in the center at the back of the camera section 15 is positioned on the front side, and this causes the state to be switched to a state in which normal speech transmission is possible.

The display section 12 is further provided with a liquid-crystal display 18 on the front thereof. In the liquid-crystal display 18, for example, the radio wave receiving conditions, the remaining level of the battery, the name of the other party and the telephone number registered in a telephone book, and the transmission history are displayed. Furthermore, on the liquid-crystal display 18, the electronic mail content, a Web page, an image captured by the CCD camera 16, data received by the portable terminal 1, and in addition, a cursor which indicates a predetermined position on a display screen of the liquid-crystal display 18 are displayed.

The main unit 13 is provided, on its surface, with numeric keys from "0" to "9", a call origination key, a redial key, a call termination and power key, a clear key, as well as operation keys 19 such as an electronic mail key. It is possible for the user to input various instructions by operating these operation keys 19.

Also, below the operation keys 19, the main unit 13 is provided with a memo button 20 and a microphone 21. The memo button 20 is operated when the speech of the other party during a speech transmission is to be recorded. The microphone 21 collects the sound of the speech of the user during a speech transmission.

In addition, above the operation keys 19, the main unit 13 is provided with a rotatable trackball 22 in such a manner as to slightly project from the surface of the main unit 13. When the trackball 22 is rotated, in responses to this operation, various operations, such as a scrolling operation of a list of telephone directories and electronic mail displayed on the liquid-crystal display 18, a page turning operation of home pages, or an image advancing operation, are performed.

Also, the trackball 22 is such that a pressing operation toward the inside of the main unit 13 is possible. For example, when the user, by rotating the trackball 22, selects a desired telephone number from among a plurality of telephone numbers in a telephone directory displayed on the liquid-crystal display 18, and presses the trackball 22 toward the inside of the main unit 13, in the portable terminal 1, the selected telephone number is determined, and a call origination process is automatically performed on that telephone number.

In addition, the trackball 22 is rotated when the cursor displayed on the liquid-crystal display 18 is to be moved and is pressed when the point at which the cursor is positioned is to be clicked to.

In the upper portion on the left side of the main unit 13, a memory card slot 24 for inserting a removable "memory card" 23 is provided. In the memory card, when memo button 20 is pressed, a speech from the other party during a speech transmission is recorded, or in response to the operation of the user, electronic mail, home pages, images captured by the CCD camera 16, data received by the portable terminal 1, etc., are recorded.

Here, the memory card 23 is such that a flash memory device, which is one type of EEPROM (Electrically Erasable and Programmable Read Only Memory) which is a nonvolatile memory in which overwriting and erasure are possible electrically, is stored within a small and thin plastic case, allowing writing and erasure of various types of data, such as image data, audio data or programs.

As for the memory card 23, for example, a memory stick (trademark of Sony Corporation), which is developed by Sony Corporation which is the applicant of the present invention, can be adopted. Also, as for the memory card 23, in addition, an SD memory card, compact flash, smart media, a multimedia card, a Thumb Drive (all of which are trademarks), etc., which are products of other companies, may also be adopted. Also, in place of the memory card 23 which is a semiconductor memory, for example, magnetic disks, which are called microdrives and iD format (both of which are trademarks), may also be adopted.

The memory card 23 can easily be mounted in or removed from the memory card slot 24. Consequently, it is possible to easily share data with other electronic apparatuses via the memory card 23.

On the back side of the main unit 13, a battery pack (not shown) is inserted. When the call termination and power key is turned on, power is supplied from the battery pack to each circuit section, causing the portable terminal 1 to become operable.

Figure 4:
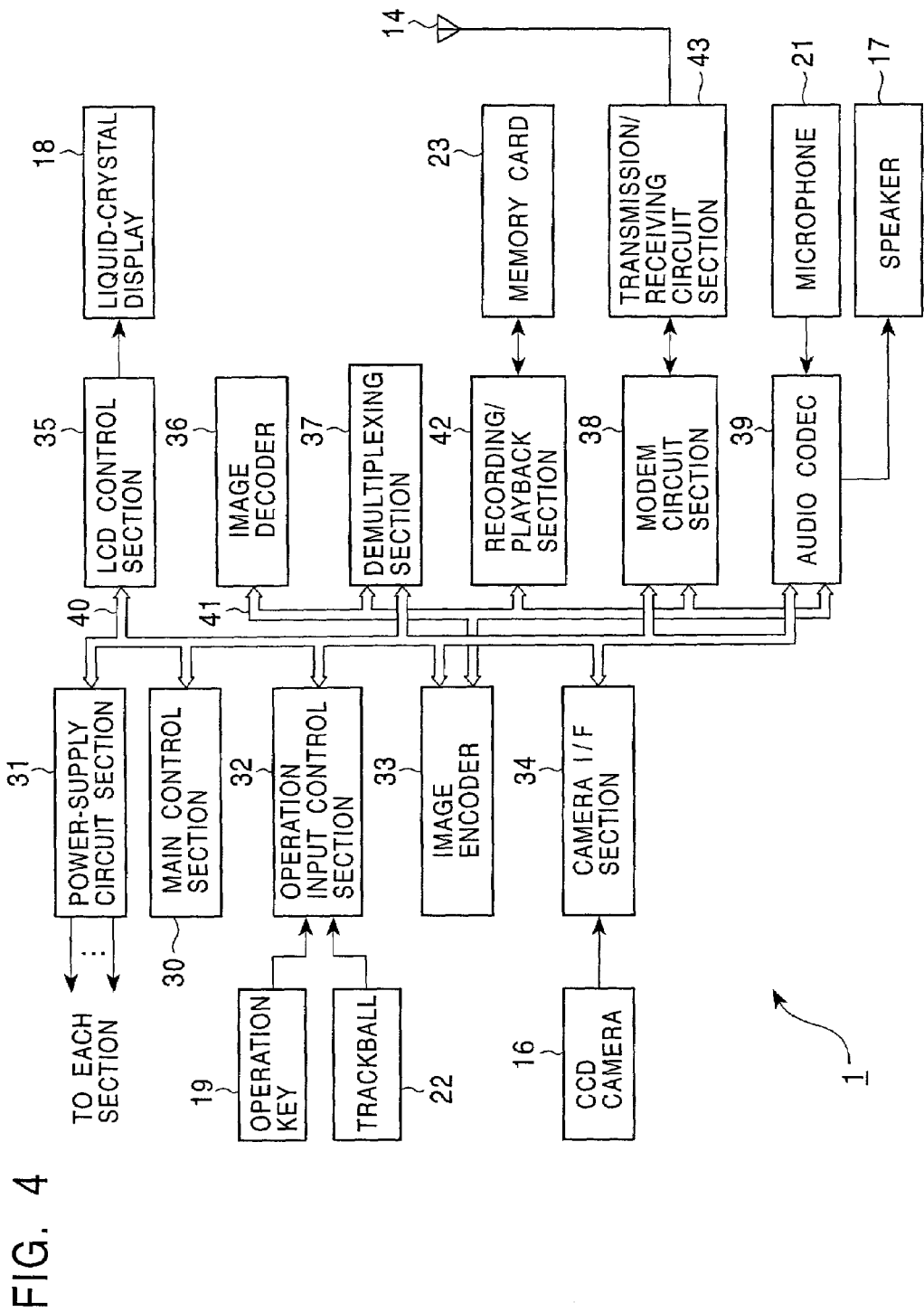
FIG. 4 is a block diagram showing an example of the electrical construction of the portable terminal 1.

FIG. 4 shows an example of the electrical construction of the portable terminal 1.

The portable terminal 1 is constructed in such a way that, with respect to a main control section 30 for centrally controlling the display section 12 and each section of the main unit 13, a power-supply circuit section 31, an operation input control section 32, an image encoder 33, a camera interface section 34, an LCD (Liquid Crystal Display) control section 35, an image decoder 36, a demultiplexing section 37, a recording/playback section 42, a modem circuit section 38, and an audio codec 39 are interconnected via a main bus 40, and that the image encoder 33, the image decoder 36, the demultiplexing section 37, the modem circuit section 38, and the audio codec 39 are interconnected via a synchronization bus 41.

When the call termination and power key is turned on in response to an operation by the user, the power-supply circuit section 31 supplies power from the battery pack to each section so that the portable terminal 1 is started in an operable state.

The main control section 30 comprises a CPU (Central Processing Unit), a ROM (Read Only Memory), a RAM (Random Access Memory) (not shown), etc. By executing a program stored in the ROM by the CPU, various processes are performed.

More specifically, the portable terminal 1, under the control of the main control section 30, converts the audio signal such that the sound is collected by the microphone 21 during speech transmission mode into digital audio data by the audio codec 39, and a spectrum diffusion process is performed on this data by the modem circuit section 38. Furthermore, in the portable terminal 1, a digital-analog conversion process and a frequency conversion process are performed on the signal after the spectrum diffusion process by a transmission/receiving circuit section 43, and the signal is transmitted via the antenna 14.

Also, in the portable terminal 1, a received signal received by the antenna 14 during speech transmission mode is amplified by the transmission/receiving circuit section 43, a frequency conversion process and an analog-digital conversion process are performed on the signal, and this signal is supplied to the modem circuit section 38. The modem circuit section 38 performs an inverse spectrum diffusion process on the signal from the transmission/receiving circuit section 43 and supplies the signal to the audio codec 39. The audio codec 39 converts the signal from the modem circuit section 38 into an analog audio signal and supplies the signal to the speaker 17, whereby the signal is output.

In addition, when, for example, text data such as electronic mail is to be transmitted, the portable terminal 1 sends the text data input by operating the operation keys 19 and/or the trackball 22 to the main control section 30 via an operation input control section 32. The main control section 30 causes the text data supplied thereto to be processed by the modem circuit section 38 and the transmission/receiving circuit section 43 in a manner similar to the above-described speech transmission, after which the main control section 30 transmits the text data to the base station 2 via the antenna 14.

Also, when text data such as electronic mail is to be received, in the portable terminal 1, a received signal received from the base station 2 via the antenna 14 is processed by the transmission/receiving circuit section 43 and the modem circuit section 38 in a manner similar to the case during speech transmission, causing the received signal to be restored as the text data, after which the data is supplied to the liquid-crystal display 18 via the LCD control section 35, whereby the data is displayed as electronic mail.

In addition, in the portable terminal 1, when, for example, image data is to be transmitted, the image data captured by the CCD camera 16 is supplied to the image encoder 33 via the camera interface section 34. The image encoder 33 converts the image data supplied from the CCD camera 16 into coded image data by subjecting it to compression coding by a predetermined coding method, and sends this data to the demultiplexing section 37. At the same time, the portable terminal 1 sends the sound which is collected by the microphone 21 while a photo is being taken by the CCD camera 16, as digital audio data, to the demultiplexing section 37 via the audio codec 39. The demultiplexing section 37 multiplexes the coded image data supplied from the image encoder 33 and the audio data supplied from the audio codec 39 by a predetermined method. The multiplexed data obtained thereby is processed by the modem circuit section 38 and the transmission/receiving circuit section 43, and is transmitted via the antenna 14.

The image data obtained by taking a photo by the CCD camera 16 in the above-described manner can be supplied at the same time to the liquid-crystal display 18 via the camera interface section 34 and the LCD control section 35 so that the image data is displayed thereon.

When, for example, image data is to be received, in the portable terminal 1, the received signal received from the base station 2 via the antenna 14 is processed by the transmission/receiving circuit section 43 and the modem circuit section 38, and the multiplexed data obtained thereby is sent to the demultiplexing section 37. The demultiplexing section 37 demultiplexes the multiplexed data into coded image data and audio data, and supplies the coded image data to the image decoder 36 and supplies the audio data to the audio codec 39, via the synchronization bus 41. The image decoder 36 decodes the coded image data by a decoding method corresponding to a predetermined coding method, thereby creating reproduced moving picture data, supplies the data via the LCD control section 35 to the liquid-crystal display 18, whereby the data is displayed. The audio codec 39 converts the audio data supplied thereto into an analog audio signal, and supplies the signal to the speaker 17, whereby the signal is output.

In addition, it is possible for the portable terminal 1 to receive data of an electronic book, which is distributed by a push type by the content server 7, and content such as image (moving picture) data such as movies. Of course, it is also possible for the portable terminal 1 to download electronic book data, video/image data such as movies, and audio data containing voice and music to the memory card 23 and a built-in memory (not shown) via the recording/playback section 42.

Figure 5:
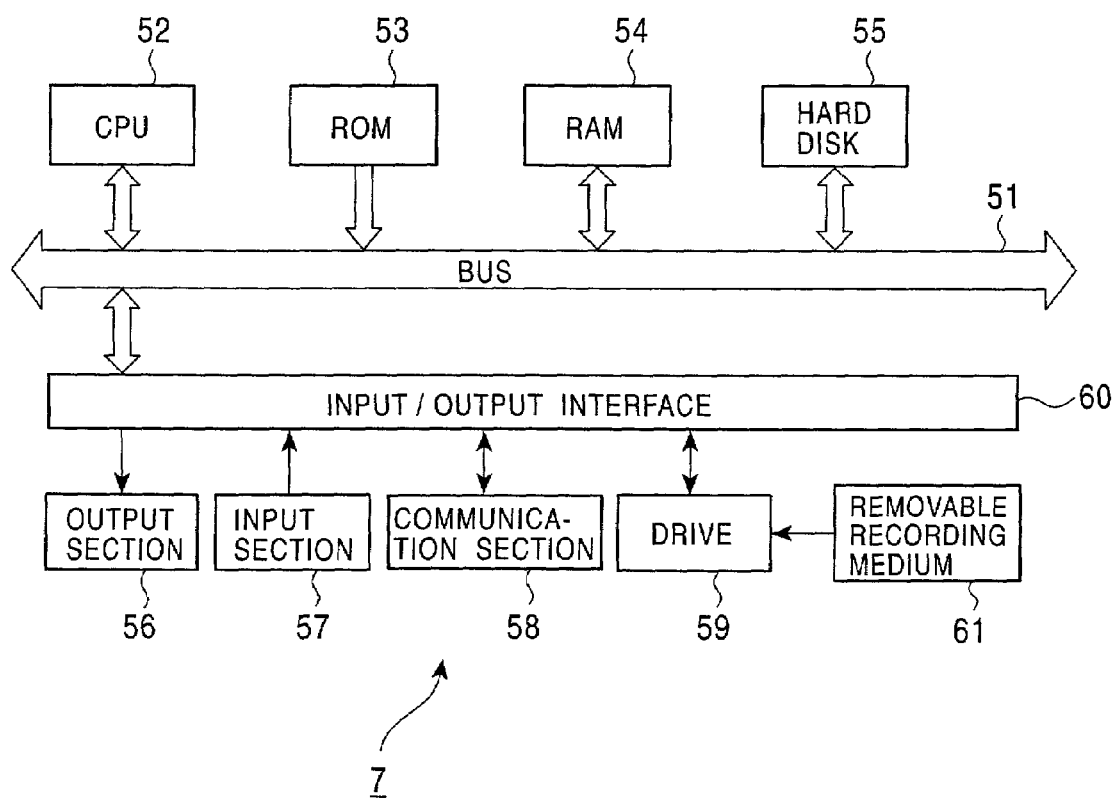
FIG. 5 is a block diagram showing an example of the hardware configuration of a content server 7.

Next, FIG. 5 shows an example of the hardware configuration of the content server 7 of FIG. 1.

An input/output interface 60 is connected to a CPU 52 via a bus 51. When instructions are input via the input/output interface 60 as a result of an input section 57 consisting of a keyboard, a mouse, a microphone, etc., being operated by the administrator of the Internet service provider, the CPU 52 executes the program stored in a ROM 53 in accordance with the instructions. Alternatively, the CPU 52 loads, into a RAM 54, a program stored on a hard disk 55, a program which is transferred from a satellite or a network, which is received by a communication section 58, and which is installed onto the hard disk 55, or a program which is read from a removable recording medium 61 inserted into a drive 59 and which is installed onto the hard disk 55, and executes the program. As a result, the CPU 52 performs processes according to the flowcharts (to be described later) or performs processes according to the construction of the block diagrams (to be described later). Then, the CPU 52, for example, outputs, as necessary, the processing results from an output section 56 consisting of an LCD (Liquid Crystal Display), a speaker, etc., via the input/output interface 60, or transmits the processing results from the communication section 58, and furthermore, causes the processing results to be recorded on the hard disk 55.

In this specification, processing steps which describe a program for causing (the CPU 52 of) the content server 7 to perform various processes need not necessarily be performed in a time-series manner from the sequence described in a flowchart, and contains processing which is performed in parallel or individually (for example, parallel processing or object-based processing) as well.

Also, the program may be processed by only the content server 7, and may be subjected to distributed processing by a plurality of computers including the content server 7. Furthermore, the program may be transferred to a remote computer and executed thereby.

Here, the program may be prerecorded on the hard disk 55 and the ROM 53 as recording media contained in the content server 7.

Alternatively, the program may be stored (recorded) temporarily or permanently on the removable recording medium 61, such as a floppy disk, a CD-ROM (Compact Disc-Read Only Memory), an MO (Magneto-optical) disk, and a DVD (Digital Versatile Disc), a magnetic disk, or a semiconductor memory. Such a removable recording medium 61 may be provided as commonly called packaged media.

In addition to being installed into the content server 7 from the removable recording medium 61 such as that described above, programs may be transferred to the content server 7 in a wireless manner from a download site via an artificial satellite for digital satellite broadcasting or may be transferred to the content server 7 through wires via a network, such as a LAN (Local Area Network) or the Internet, and in the content server 7, the programs which are transferred in such a manner may be received by the communication section 58 and may be installed onto the hard disk 105 contained therein.

The content server 7, as described above, provides contents such as data of electronic books and image data of movies, to the portable terminal 1 by, for example, push-type distribution, that is, broadcasting. The contents which are provided are controlled in accordance with user input information of each user, which is transmitted from each of a plurality of portable terminals $1_1$ to $1_A$. Also, the push-type distribution contains, as well, a form in which content data is distributed by streaming via a network line in accordance with UDP/IP (User Datagram Protocol/Internet Protocol).

More specifically, in FIG. 1, when, for example, data of an electronic book is to be provided to the portable terminal 1 of the subject user to which attention is paid (hereinafter referred to as a "subject portable terminal 1" where appropriate) from among a plurality of portable terminals $1_1$ to $1_A$, at first, for example, only the book title, the author, and the publishing company of each electronic book are provided to the subject portable terminal 1 via the access server 6, the public network 3, and the base station 2.

Figure 6A:
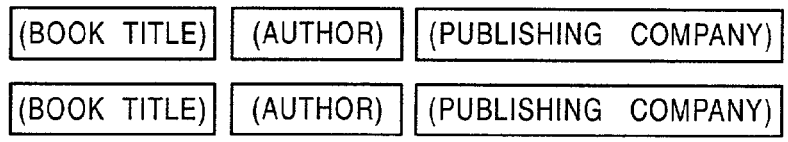
FIGS. 6A, 6B, and 6C illustrate electronic book data provided by the content server 7.

In this case, in the subject portable terminal 1, as shown in, for example, FIG. 6A, the book title, the author, and the publishing company of each electronic book are displayed on the liquid-crystal display 18. Also, in a portable terminal 1 other than the subject portable terminal 1, the same display is produced.

In each of the plurality of portable terminals $1_1$ to $1_A$, while the display shown in FIG. 6A is being made, when the user of each of the portable terminals $1_1$ to $1_A$ selects a display portion of the electronic book desired by the user by clicking the trackball 22, the main control section 30 (FIG. 4) controls the modem circuit section 38 and the transmission/receiving circuit section 43 in order to transmit the information which specifies the selected electronic book as the user input information from the user. That is, as a result, the user input information is transmitted to the content server 7 via the base station 2, the public network 3, and the access server 6.

The content server 7 estimates the preference of the subject user on the basis of the user input information of each user, transmitted from each of the plurality of portable terminals $1_1$ to $1_A$ in this manner, and processes the data of the electronic book to be provided to the subject user on the basis of the estimated preference.

More specifically, the content server 7 deletes data related to books which are estimated to be of no interest to the subject user from the data of the electronic books to be provided. Furthermore, the content server 7 adds a part of the contents of the books which are estimated to be of interest to the subject user, to the data of the electronic books to be provided. Then, the content server 7 provides the data of the electronic books on which such processing is performed to the subject portable terminal 1 of the subject user.

Figure 6B:
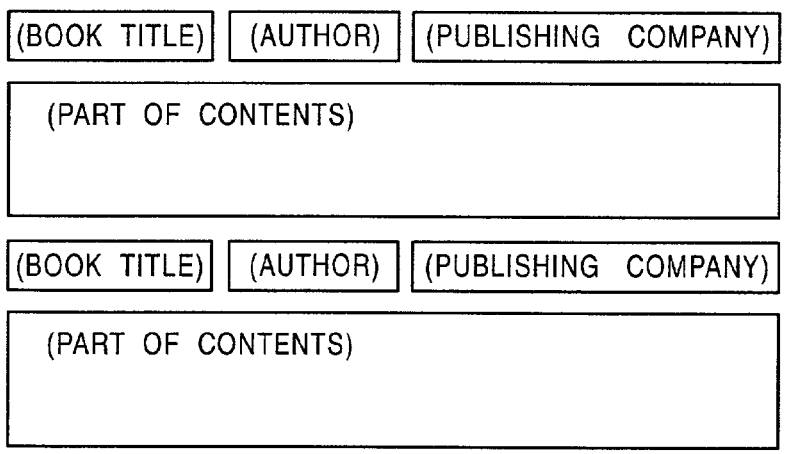

As a result, in the portable terminal 1, as shown in, for example, FIG. 6B, the book title, the author, and the publishing company of only the book that the subject user is interested in, and some of the contents of that book are displayed on the liquid-crystal display 18. Also in the portable terminal 1 other than the subject portable terminal 1, the same display is produced for the book that each user is interested in.

Also thereafter, the content server 7 continues to estimate the preference of the subject user and provides all the contents of that book with regard to the book which is estimated to be more interesting.

Figure 6C:
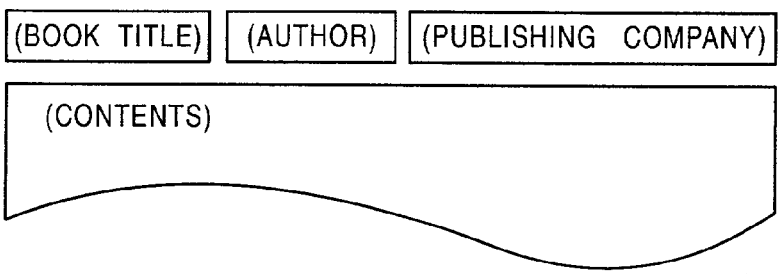

As a result, in the subject portable terminal 1, as shown in, for example, FIG. 6C, the book title, the author, and the publishing company of only the book that the subject user is more interested in, and all the contents of that book are displayed on the liquid-crystal display 18. Also, in the portable terminal 1 other than the subject portable terminal 1, the same display is produced for the book that each user is interested in.

Here, although in the above-described case, the content server 7 estimates the preference of the subject user and provides to the subject user the data of the electronic book for only the book which is estimated to be of interest to the user, the data of the electronic book for another book can also be provided to the subject user. That is, for the book which is estimated to be of interest to the subject user among the books of which the content server 7 has the data of the electronic book, the data of the electronic book, such as that described in FIGS. 6B and 6C, is provided, and for the remaining books, the data of only the book title, the author, and the publishing company of the electronic book may be provided.

Figure 7A:
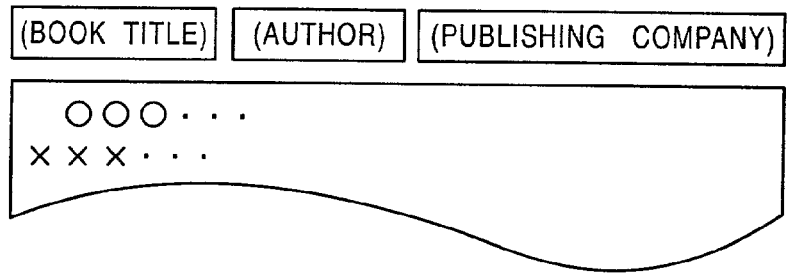
FIGS. 7A, 7B, and 7C illustrate electronic book data provided by the content server 7.
Figure 7B:
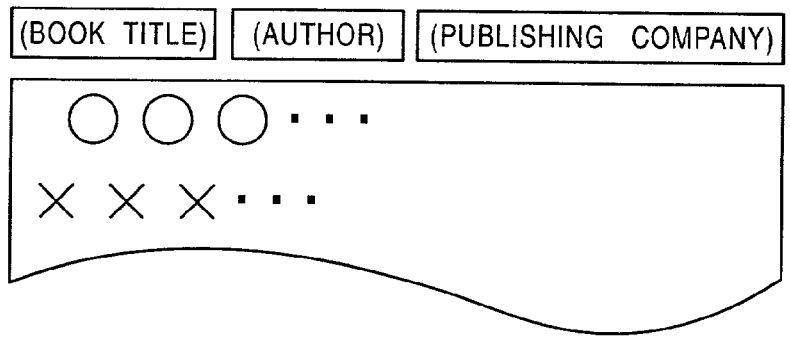
Figure 7C:
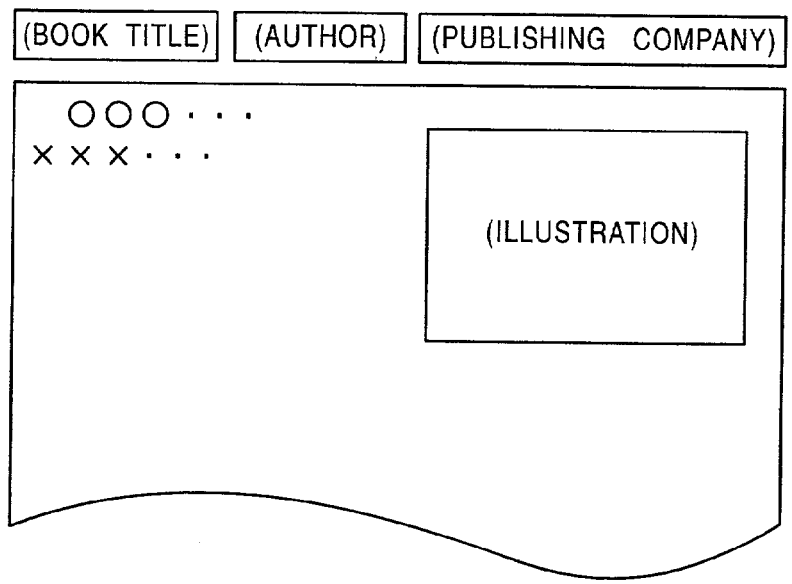

Furthermore, it is possible for the content server 7 to provide, according to the estimated preference of the subject user, data of an electronic book, in which, for example, the characters showing the contents of the book are changed from the default size such as that shown in FIG. 7A to larger characters such as those shown in FIG. 7B. It is also possible for the content server 7 to provide the book title, the author, the publishing company of the electronic book, and the data of an electronic book in which an illustration, a photograph of the author, and a photograph of the front cover of the book are contained in all the contents of that book, according to the estimated preference of the subject user, as shown in, for example, FIG. 7C.

In addition, it is also possible for the content server 7 to create a list of books which are estimated to be of interest to the subject user (a list of recommended books) on the basis of the estimated preference of the subject user, and to provide the data of the electronic books, which is changed to contain the list, to the subject user, as shown in FIG. 8.

In the above-described case, in the content server 7, the data of the electronic book is provided, and also for the other contents, the contents to be provided to each user are controlled in accordance with the user input information from a plurality of users.

Figure 9A:
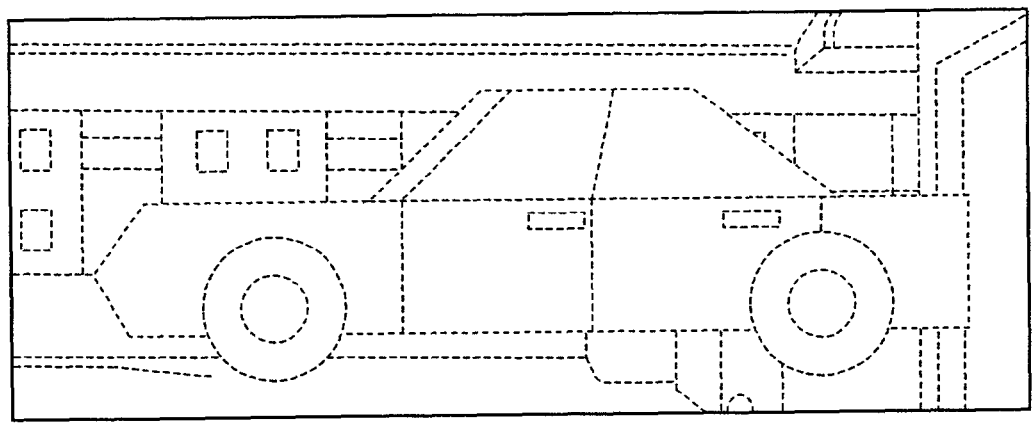
FIGS. 9A and 9B illustrate image data provided by the content server 7.

More specifically, for example, when image data is to be provided to a plurality of portable terminals $1_1$ to $1_A$ from the content server 7, at first, image data having a low resolution in its entirety (or having a standard resolution), such as that shown in, for example, FIG. 9A, is provided.

In a case where low-resolution image data shown in FIG. 9A is being displayed in each of the plurality of portable terminals $1_1$ to $1_A$, when the user of each of the portable terminals $1_1$ to $1_A$ selects a display portion of an object desired by the user by clicking the trackball 22, the main control section 30 (FIG. 4) controls the modem circuit section 38 and the transmission/receiving circuit section 43 in order to transmit to the content server 7 the information which specifies the selected display portion as the user input information from the user.

The content server 7 estimates the preference of the subject user on the basis of the user input information of each user, transmitted from each of the plurality of portable terminals $1_1$ to $1_A$ in this manner, and processes the image data to be provided to the subject user on the basis of the estimated preference.

That is, the content server 7 improves the resolution of the area which is estimated to be of interest to the subject user within the image data to be provided, and provides the image data, whose resolution is improved in that manner, to the subject portable terminal 1 of the subject user.

Figure 9B:
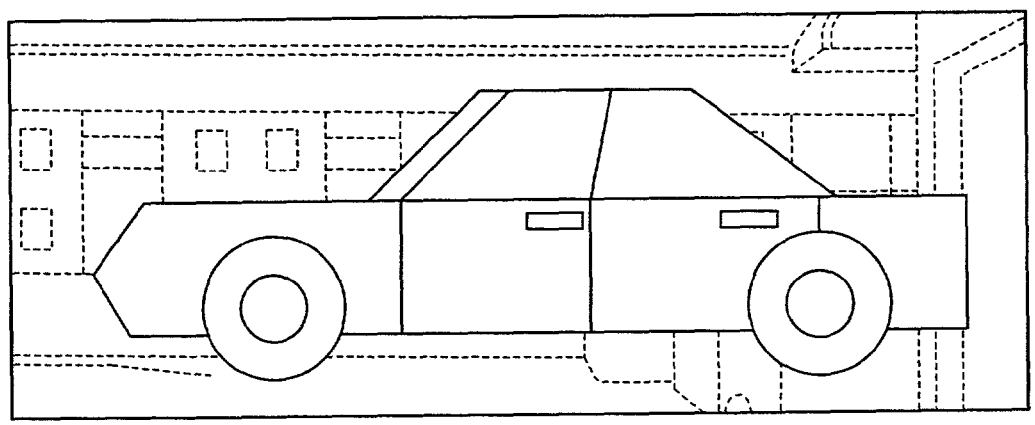

As a result, in the subject portable terminal 1, as shown in, for example, FIG. 9B, the image data in which the resolution of the display portion of the object that is of interest to the subject user is displayed on the liquid-crystal display 18. Also in the portable terminal 1 other than the subject portable terminal 1, the same display is produced for the object that each user is interested in.

In a case where, as shown in, for example, FIG. 10A, image data in which objects are not separated is provided to the plurality of portable terminals $1_1$ to $1_A$ from the content server 7, when the user of each of the portable terminals $1_1$ to $1_A$ selects a display portion of the object desired by the user by clicking the trackball 22, the main control section 30 (FIG. 4) controls the modem circuit section 38 and the transmission/receiving circuit section 43 in order to transmit to the content server 7 the information which specifies the selected display portion as the user input information from the user.

The content server 7 extracts an object from the image data provided to the subject user on the basis of the user input information of a plurality of users, transmitted from each of the plurality of portable terminals $1_1$ to $1_A$ in this manner, thereby separating the image data into the object (foreground) and the background, as shown in, for example, FIG. 10B, performs coding of the object, and provides the data to the subject portable terminal 1 of the subject user.

In the subject portable terminal 1, the object and the background which form the object-coded image data are combined, and an image such as that shown in FIG. 10A is displayed, and the image data in which the objects are separated is provided to the subject user, making it possible for the subject user to reuse the objects.

Figure 11:
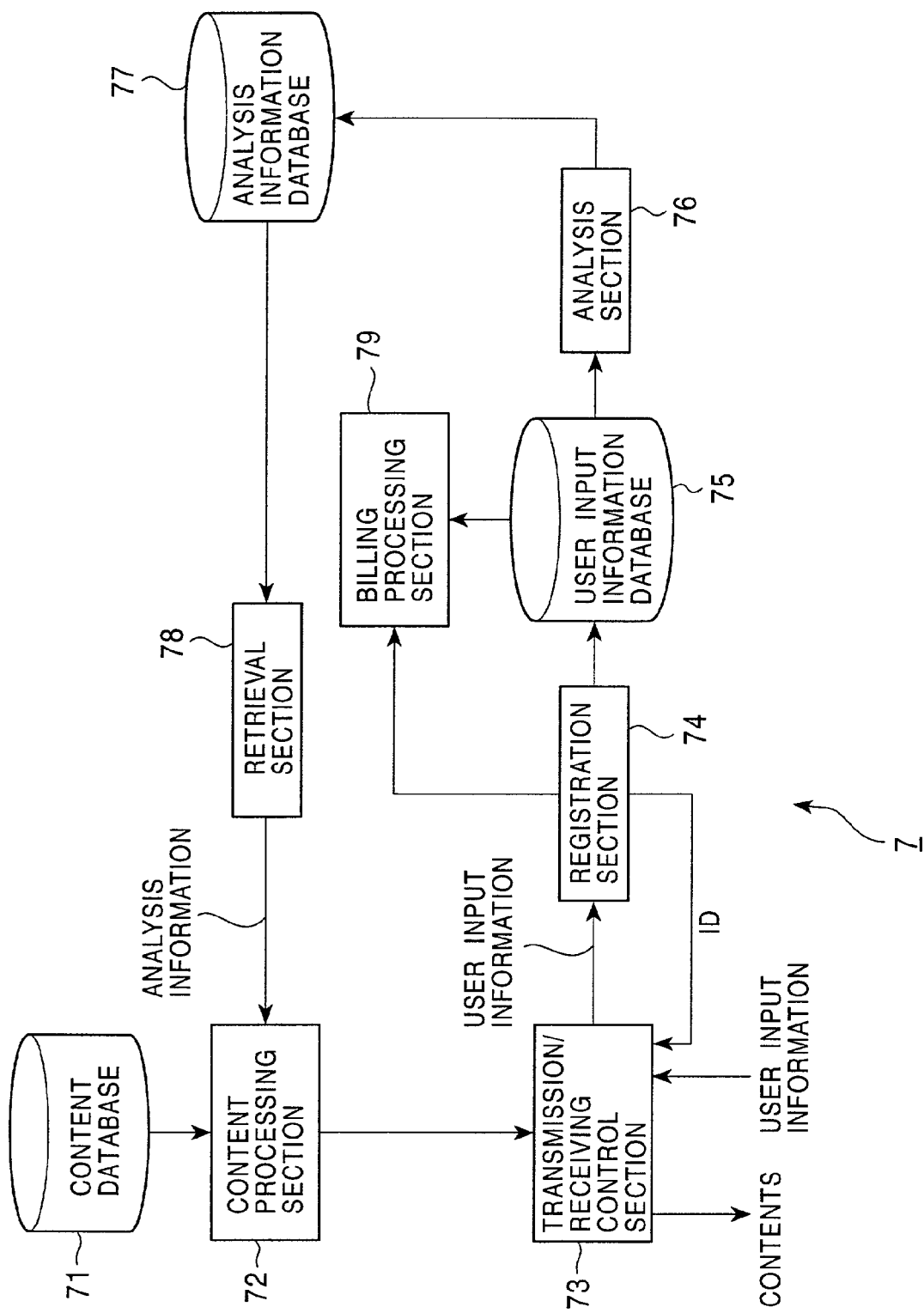
FIG. 11 is a block diagram showing an example of the functional construction of the content server 7.

Next, FIG. 11 shows an example of the functional construction of the content server 7 of FIG. 5 in a case where contents such as those shown in FIGS. 6A to 10 are provided to the portable terminal 1. This functional construction is realized in the content server 7 by the CPU 52 executing the program installed on the hard disk 55.

A content database 71 has stored therein contents to be provided to the portable terminal 1.

A content processing section 72 reads contents to be provided to the portable terminal 1 from the content database 71 and processes the contents in accordance with the analysis information supplied from a retrieval section 78.

Then, the content processing section 72 supplies the processed contents (hereinafter referred to as "processed contents" where appropriate) to a transmission/receiving control section 73.

The transmission/receiving control section 73 transmits the processed contents from the content processing section 72 to the portable terminal 1 by commonly called push-type distribution. Also, the transmission/receiving control section 73 receives user input information transmitted from the user terminal 1 and supplies it to a registration section 74. Additionally, the transmission/receiving control section 73 performs transmission and reception of data for user registration as well.

The registration section 74 supplies the user input information supplied from the transmission/receiving control section 73 to a user input information database 75, whereby the user input information is registered. Furthermore, the registration section 74 also performs a process for user registration, such as the issuance of a user ID (Identification) and a password. Furthermore, the registration section 74 supplies, as necessary, the user ID which specifies the user of the portable terminal 1 to a billing processing section 79.

The user input information database 75 stores the user input information supplied from the registration section 74 in such a manner as to correspond to the user ID of the user of the portable terminal which transmitted the user input information.

An analysis section 76 analyzes the input information of a plurality of users, stored in the user input information database 75, makes the analysis information, such as the preference of the subject user, correspond to the user ID of the subject user, and supplies the analysis information to an analysis information database 77.

The analysis information database 77 temporarily stores the analysis information and the user ID supplied from the analysis section 76.

The retrieval section 78 retrieves the analysis information which is made to correspond to the user ID of the subject user from the analysis information database 77, and supplies the analysis information to the content processing section 72.

The billing processing section 79 performs a billing process with respect to the user of the user ID stored in the user input information database 75. The service provided to the user by the content server 7 can be made chargeable or free of charge depending on the content thereof. In the user input information database 75, chargeable/free-of-charge information as to whether the user is a user who receives chargeable services (chargeable user) or a user who receives free of charge services (free of charge user) can be registered in such a manner as to correspond to the user ID of each user. In this case, the billing processing section 79 performs a billing process for only the chargeable user. Here, the billing processing section 79 may have functions for transmitting, to an external settlement center, billing information composed of a user ID (the user's bank account number, etc.), a service provider ID (the service provider's bank account number, etc.) for managing the content server 7 and providing services to users, and charging money.

In the content server 7 constructed in the manner described above, a user registration process for receiving services provided by the content server 7, an analysis process for analyzing the user input information stored in the user input information database 75, a content providing process based on a push type to the user (portable terminal 1), and other processes are performed.

Figure 12:
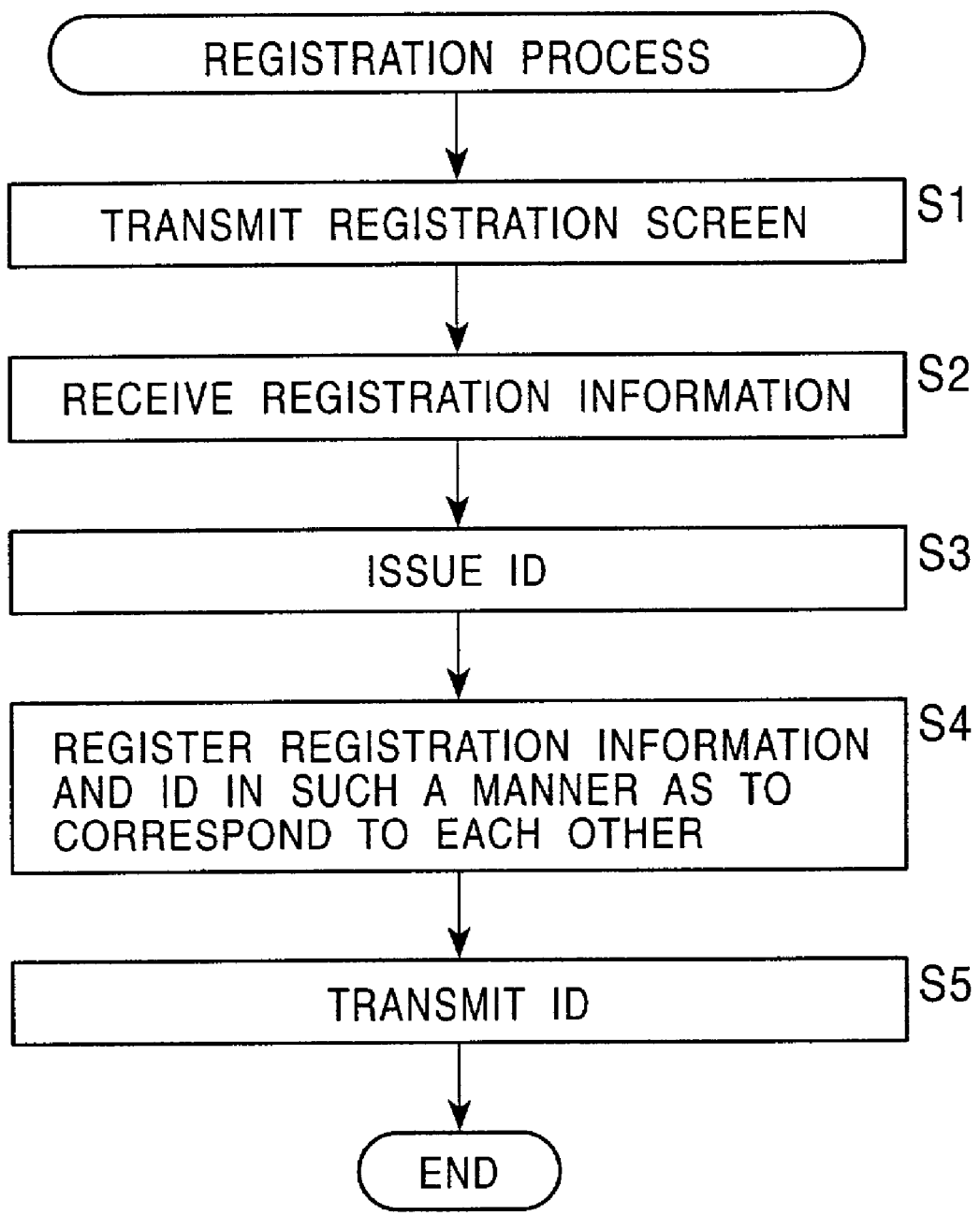
FIG. 12 is a flowchart illustrating a user registration process by the content server 7.

FIG. 12 is a flowchart illustrating a user registration process performed by the content server 7.

In the user registration process, when a request for user registration occurs from the portable terminal 1 in step S1, the transmission/receiving control section 73 transmits, to the portable terminal 1 from which the user registration occurred, a user registration screen written in, for example, HTML, from which the user inputs information necessary for user registration (hereinafter referred to as "registration information" where appropriate).

This user registration screen is received by the portable terminal 1 and is displayed on the liquid-crystal display 18. Then, when the user inputs the name of the user, the user's bank account number or the credit card number from which the bill is drawn, and other necessary registration information to the user registration screen displayed on the liquid-crystal display 18, and the registration information is transmitted from the portable terminal 1 to the content server 7, in step S2, the transmission/receiving control section 73 receives the registration information transmitted from the portable terminal 1 and supplies the registration information to the registration section 74. When the registration information is received, the registration section 74 issues a unique user ID and a unique password in step S3 and the process proceeds to step S4.

In step S4, the registration section 74 creates a new entry (provides a storage area for storing the user input information of the user who transmitted the registration information) in the user input information database 75, and registers the registration information in the entry in such a manner that the user ID and the password issued in step S3 correspond to the registration information from the transmission/receiving control section 73.

Then, the registration section 74 supplies the issued user ID and password to the transmission/receiving control section 73, and in step S5, the transmission/receiving control section 73 transmits the user ID and the password from the registration section 74 to the portable terminal 1 which transmitted the registration information, and the user registration process is terminated.

In the portable terminal 1 which received the user ID and the password, for example, the user ID and the password are stored and transmitted to the content server 7 by the main control section 30 when necessary.

Figure 13:
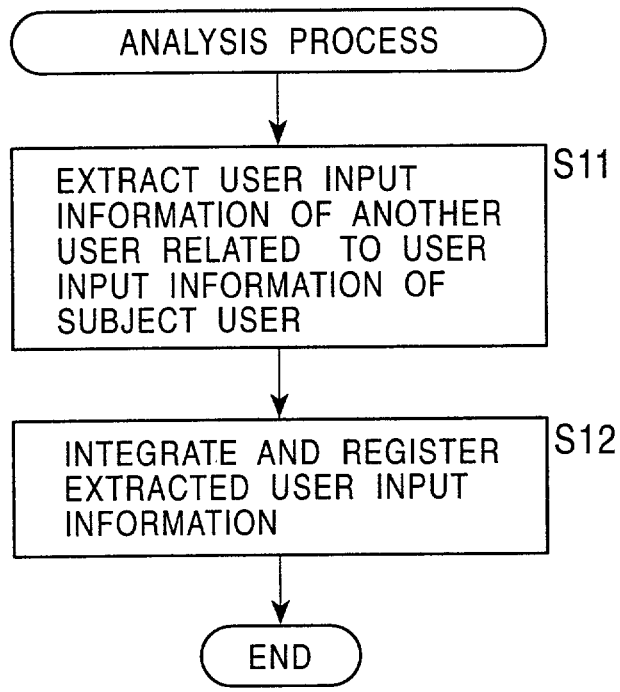
FIG. 13 is a flowchart illustrating an analysis process by the content server 7.

Next, referring to the flowchart in FIG. 13, a description is given of an analysis process for analyzing the user input information stored in the user input information database 75, performed by the analysis section 76.

When, with regard to the contents provided by the content server 7, the user of each of the portable terminals $1_1$ to $1_A$ clicks the trackball 22 as described in FIGS. 6A to 10, the portable terminals $1_1$ to $1_A$ transmit to the content server 7 the information indicating a portion of the content which was clicked on, as user input information, together with the user ID registered in the main control section 30. The user input information and the user ID are received by the transmission/receiving control section 73 of the content server 7 and are supplied to the registration section 74. The registration section 74 registers the user input information from the transmission/receiving control section 73 in the entry of the user input information database 75, which corresponds to the user ID which is made to correspond to the user input information.

The analysis section 76 performs an analysis process by assuming in sequence the users such that one or more pieces of user input information are registered in the user input information database 75 to be a subject user, in the manner described above.

More specifically, in step S11, the analysis section 76 reads the user input information of the subject user from the user input information database 75, and extracts the user input information of another user, related to that user input information, from the user input information database 75. Then, the process proceeds to step S12, whereby the analysis section 76 assumes the user input information of the subject user and the user input information extracted in step S11 collectively as analysis information, and registers the analysis information in the analysis information database 77 in such a manner as to correspond to the user ID of the subject user, and the analysis process is terminated.

Figure 14:
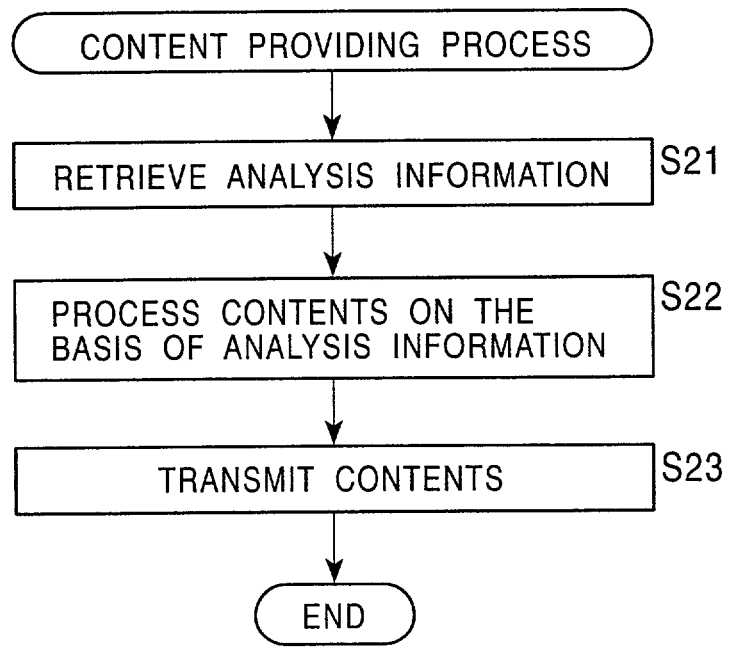
FIG. 14 is a flowchart illustrating a content providing process by the content server 7.

Next, referring to the flowchart in FIG. 14, a description is given of a content providing process for providing content to the subject portable terminal 1 of the subject user.

In the content providing process, initially, in step S21, the retrieval section 78 retrieves the analysis information which is made to correspond to the user ID of the subject user from the analysis information database 77 and supplies the analysis information to the content processing section 72. In step S22 the content processing section 72 reads content from the content database 71 in accordance with predetermined schedule information and processes the contents in accordance with the analysis information from the retrieval section 78.

The content processing section 72 supplies the processed contents obtained as a result of the processing to the transmission/receiving control section 73. In step S23, the transmission/receiving control section 73 transmits, by a push type, the processed contents from the content processing section 72 to the subject portable terminal 1 of the subject user, and the content providing process is terminated.

Figure 15:
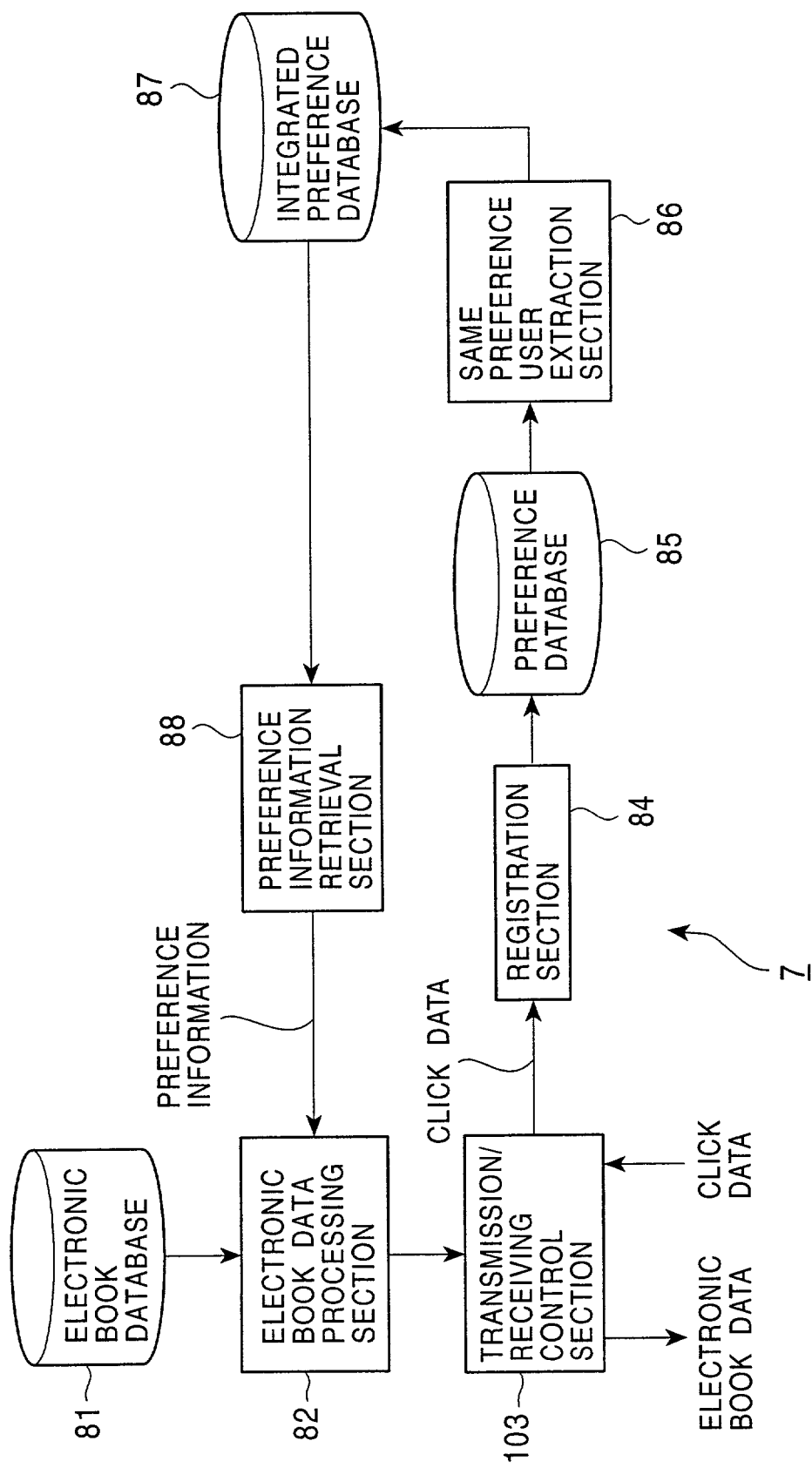
FIG. 15 is a block diagram showing an example of the functional construction of the content server 7 which provides electronic book data.

Next, FIG. 15 shows an example of the functional construction of the content server 7 which provides, as contents, data of electronic books. In the following, since the user registration process and the billing process are the same as those in the case of FIG. 11, descriptions thereof are omitted.

In the content server 7 of FIG. 15, an electronic book database 81, an electronic book data processing section 82, a transmission/receiving control section 83, a registration section 84, a preference database 85, a same preference user extraction section 86, an integrated preference database 87, and a preference information retrieval section 88 correspond to the content database 71, the content processing section 72, the transmission/receiving control section 73, the registration section 74, the user input information database 75, the analysis section 76, the analysis information database 77, and the retrieval section 78 in FIG. 11, respectively.

More specifically, the electronic book database 81 has stored therein, as the data of electronic books, the book title, the author, the publishing company, the contents, and other data for each book. The electronic book data processing section 82 reads the data of the electronic book (electronic book data) from the electronic book database 81, processes the electronic book data in accordance with the preference information from the preference information retrieval section 88, and supplies the data to the transmission/receiving control section 83.

The transmission/receiving control section 83 transmits, by a push type, the electronic book data from the electronic book data processing section 82 to the portable terminal 1.

Also, the transmission/receiving control section 83 receives the click data as the user input information transmitted from the portable terminal 1 and the user ID issued to the user of the portable terminal 1.

More specifically, in the portable terminal 1 as described in FIGS. 6A to 8, the electronic book data provided from the content server 7 is displayed. When the user of the portable terminal 1 clicks the display portion that the user is interested in within the electronic book data displayed in that manner by clicking the trackball 22, the portable terminal 1 causes the information which specifies the electronic book data to which the clicking was performed to be contained in the click data showing that the click has been performed, causes the data to correspond to the user ID stored in the main control section 30, and transmits the data to the content server 7. The transmission/receiving control section 83 receives the click data and the user ID, transmitted from the portable terminal 1 in this manner, and supplies them to the registration section 84.

The registration section 84 recognizes the book as the electronic book data, which was selected by the user by clicking, on the basis of the click data from the transmission/receiving control section 83, and registers, for example, an ISBN code as information for specifying that book, in the entry of the preference database 85, corresponding to the user ID which is made to correspond to the click data from the transmission/receiving control section 83. The preference database 85 stores the ISBN code supplied in this manner from the registration section 84.

The "ISBN code" is an international standard book number standardized by JIS X 0305. The ISBN code allows one book or the version of a book, published from a specific publishing company, to be identified.

The same preference user extraction section 86 extracts another user having the same preference as that of the subject user. That is, the same preference user extraction section 86 compares the entry of the subject user of the preference database 85 with the entry of the other user, and extracts an entry of the other user, in which a predetermined number or more of ISBN codes which match the ISBN code registered in the entry of the subject user is registered. Then, the same preference user extraction section 86 integrates the ISBN codes by calculating the AND of the ISBN code registered in the entry of the extracted other user and the ISBN code registered in the entry of the subject user, makes the code correspond to the user ID of the subject user, and supplies the code to the integrated preference database 87, whereby the code is stored.

Therefore, in this case, in the integrated preference database 87, together with the ISBN code of the book which was directly selected by the user considering that the subject user is interested in, the ISBN code of the book selected by the other user which selected the book specified by that ISBN code is also registered in such a manner as to correspond to the user ID of the subject user.

More specifically, it is assumed that the other user who selected a predetermined number or more of books which are the same as the books which were directly selected by the subject user has the same preference as that of the subject user. Therefore, since such books that the user selected are assumed to be of interest to the subject user, the same preference user extraction section 86 extracts the entry of the other user, in which a predetermined number or more of ISBN codes which match the ISBN code is registered in the entry of the subject user in the manner described above, and integrates the codes by calculating the AND of the ISBN code registered in the entry of the extracted other user and the ISBN code registered in the entry of the subject user, and registers the code in the integrated preference database 87.

Here, although whether the subject user and another user have the same preference is determined based on the number of the same books selected by the subject user and the other user, whether the subject user and the other user have the same preference can additionally be determined by comprehensively considering the genre, etc., of the books selected by the subject user and the other user. That is, for example, it is possible that histograms about the genre, the authors, publishing companies, etc., of the books selected by the subject user and another user, are created, and based on the histograms, a determination is made as to whether the subject user and the other user have the same preference.

The integrated preference database 87 stores the set of the ISBN code and the user ID supplied from the same preference user extraction section 86, as integrated preference information. The preference information retrieval section 88 retrieves the integrated preference information of the subject user from the integrated preference database 87 and supplies the integrated preference information to the electronic book data processing section 82.

Figure 16:
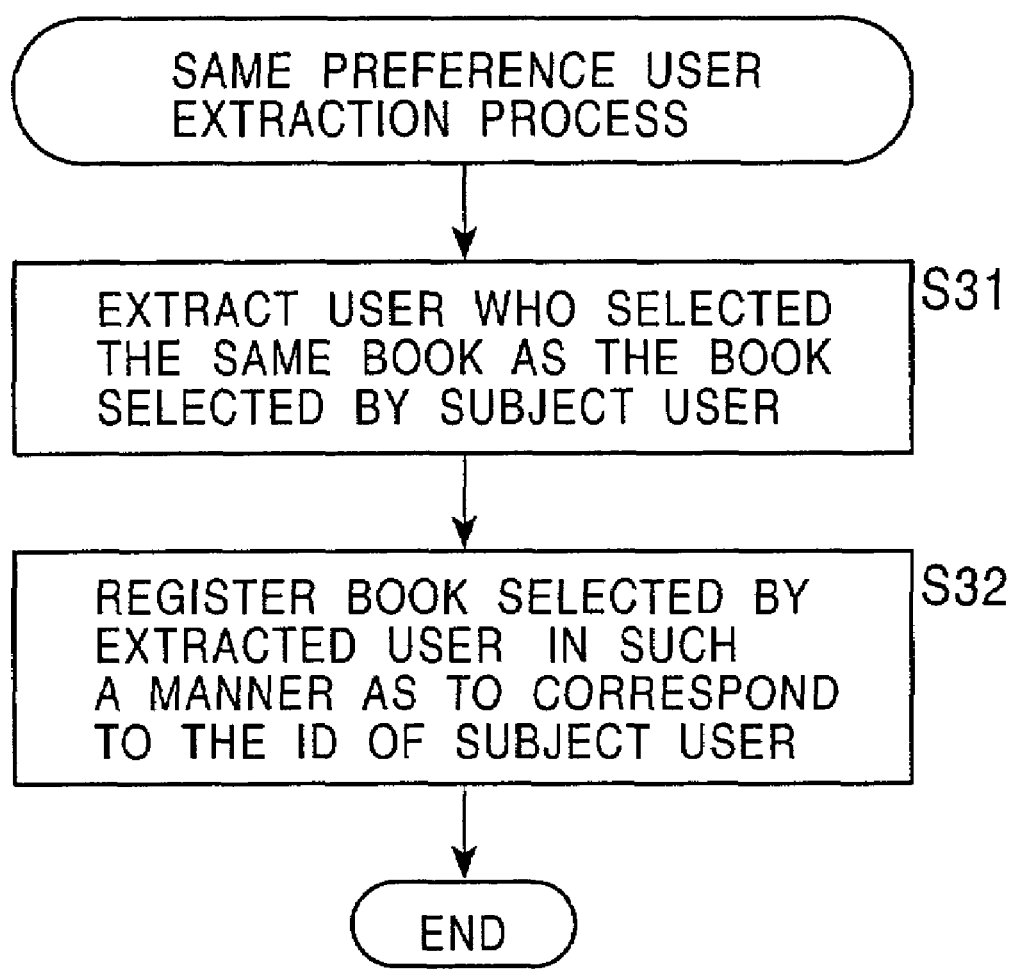
FIG. 16 is a flowchart illustrating a process of a same preference user extraction section 86.

Next, referring to the flowchart in FIG. 16, a process of the same preference user extraction section 86 of FIG. 15 is described.

Initially, in step S31, the same preference user extraction section 86 compares the entry of the subject user of the preference database 85 with the entry of another user, and extracts the user of the entry in which a predetermined number or more of ISBN codes is registered which match the ISBN code registered in the entry of the subject user, as the user having the same preference as that of the subject user.

Then, the process proceeds to step S32, whereby the same preference user extraction section 86 calculates the AND of the ISBN code registered in the entry of the user extracted in step S31 and the ISBN code registered in the entry of the subject user so that the ISBN codes are integrated, and adds the number of the ISBN codes before being integrated (hereinafter referred to as "the number of duplicates" where appropriate) to each ISBN code obtained as a result of the integration.

More specifically, in a case where, for example, three users User 1, User 2, and User 3 are extracted as users having the same preference as that of a subject user User 0, if it is assumed that the ISBN codes registered in the entry of the subject user User 0 are code 0, code 1, and code 2; the ISBN codes registered in the entry of the subject user User 1 are code 0, code 1, code 2, and code 3; the ISBN codes registered in the entry of the subject user User 2 are code 1, code 2, and code 3; and the ISBN codes registered in the entry of the subject user User 3 are code 1, code 2, code 3, and code 4, the same preference user extraction section 86 integrates the ISBN codes registered in the entries of these four users including the subject user so that the codes are code 0, code 1, code 2, code 3, and code 4. Furthermore, the same preference user extraction section 86 adds "2" to code 0, "4" to code 1, "4" to code 2, "3" to code 3, and "1" to code 4, each being as the number of duplicates.

Then, the same preference user extraction section 86 causes ISBN code, to which the number of duplicates is added, to correspond to the user ID of the subject user, and supplies the ISBN code to the integrated preference database 87, whereby the ISBN code is stored, and the processing is terminated.

The same preference user extraction section 86 performs processes by assuming in sequence all the users, whose user IDs are registered in the preference database 85, to be a subject user.

Figure 17:
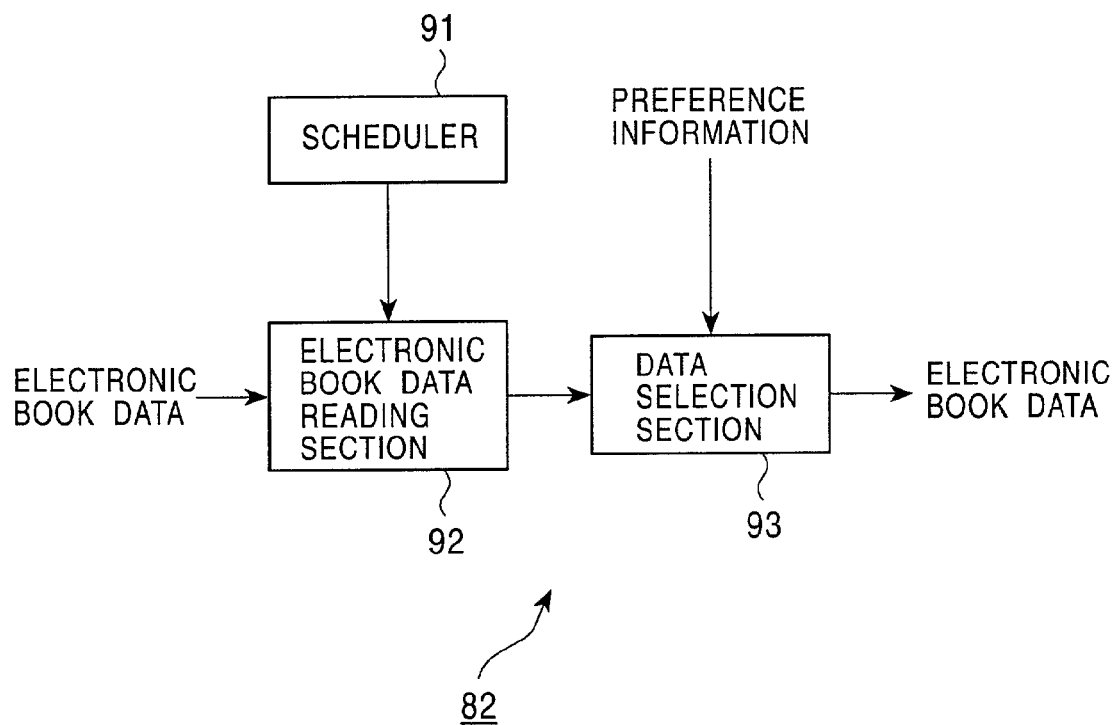
FIG. 17 is a block diagram showing an example of the construction of an electronic book data processing section 82.

Next, FIG. 17 shows an example of the construction of the electronic book data processing section 82 of FIG. 15.

A scheduler 91 performs scheduling in which the electronic book data is distributed by a push type, and controls an electronic book data reading section 92 on the basis of the scheduling results. The electronic book data reading section 92, under the control of the scheduler 91, reads, from the electronic book database 81, electronic book data to be transmitted, and supplies the data to a data selection section 93. The data selection section 93 chooses and outputs electronic book data from the electronic book data reading section 92 in accordance with the integrated preference information supplied from the preference information retrieval section 88.

Figure 18:
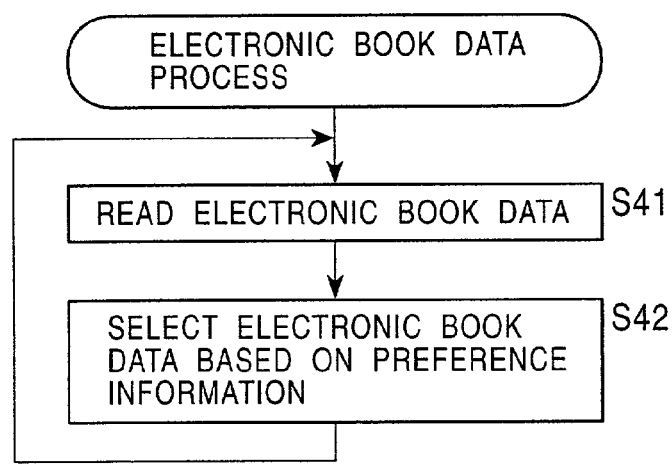
FIG. 18 is a flowchart illustrating a process of the electronic book data processing section 82.

In the electronic book data processing section 82 constructed in the manner described above, as shown in the flowchart in FIG. 18, initially, in step S41, the electronic book data reading section 92, under the control of the scheduler 91, reads, from the electronic book database 81, electronic book data to be transmitted, and supplies the data to the data selection section 93. Then, the process proceeds to step S42, whereby the data selection section 93 chooses electronic book data from the electronic book data reading section 92 in accordance with the integrated preference information supplied from the preference information retrieval section 88.

More specifically, the data selection section 93 assumes the number of duplicates of the ISBN code which is made to correspond to the user ID supplied as the integrated preference information from the preference information retrieval section 88, as the degree of interest of the subject user with respect to the book specified by that ISBN code, and chooses the electronic book data from the electronic book data reading section 92 according to the degree of interest.

Specifically, with regard to the electronic book data of the book which is estimated to be very interesting for the subject user, for example, the data selection section 93 selects and outputs all of them. Also, with regard to the electronic book data which is estimated to be of little interest to the subject user, for example, the data selection section 93 selects and outputs only the book title, the author, the publishing company, and some of the contents thereof. Furthermore, with regard to the electronic book data which is estimated to be of almost no interest to the subject user, for example, the data selection section 93 selects and outputs only the book title, the author, and the publishing company thereof. Also, with regard to the electronic book data which is estimated to be of no interest to the subject user, for example, the data selection section 93 does not output anything at all.

As a result, the electronic book data is provided to the subject portable terminal 1 of the subject user in a from described in FIGS. 6A, 6B, and 6C.

Thereafter, the process returns to step S41, and the same processes are hereafter repeated.

When the maximum value of the number of duplicates in the integrated preference information is small, it is considered that, with regard to the subject user, a sufficient number of pieces of click data is not registered in the preference database 85, but in this case, it is possible to cause the data selection section 93 to perform a default process. That is, in this case, with regard to all of the electronic book data supplied from the electronic book data reading section 92, it is possible to cause the data selection section 93 to select and output, for example, only the book title, the author, and the publishing company thereof.

As described above, in the content server 7, the preference of the subject user is recognized not only by the click data from the subject user, but also by taking into account the click data from users having the same preference as well. Then, with respect to the book which is of interest to the subject user, the electronic book data containing all the contents is provided to the subject user, and with respect to the book for which the subject user is not very interested in, the electronic book data containing some of the contents or the electronic book data which does not contain any contents is provided to the subject user.

As a consequence, based on the click data from the user having the same preference, it is possible to quickly estimate the preference of the subject user and to provide the electronic book data in a from which is appropriate for the preference of the subject user. Also, it is possible for the subject user to obtain more detailed electronic book data for the book which is of interest to the subject user by merely clicking a display portion of the book which is of interest to the subject user with the trackball 22.

Figure 19:
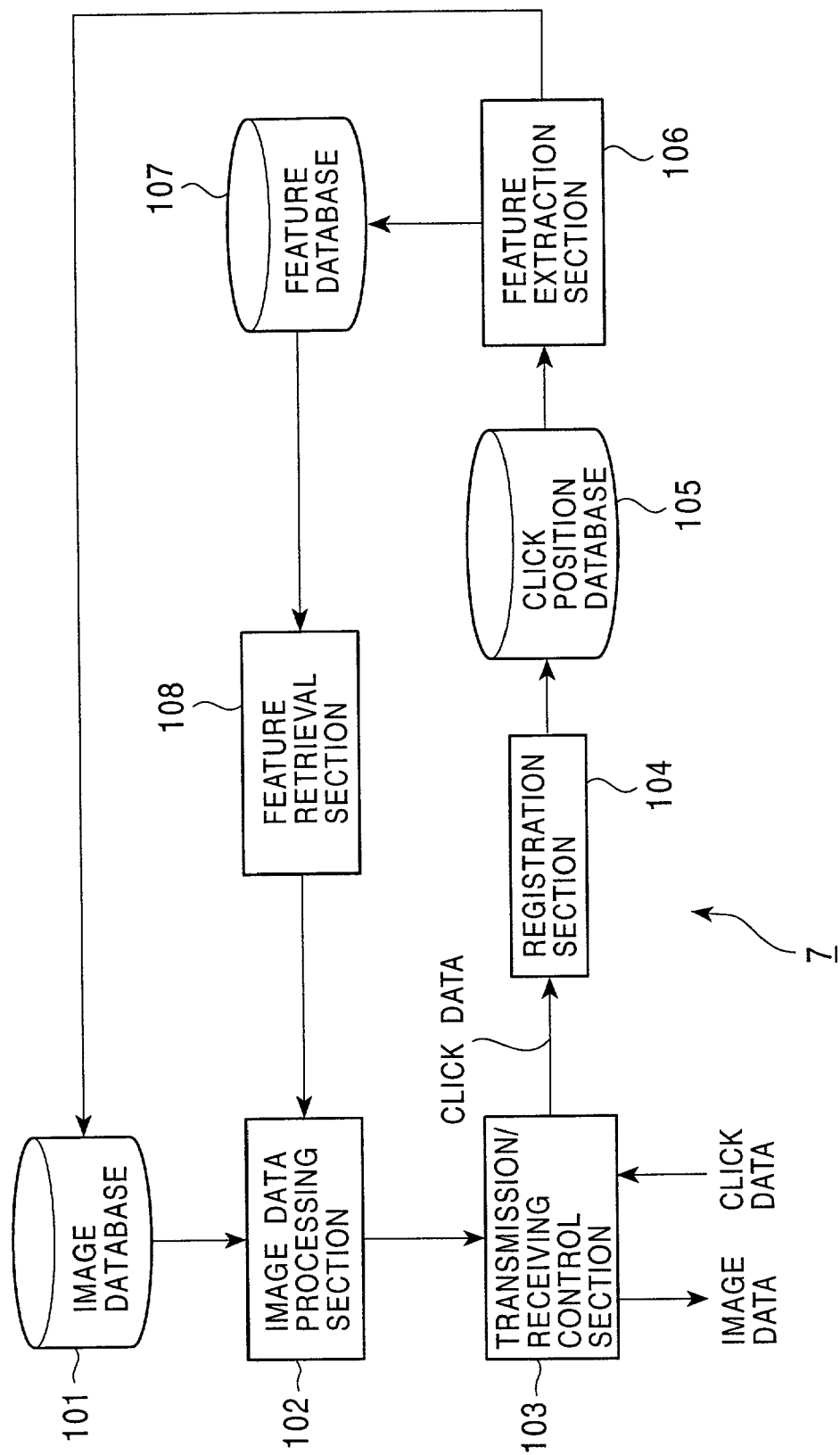
FIG. 19 is a block diagram showing an example of a first functional construction of the content server 7 which provides image data.

Next, FIG. 19 shows an example of a first functional construction of the content server 7 which provides, as contents, image data of moving pictures, such as movies.

In the content server 7 of FIG. 19, an image database 101, an image data processing section 102, a transmission/receiving control section 103, a registration section 104, a click position database 105, a feature extraction section 106, a feature database 107, and a feature retrieval section 108 correspond to the content database 71, the content processing section 72, the transmission/receiving control section 73, the registration section 74, the user input information database 75, the analysis section 76, the analysis information database 77, and the retrieval section 78 in FIG. 11, respectively.

More specifically, the image database 101 has stored therein image data of moving pictures, such as movies. The image data processing section 102 reads image data from the image database 101, processes the image data on the basis of the features from the feature retrieval section 108, and supplies the data to the transmission/receiving control section 103.

The transmission/receiving control section 103 transmits, by a push type, the image data from the image data processing section 102 to the portable terminal 1 Also, the transmission/receiving control section 103 receives click data and a user ID as user input information transmitted from the portable terminal 1.

More specifically, in the portable terminal 1 as described in FIG. 9, the image data provided from the content server 7 is displayed. When the user of the portable terminal 1 clicks a display portion which is of interest to the subject user within the image data displayed in that manner by operating the trackball 22, the portable terminal 1 in response to the click, causes information which specifies the position in time and space of the image data where the clicking was performed to be contained in the click data which shows that clicking was performed, causes the data to correspond to the user ID stored in the main control section 30, and transmits the data to the content server 7. The transmission/receiving control section 103 receives the click data and the user ID transmitted from the portable terminal 1 in this manner and supplies them to the registration section 104.

The registration section 104 recognizes, from the click data from the transmission/receiving control section 103, the time-related and space-related position of the image data selected by the clicking of a user, that is, an identifier of the image data on which the user clicked, the frame number of the image data, and the coordinates in that frame number. Then, the registration section 104 registers, as the click positional information, the image data identifier, the frame number, and the spatial coordinates in the entry of the click position database 105, corresponding to the user ID which is made to correspond to the click data from the transmission/receiving control section 103. The click position database 105 stores the click positional information supplied in this manner from the registration section 104.

The feature extraction section 106 recognizes the features of the area of the image data which is of interest to the subject user on the basis of the click positional information with respect to a plurality of users, stored in the click position database 105.

More specifically, the feature extraction section 106 reads, from the image database 101, the image data of a small area with the position represented by the click positional information (click position) registered in the click position database 105 being as the center, and extracts the features thereof. Here, examples of the features of the image data of a small area includes the color and movement in that small area, the type of the object (for example, a human being, an automobile, etc.) displayed in that small area, an activity, etc.

The feature extraction section 106 extracts, for example, a plurality of features with regard to the image data of a small area with the click position being as the center, and furthermore, extracts another user for which features resembling one or more types of the features of the image data of the small area with the click position by the subject user being as the center are obtained. Then, the feature extraction section 106 adds the features which do not resemble the features obtained from the click position by the subject user within the features obtained from the click position by the extracted user, as the features obtained from the click position by the subject user, causes the features to correspond to the user ID of the subject user, supplies the features to the feature database 107, whereby they are stored.

Therefore, in this case, together with the features of the image data which was directly selected by the subject user considering that the image data is of interest to the subject user, the features of the image data selected by another user who selected the image data of the features resembling those features are registered in the feature database 107 in such a manner as to correspond to the user ID of the subject user.

More specifically, the other user who selected the image data of the features resembling the features of the image data which was directly selected by the subject user is estimated to have the same preference as that of the subject user. Therefore, since the image data of the features selected by such a user is estimated to be also of interest to the subject user, the feature extraction section 106, as described above, extracts the other user who clicked the position of the features resembling the features at the click position by the subject user, adds the features at the click position at which the extracted other user clicked on to the features at the click position registered in the entry of the subject user, and registers the features in the feature database 107.

The feature database 107 stores the set of the features supplied from the feature extraction section 106 and the user ID. The feature retrieval section 108 retrieves the features which are made to correspond to the user ID of the subject user from the feature database 107 and supplies the features to the image data processing section 102.

Figure 20:
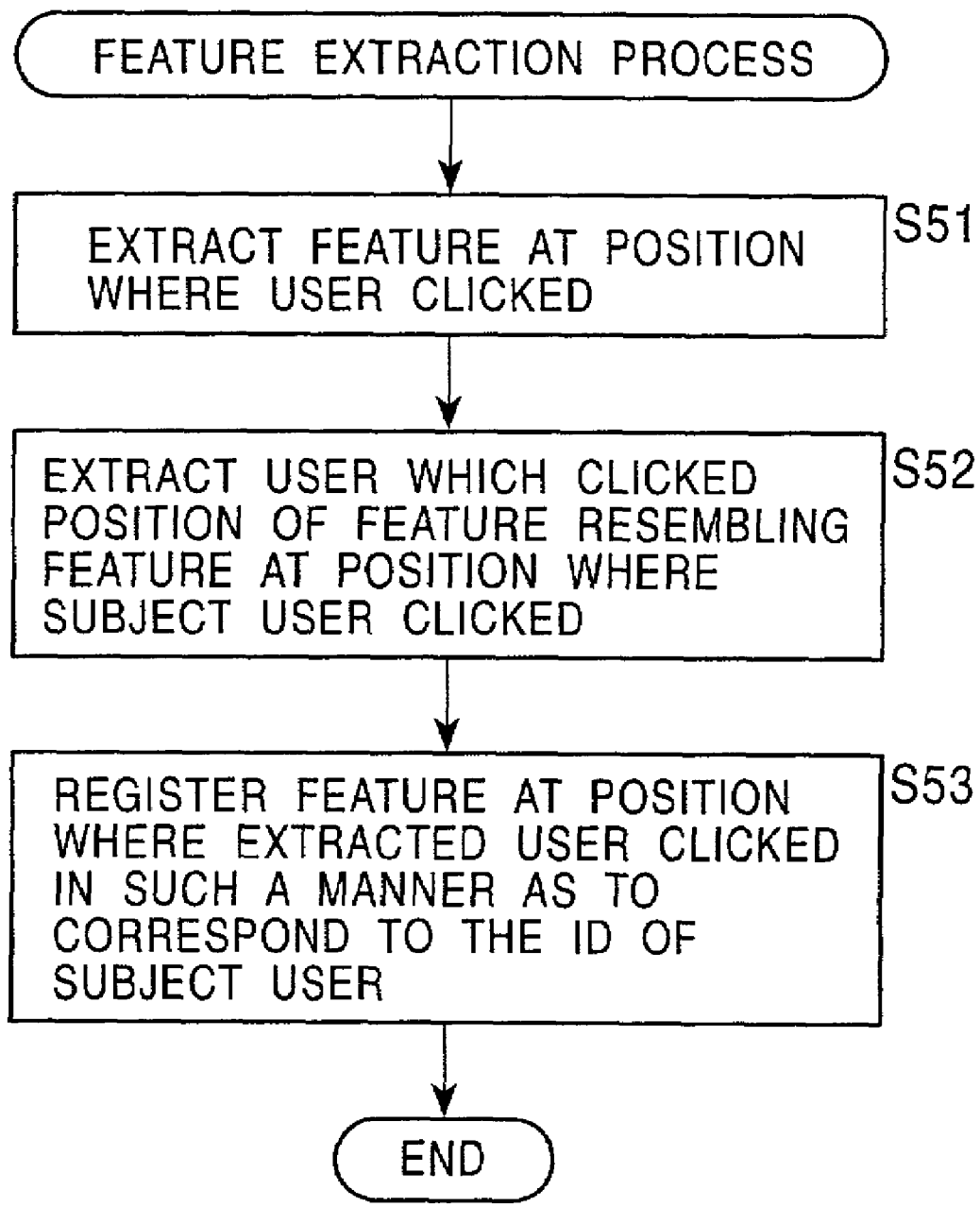
FIG. 20 is a flowchart illustrating a process of a feature extraction section 106.

Next, referring to the flowchart in FIG. 20, a process of the feature extraction section 106 of FIG. 19 is described.

Initially, in step S51, the feature extraction section 106 reads, from the image database 101, the image data of a small area with the click position registered in the click position database 105 being as the center, and extracts the features thereof. Then, the process proceeds to step S52, whereby the feature extraction section 106 extracts another user for which features resembling one or more types of features of the image data of the small area with the click position by the subject user being as the center are obtained, and the process proceeds to step S53. In step S53, the feature extraction section 106 adds the features obtained with regard to the extracted user as the features obtained with regard to the subject user, causes the features to correspond to the user ID of the subject user, supplies the features to the feature database 107, whereby they are stored, and the processing is terminated.

The feature extraction section 106 performs processes by assuming in sequence all the users whose user IDs are registered in the click position database 105 as a subject user.

Figure 21:
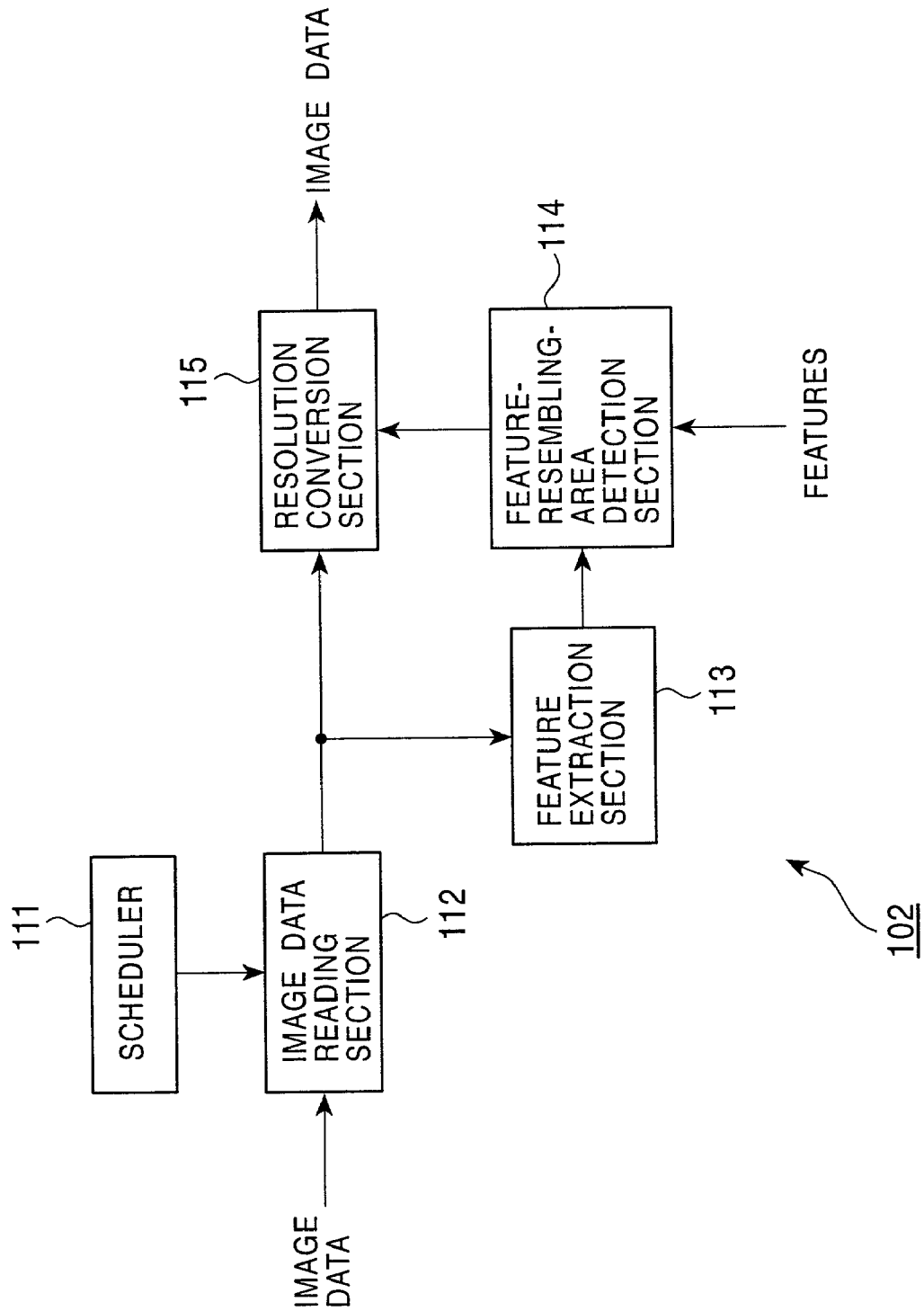
FIG. 21 is a block diagram showing an example of the construction of an image data processing section 102.

Next, FIG. 21 shows an example of the construction of the image data processing section 102 of FIG. 19.

A scheduler 111 performs scheduling for distributing image data by a push type, and controls an image data reading section 112 on the basis of the scheduling results. The image data reading section 112, under the control of the scheduler 111, reads image data to be transmitted, from the image database 101 and supplies the image data to a feature extraction section 113 and a resolution conversion section 115. The feature extraction section 113 divides the image data from the image data reading section 112 into small areas, and performs, for each small area, the same processing as that of the feature extraction section 106 of FIG. 19, thereby extracting the features thereof, and supplies the features to a feature-resembling-area detection section 114. The feature-resembling-area detection section 114 detects features resembling (similar to) the features with regard to the subject user, supplied from the feature retrieval section 108 (FIG. 19) from within the features supplied from the feature extraction section 113, and supplies the area information which specifies the area of the image data having the resembling features to the resolution conversion section 115. The resolution conversion section 115 converts the resolution of the area which is specified by the area information supplied from the feature-resembling-area detection section 114 within the area of the image data supplied from the image data reading section 112 into a high resolution, and outputs the high-resolution information.

Figure 22:
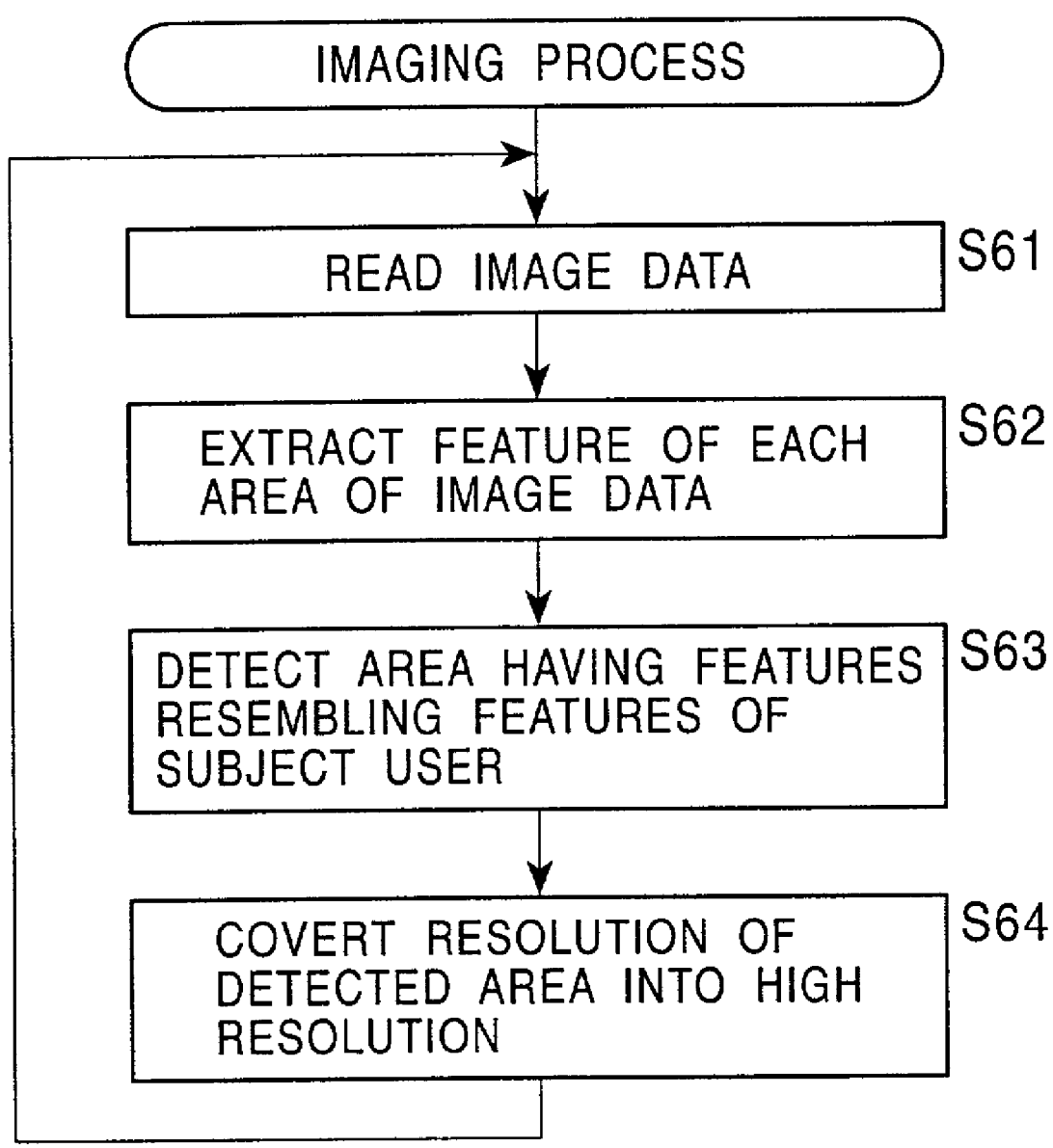
FIG. 22 is a flowchart illustrating the process of the image data processing section.

In the image data processing section 102 constructed in the manner described above, as shown in the flowchart in FIG. 22, initially, in step S61, the image data reading section 112, under the control of the scheduler 111, reads image data to be transmitted, from the image database 101, and supplies the image data to the feature extraction section 113 and the resolution conversion section 115. Thereafter, in step S62, the feature extraction section 113 divides the image data from the image data reading section 112 into small areas, extracts the features of each small area, and supplies the features to the feature-resembling-area detection section 114. In step S63, the feature-resembling-area detection section 114 detects, from within the features supplied from the feature extraction section 113, features resembling the features for the subject user, supplied from the feature retrieval section 108 (FIG. 19), and supplies the area information which specifies the area of the image data having the resembling features to the resolution conversion section 115. Then, in step S64, the resolution conversion section 115 recognizes the area specified by the area information supplied from the feature-resembling-area detection section 114 from the image data supplied from the image data reading section 112, converts the resolution of that area into a high resolution, and outputs the high-resolution information. Alternatively, in contrast, the resolution conversion section 115 may convert an area other than a specified area into a low resolution by subsampling, etc.

As a result, the data of the image is provided to the subject portable terminal 1 of the subject user in such a form as that described in FIGS. 9A and 9B.

Thereafter, the process returns to step S61, and hereafter, the same processing is repeated.

As described above, in the content server 7, the preference of the subject user is recognized by not only the click data from the subject user, but also by taking, as well, into account the click data from a user having the same preference. Then, for the image data for which an object, etc., which is of interest to the subject user, is displayed, the resolution of the area where the object is displayed is converted into a high resolution or an area other than that area is converted into a low resolution, and is provided to the subject user.

Therefore, it is possible to quickly estimate the preference of the subject user on the basis of the click data from the user having the same preference and to provide the image data in a form appropriate for the preference of the subject user. It is also possible for the subject user to obtain image data having a higher resolution with respect to an object which is of interest to the subject user by merely clicking a display portion of the object, etc., which is of interest to the subject user with the trackball 22.

Here, when a user clicks a certain position in the image, it is possible to convert the resolution of the area corresponding to that click position of a frame to be transmitted after the clicking, corresponding to that click position, into a high resolution, and to provide the high resolution information to the user.

Furthermore, in this case, it is possible to extract another user who clicked the position in the image, close in terms of time and space to the position in the image, at which the subject user clicked on, as having the same preference as that of the subject user. Then, when, thereafter, the other user having the same preference as that of the subject user (hereinafter referred to as a "same preference user" where appropriate) clicks a certain position in the image, even if the subject user has not performed a clicking, it is possible to convert the resolution of the area containing the position of the frame to be transmitted thereafter, corresponding to the position at which the same preference user clicked, into a high resolution, and to provide the high resolution information to the subject user.

In this case, when one or more of a plurality of users having the same preference clicks a certain position in the image, not only is the image in which the resolution of a predetermined area is improved provided to the one or more users, but also, in a similar manner, an image in which the resolution of a predetermined area is improved is provided to another user having the same preference. Also, in this case, in the content server 7, it is only necessary to provide the same image as that to be provided to the user who performed a clicking to another user having the same preference. Therefore, since it is not required to extract the features of the image to be transmitted, the burden on processing can be reduced.

For the conversion of a resolution in the resolution conversion section 115, for example, a classification adaptation process proposed earlier by the applicant of the present invention can be adopted.

The class classification adaptive process is formed of a class classification process and an adaptive process. The class classification process classifies data based on the properties thereof and performs an adaptive process for each class, and the adaptive process is of a technique such as that described below.

More specifically, in the adaptive process, for example, by using a linear combination of the pixels forming a standard-resolution or low-resolution image (SD (Standard Density) image) (hereinafter referred to as an "SD image" where appropriate) and predetermined prediction coefficients, the predictive values of the pixels of a high-resolution image (HD (High Density) image) in which the resolution of the SD image is improved are determined, thereby obtaining an image in which the resolution of the SD image is improved.

Specifically, for example, assuming that a certain HD image is teacher data and an SD image in which the resolution of that HD image is degraded is student data, it is considered to determine a predictive value E[y] of a pixel value y of the pixels (hereinafter referred to as "HD pixels" where appropriate) which form the HD image by a linear first-order combination model which is defined by a linear combination of the set of pixel values $x_1, x_2, \ldots$ of several SD pixels (pixels which form the SD image) and predetermined prediction coefficients $w_1, w_2, \ldots$. In this case, the predictive value E[y] can be expressed by the following equation:

$$E[y] = w_1 x_1 + w_2 x_2 + \ldots \quad (1)$$

In order to generalize equation (1), if a matrix W composed of a set of prediction coefficients $w_j$, a matrix X composed of a set of student data $x_{ij}$, and a matrix Y' composed of a set of predictive values $E[y_j]$ are defined based on the equations below, $$X = \begin{bmatrix} x_{11} & x_{12} & \ldots & x_{1J} \\ x_{21} & x_{22} & \ldots & x_{2J} \\ \ldots & \ldots & \ldots & \ldots \\ x_{I1} & x_{I2} & \ldots & x_{IJ} \end{bmatrix}$$

$$W = \begin{bmatrix} W_1 \\ W_2 \\ \ldots \\ W_J \end{bmatrix}, \quad Y' = \begin{bmatrix} E[y_1] \\ E[y_2] \\ \ldots \\ E[y_I] \end{bmatrix}$$

the following observation equation holds:

$$XW = Y' \quad (2)$$

where a component $x_{ij}$ of the matrix X indicates the j-th student data within the set of the i-th student data (the set of the student data used to predict the i-th teacher data $y_i$), and a component $w_j$ of the matrix W indicates the prediction coefficient by which the product with the j-th student data within the set of the student data is computed. Also, $y_i$ indicates the i-th teacher data. Therefore, $E[y_i]$ indicates the predictive value of the i-th teacher data. y in the left side of equation (1) is such that the subscript i of the component $y_i$ of the matrix Y is omitted. Also, $x_1, x_2, \ldots$ in the right side of equation (1) is also such that the subscript i of the component $x_{ij}$ of the matrix X is omitted.

Then, the least square method is applied to this observation equation in order to determine the predictive value E[y] close to the pixel values y of the HD pixels. In this case, if the matrix Y composed of the set of the true pixel values y of the piHD xels, which are teacher data, and a matrix E composed of the residual e of the predictive value E[y] with respect to the pixel value y of the HD pixel are defined as shown below, $$E = \begin{bmatrix} e_1 \\ e_2 \\ \ldots \\ e_I \end{bmatrix}, Y = \begin{bmatrix} y_1 \\ y_2 \\ \ldots \\ y_I \end{bmatrix}$$

a residual equation such as that described below holds based on equation (2):

$$XW = Y + E \quad (3)$$

In this case, the prediction coefficient $w_j$ for determining the predictive value E[y] close to the pixel value y of the HD pixel can be determined by minimizing the square error:

$$e_1 \frac{\partial e_1}{\partial w_j} + e_2 \frac{\partial e_2}{\partial w_j} + \ldots + e_I \frac{\partial e_I}{\partial w_j} = 0 \quad (j = 1, 2, \ldots, J)$$

Therefore, when the above-mentioned square error differentiated by the prediction coefficient $w_j$ becomes 0, it follows that the prediction coefficient $w_j$ which satisfies the following equation is the optimum value for detecting the predictive value E[y] close to the pixel value y of the HD pixel.

$$\sum_{i=1}^{I} e_i^2$$

Therefore, first, by differentiating equation (3) by the prediction coefficient $w_j$, the following equation holds:

$$\frac{\partial e_i}{\partial w_1} = x_{i1}, \frac{\partial e_i}{\partial w_2} = x_{i2}, \ldots, \frac{\partial e_i}{\partial w_J} = x_{iJ} \quad (i = 1, 2, \ldots, I) \quad (4)$$

Based on equations (4) and (5), equation (6) is obtained:

$$\sum_{i=1}^{I} e_i x_{i1} = 0, \sum_{i=1}^{I} e_i x_{i2} = 0, \ldots, \sum_{i=1}^{I} e_i x_{iJ} = 0 \quad (5)$$

Furthermore, when the relationships among the student data $x_{ij}$, the prediction coefficient $w_j$, the teacher data $y_i$, and the residual $e_i$ in the residual equation of equation (3) are taken into consideration, the following normalized equation can be obtained based on equation (6):

$$\begin{cases} \left(\sum_{i=1}^{I} x_{i1}x_{i1}\right)w_1 + \left(\sum_{i=1}^{I} x_{i1}x_{i2}\right)w_2 + \ldots + \left(\sum_{i=1}^{I} x_{i1}x_{iJ}\right)w_J = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \ldots + \left(\sum_{i=1}^{I} x_{i2}x_{iJ}\right)w_J = \left(\sum_{i=1}^{I} x_{i2}y_i\right) \\ \ldots \\ \left(\sum_{i=1}^{I} x_{iJ}x_{i1}\right)w_1 + \left(\sum_{i=1}^{I} x_{iJ}x_{i2}\right)w_2 + \ldots + \left(\sum_{i=1}^{I} x_{iJ}x_{iJ}\right)w_J = \left(\sum_{i=1}^{I} x_{iJ}y_i\right) \end{cases} \quad (6)$$

If a matrix (covariance matrix) A and a vector v are defined as shown below:

$$A = \begin{pmatrix} \sum_{i=1}^{I} x_{i1}x_{i1} & \sum_{i=1}^{I} x_{i1}x_{i2} & \ldots & \sum_{i=1}^{I} x_{i1}x_{iJ} \\ \sum_{i=1}^{I} x_{i2}x_{i1} & \sum_{i=1}^{I} x_{i2}x_{i2} & \ldots & \sum_{i=1}^{I} x_{i2}x_{iJ} \\ & & \ldots & \\ \sum_{i=1}^{I} x_{iJ}x_{i1} & \sum_{i=1}^{I} x_{iJ}x_{i2} & \ldots & \sum_{i=1}^{I} x_{iJ}x_{iJ} \end{pmatrix} \quad v = \begin{pmatrix} \sum_{i=1}^{I} x_{i1}y_i \\ \sum_{i=1}^{I} x_{i2}y_i \\ \ldots \\ \sum_{i=1}^{I} x_{iJ}y_i \end{pmatrix} \quad (7)$$

and if a vector W is defined as shown in equation (1), the normalized equation shown in equation (7) can be expressed by the following equation $$AW = v \quad (8)$$

Each normalized equation in equation (7) can be formulated by the same number as the number J of the prediction coefficient $w_j$ to be determined by preparing the set of the student data $x_{ij}$ and the teacher data $y_i$ by a certain degree of number. Therefore, solving equation (8) with respect to the vector W (however, to solve equation (8), it is required that the matrix A in equation (8) be regular) enables the optimum prediction coefficient $w_j$ to be determined. When solving equation (8), for example, a sweeping-out method (Gauss-Jordan's elimination method), etc., can be used.

It is the adaptive process that, in the above-described manner, the optimum prediction coefficient $w_j$ is determined in advance, and the prediction coefficient $w_j$ is used to determine, based on equation (1), the predictive value E[y] close to the pixel value y of the HD pixel.

Here, the adaptive process differs from, for example, a mere interpolation process in that components which are not contained in the SD image, but are contained in the HD image are reproduced. That is, in the adaptive process, as long as only equation (1) is seen, it looks the same as an interpolation process using a commonly called interpolation filter. However, since the prediction coefficient w equivalent to a tap coefficient of the interpolation filter is determined by, so to speak, learning, using the teacher data y, the components contained in the HD image can be reproduced. From this fact, the adaptive process can be said to be a process having, so to speak, an image creation (resolution creation) operation.

Here, although the resolution of an area which is of interest to the subject user is improved, additionally, it is also possible to prestore image data having a high resolution in the image database 101 and to relatively improve the resolution of the area for which the subject user is interested in by decreasing, using a low-pass filter, the resolution of the image data of other than the area which is of interest to the subject user. Furthermore, it is also possible to improve the resolution of image data by providing to the subject user, rather than the image data itself having an improved resolution, a prediction coefficient for improving the resolution by a classification adaptive process and by performing the classification adaptive process using the prediction coefficient in the portable terminal 1.

Figure 23:
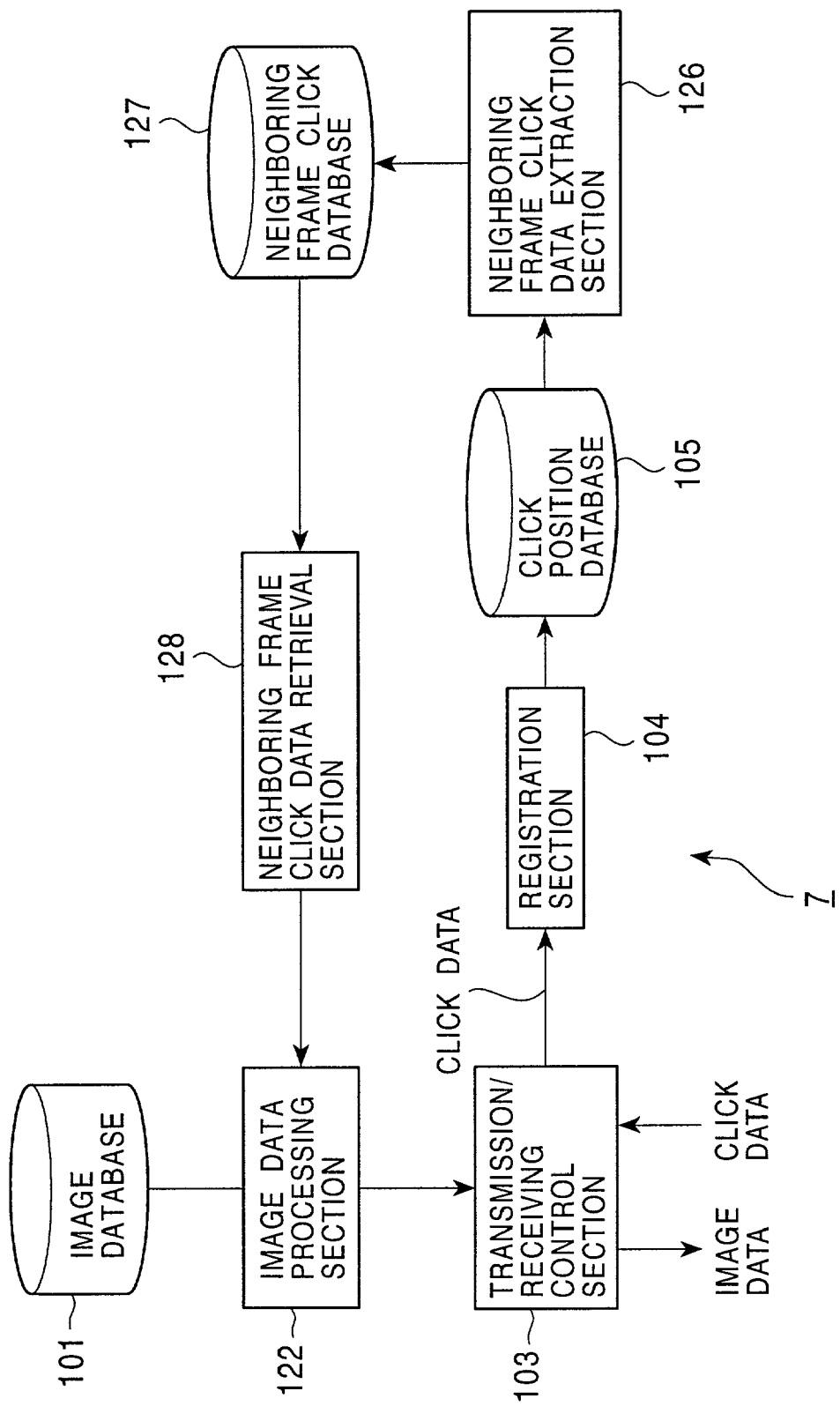
FIG. 23 is a block diagram showing an example of a second functional construction of the content server 7 which provides image data.

Next, FIG. 23 shows an example of a second functional construction of the content server 7, which provides, as contents, image data of moving pictures, such as movies. Components in FIG. 23 corresponding to the case in FIG. 19 are given the same reference numerals, and descriptions thereof are omitted where appropriate.

In the content server 7 of FIG. 23, an image data processing section 122, a neighboring frame click data extraction section 126, a neighboring frame click database 127, and a neighboring frame click data retrieval section 128 correspond to the content processing section 72, the analysis section 76, the analysis information database 77, and the retrieval section 78 in FIG. 11, respectively.

More specifically, the image data processing section 122 reads image data from the image database 101, processes the image data in accordance with the click data from the neighboring frame click data retrieval section 128, and supplies the data to the transmission/receiving control section 103.

The neighboring frame click data extraction section 126 extracts, from the click data of a plurality of users, stored in the click position database 105, data for a frame which is close in terms of time to the click position indicated by the click data for the subject user. Furthermore, the neighboring frame click data extraction section 126 adds the extracted click data to the click data for the subject user, and causes the click data correspond to the user ID of the subject user, supplies the data to the neighboring frame click database 127, whereby the data is stored.

Therefore, in this case, together with the click data indicating the click position in the image data, which was directly selected by the user, the click data indicating the click position in the image data, selected by another user, of a frame close to that click position is registered in the neighboring frame click database 127 in such a manner as to correspond to the user ID of the subject user.

The neighboring frame click database 127, as described above, stores the set of the click data supplied from the neighboring frame click data extraction section 126 and the user ID, retrieves the click data which is made to correspond to the user ID of the subject user from the neighboring frame click database 127, and supplies the click data to the image data processing section 122.

Figure 24:
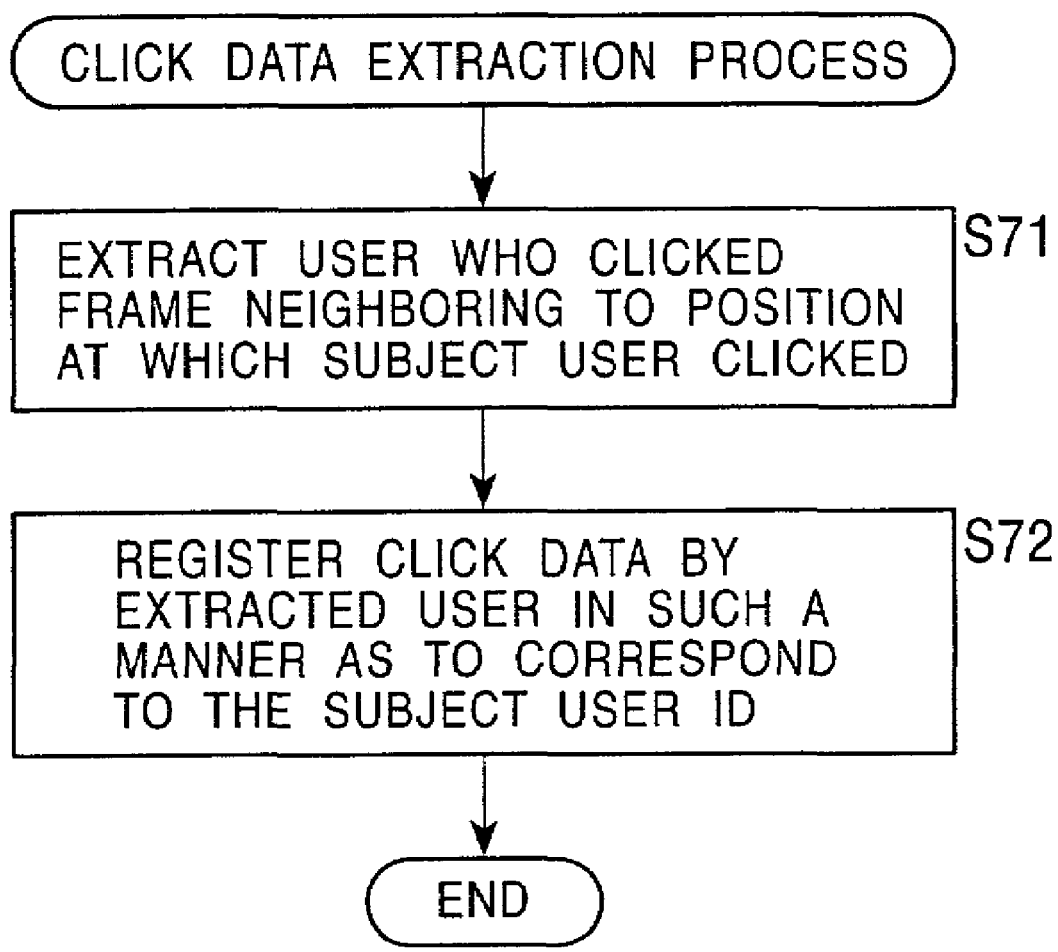
FIG. 24 is a flowchart illustrating the process of a neighboring frame click data extraction section 126.

Next, referring to the flowchart in FIG. 24, a process of the neighboring frame click data extraction section 126 of FIG. 23 is described.

Initially, in step S71, the neighboring frame click data extraction section 126 reads, from the click position database 105, click data for the subject user (the click data which is made to correspond to the user ID of the subject user), and extracts another user for which click data such that a position close in terms of time to the click position indicated by that click data is registered. Then, the process proceeds to step S72, whereby the neighboring frame click data extraction section 126 adds the click data for the extracted user to the click data for the subject user, causes the click data to correspond to the user ID of the subject user, supplies the data to the neighboring frame click database 127, whereby the data is stored, and the processing is terminated.

The neighboring frame click data extraction section 126 performs processes by assuming in sequence all the users whose user IDs are registered in the click position database 105 to be a subject user.

Figure 25:
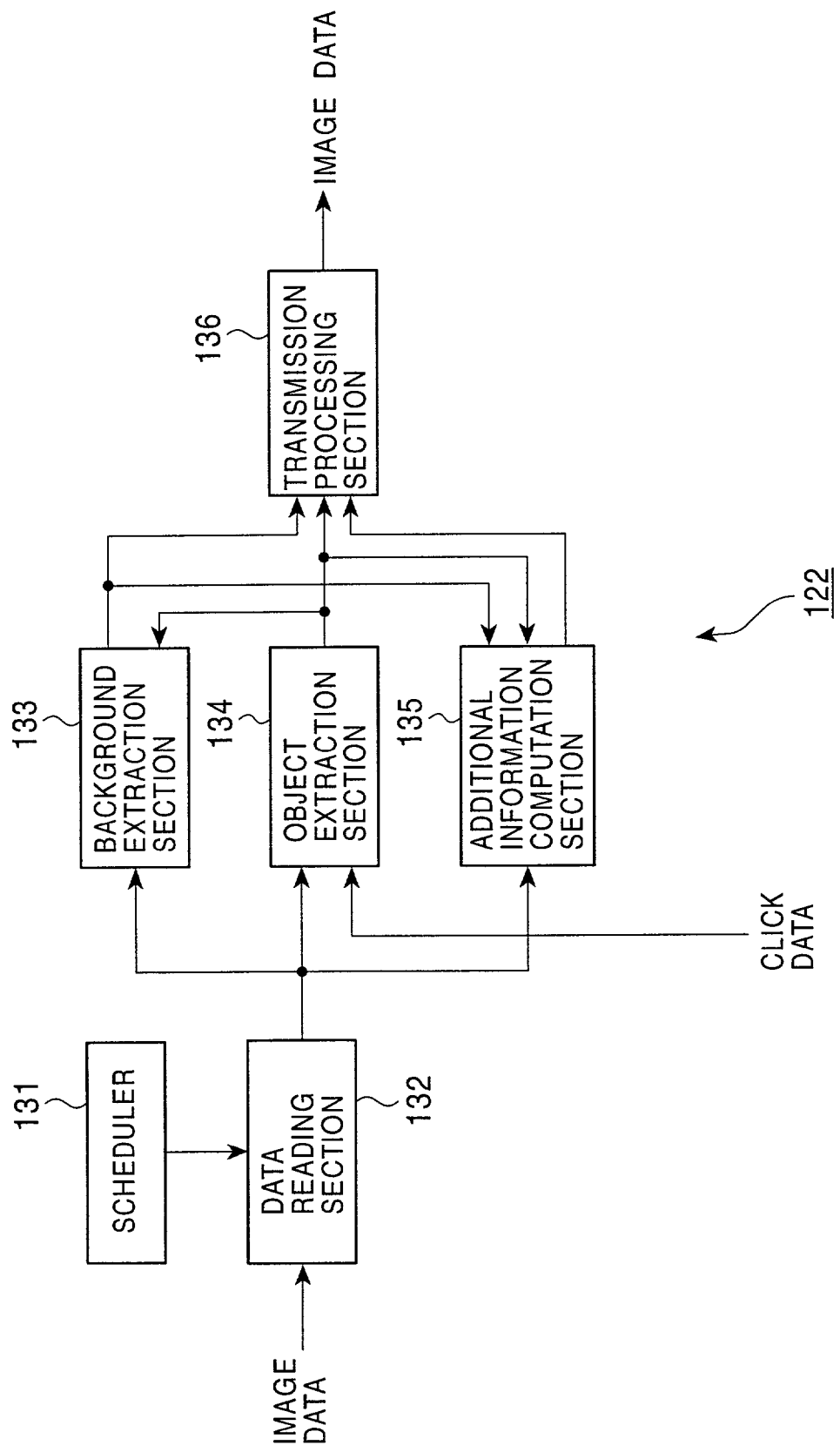
FIG. 25 is a block diagram showing an example of the construction of an image data processing section 122.

Next, FIG. 25 shows an example of the construction of the image data processing section 122 of FIG. 23.

A scheduler 131 performs scheduling in which image data is distributed by a push type, and controls an image data reading section 132 on the basis of the scheduling results. The image data reading section 132, under the control of the scheduler 131, reads image data to be transmitted, from the image database 101, and supplies the image data to a background extraction section 133, an object extraction section 134, and an additional information computation section 135.

Based on the click data supplied from the neighboring frame click data retrieval section 128, the object extraction section 134 extracts (specifies) an image area, to which the user of the portable terminal 1 pays attention, within the image from the image data reading section 132, as an object area of interest, and supplies the image data corresponding to the extracted (specified) object area of interest to a transmission processing section 136. When there is a plurality of object areas of interest to which the user of the portable terminal 1 pays attention in the image supplied from the image data reading section 132, the object extraction section 134 supplies the image data of the plurality of object areas of interest to the transmission processing section 136. Furthermore, the image data of the object area of interest, extracted by the object extraction section 134, is also supplied to the additional information computation section 135.

Here, examples of object areas of interest to which the user pays attention include objects such as bodies. A description is given below by taking, as an example, a case in which an object (hereinafter referred to as an "object image" where appropriate) as an example of an object area of interest is extracted in the object extraction section 134. However, the object area of interest need not necessarily be an object, and may be an image area other than an object, an image area within an object, a background image portion (to be described later), etc. A description of the details of an object extraction (specification of an object area of interest) process performed in the object extraction section 134 will be described later.

Based on the object extraction results by the object extraction section 134, the background extraction section 133 extracts, from the image data supplied from the image data reading section 132, a signal (hereinafter referred to as "background image data") corresponding to a background portion of the image (an image area other than the object area of interest, hereinafter referred to as a "background image"), and supplies the extracted background image data to the transmission processing section 136 and the additional information computation section 135. That is, in this embodiment, the background extraction section 133 extracts, as a background image, the rest such that the object image output by the object extraction section 134 is excluded from the image data output by the image data reading section 132.

Based on the background image data supplied from the background extraction section 133, the additional information computation section 135 detects a background motion vector indicating the motion of the background (the motion of the background due to the photo-taking direction of the image data reading section 132 being moved during the photo-taking of an image), and detects an object motion vector indicating the motion of the object based on the image data of the object image (hereinafter referred to as "object image data") supplied from the object extraction section 134, and supplies these motion vectors, as one piece of additional information, to the transmission processing section 136. Furthermore, the additional information computation section 135, based on the object image data supplied from the object extraction section 134, also supplies to the transmission processing section 136, as additional information, information related to an object such as the position in time and space, the contour, etc., of the object within the image (frame) photo-taken by the video camera section of the image data reading section 132. For example, the object extraction section 134 also extracts information related to an object, such as the position, the contour, etc., of an object, when the object image is extracted, and supplies the information to the additional information computation section 135. The additional information computation section 135 outputs the information related to that object as additional information as well.

The transmission processing section 136 performs coding of object on the image data in accordance with the object image data from the object extraction section 134, the background image data from the background extraction section 133, and the additional information from the transmission processing section 136, and outputs the data.

Figure 26:
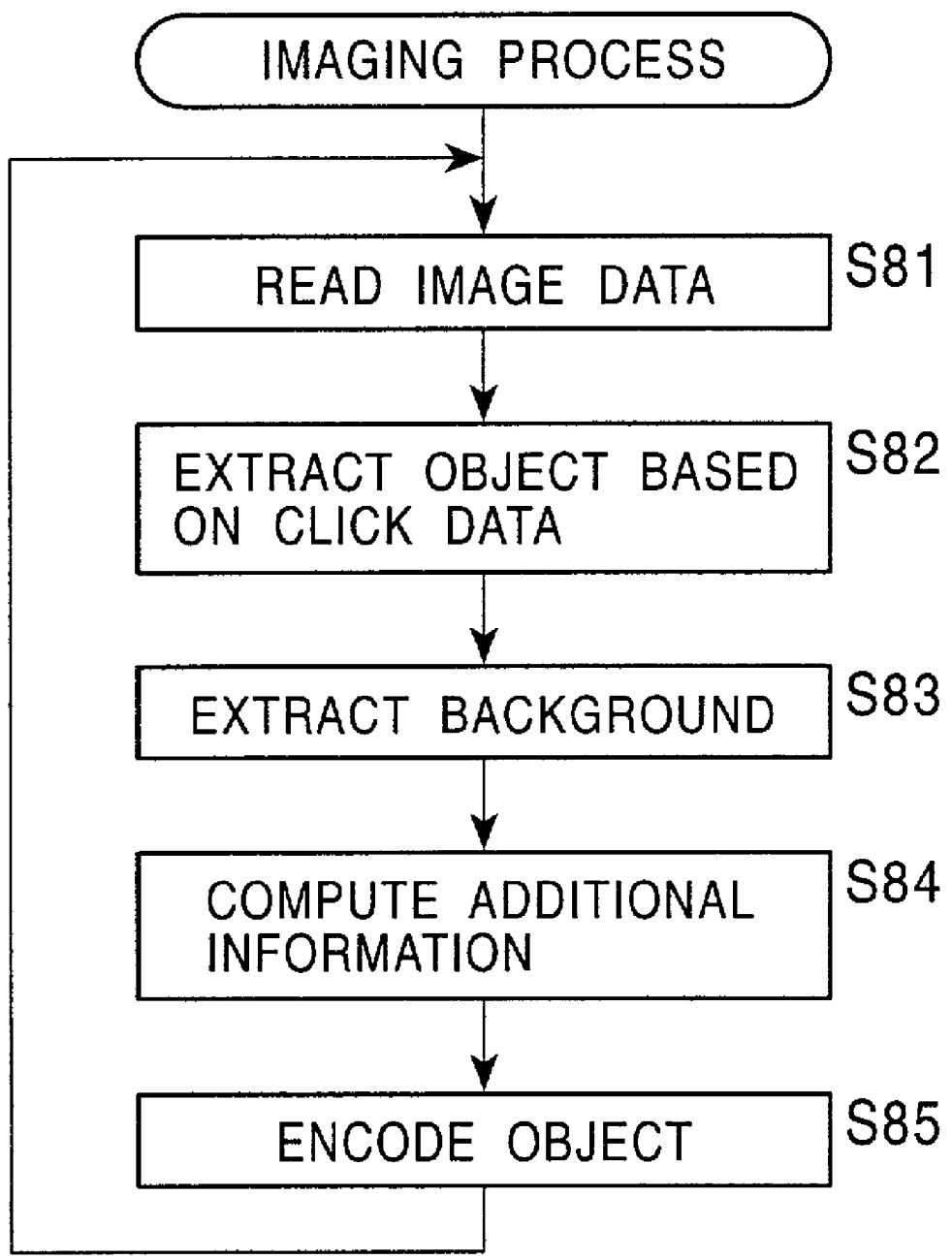
FIG. 26 is a flowchart illustrating the process of the image data processing section 122.

In the image data processing section 122 constructed in the manner described above, as shown in the flowchart in FIG. 26, initially, in step S81, the image data reading section 132, under the control of the scheduler 131, reads image data to be transmitted, from the image database 101, and supplies the image data to the background extraction section 133, the object extraction section 134, and the additional information computation section 135. Then, the process proceeds to step S82, whereby the object extraction section 134 extracts, from the image data from the image data reading section 132, object image data on the basis of the click data for the subject user, supplied from the neighboring frame click data retrieval section 128, and supplies the object image data to the background extraction section 133, the additional information computation section 135, and the transmission processing section 136.

In step S83, the background extraction section 133 extracts background image data by subtracting the object image data supplied from the object extraction section 134, from the image data supplied from the image data reading section 132, and supplies the background image data to the additional information computation section 135 and the transmission processing section 136.

In step S84, the additional information computation section 135 computes additional information on the basis of the output of the image data reading section 132, the background extraction section 133, and the object extraction section 134, and supplies the additional information to the transmission processing section 136.

In step S85, the transmission processing section 136 performs coding of object on the image data read by the image data reading section 132 from the image database 101 on the basis of the object image data from the object extraction section 134, the background image data from the background extraction section 133, and the additional information from the additional information computation section 135, and outputs the data.

As a result, the data of the images is provided to the subject portable terminal 1 of the subject user in such a form as that described in FIGS. 10A and 10B.

Thereafter, the process returns to step S81, and the same processes are hereafter repeated.

As described above, in the content server 7, the click position by another user, which is close in terms of time to the click position clicked by the subject user, is extracted, an object is extracted not only by the click position by the subject user, but also by taking into account the click position by the other user as well, and the object is provided to the subject user.

Therefore, based on the click data from a plurality of users who clicked the same object, the object clicked by the subject user can be quickly extracted and provided to the subject user. Also, it is possible for the subject user to obtain image data for an object which is of interest to the subject user (object image data) by clicking a display portion of the object which is of interest to the subject user with the trackball 22.

Next, a description is given of a method of extracting an object in the object extraction section 134.

Figure 27:
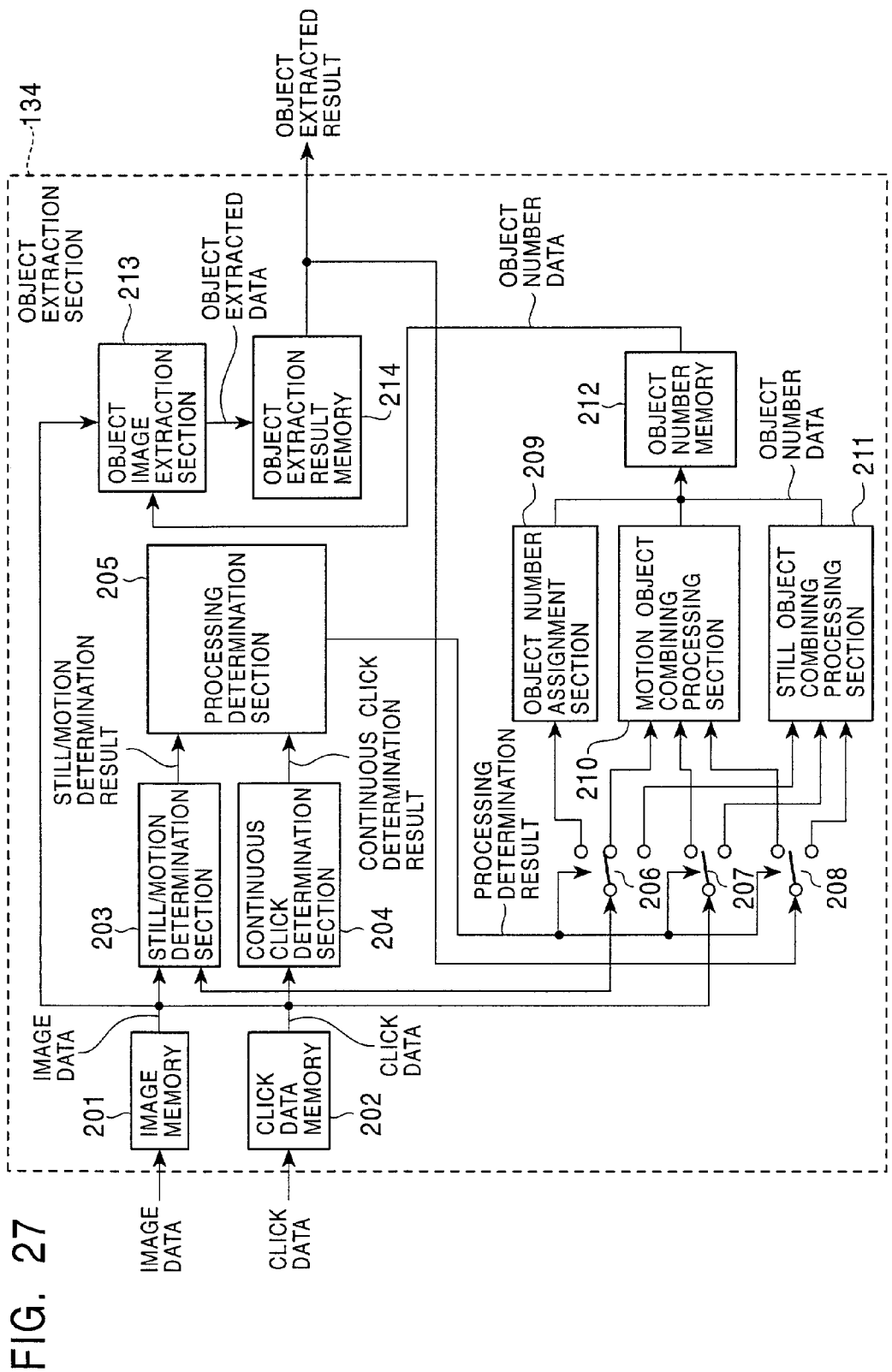
FIG. 27 is a block diagram showing an example of the construction of an object extraction section 134.

FIG. 27 shows an example of the construction of the object extraction section 134 of FIG. 25.

Image data supplied from the image data reading section 132 is stored in an image memory 201. The image data stored in the image memory 201 is read therefrom and is sent to a still/motion determination section 203, an object image extraction section 213, and a common terminal of a selection switch 207. In the image memory 201, image data for at least several frames, which is required during still/motion determination performed by the still/motion determination section 203 at a later stage, is stored.

Also, the click data supplied from the neighboring frame click data retrieval section 128 is stored in a click data memory 202. Then, the click data is read from the click data memory 202 and is sent to the still/motion determination section 203, a continuous click determination section 204, and a common terminal of a selection switch 206 In this click data memory 202, click data for a predetermined period of time (for example, 500 to 700 msec or more), which is required during continuous click determination in the continuous click determination section 204 at a later stage, is stored.

The still/motion determination section 203 pays attention to predetermined data within the click data stored in the click data memory 202 and reads the subject click data to which attention was paid. Furthermore, the still/motion determination section 203 makes a still/motion determination as to whether an image area of a small local block (for example, 16×16 pixels) in which the click position indicated by the subject click data (the coordinate values in the image) is the center is a motion area in which there is a motion, or a still area in which there is no motion. That is, the still/motion determination section 203 determines an inter-frame difference between an image area which is previous by several frames and the image area of the current frame with respect to the 16×16 pixels with the click position being as the center, and performs a still/motion determination in which, when this inter-frame difference is less than or equal to a predetermined threshold value, the block is determined to be a still and when this inter-frame difference is greater than the predetermined threshold value, the block is determined to be a motion. When the image to be used is a color image, it is possible that during a still/motion determination, for example, an inter-frame difference is determined for an image of 16×16 pixels of each of R, G, and B, and when the average value of the absolute values of the inter-frame difference determined for each of R, G, and B is less than or equal to a predetermined threshold value (for example, 10), the block is determined to be a still, and when the average value is greater than the predetermined threshold value, the block is determined as a motion. When the block is determined to be a still by the still/motion determination, the still/motion determination section 203 assumes that the subject click data is a still click (a click in a still area). When the block is determined to be a motion by the still/motion determination, the still/motion determination section 203 assumes that the subject click data is a motion click (a click in a motion area). The information indicating the still click or the motion click is sent as the still/motion determination result to the processing determination section 205.

The continuous click determination section 204 performs, based on the click time of the subject click data, a continuous click determination as to whether or not the click operation performed by the user is a continuous click operation. That is, as the continuous click determination, the continuous click determination section 204 determines the time difference (the click time interval) between the click time of the subject click data and the click time of the click data which is immediately before that (previous to that), and determines that the click operation is a continuous click when the time difference is less than or equal to a predetermined threshold value, and determines that the click operation is not the continuous click when the time difference is greater than the predetermined threshold value. Then, when it is determined based on the continuous click determination that the click operation is a continuous click, the continuous click determination section 204 assumes the subject click data to be a continuous click. When, on the other hand, it is determined based on the continuous click determination that the click operation is not a continuous click (the time difference between the click times is greater than the predetermined threshold value), the continuous click determination section 204 assumes the subject click data to be a noncontinuous click, and sends the information of the continuous click or the noncontinuous click, as the continuous click determination result, to the processing determination section 205.

The processing determination section 205 performs switching control of the selection switches 206 to 208 based on the still/motion determination result from the still/motion determination section 203 and the continuous click determination result from the continuous click determination section 204.

More specifically, for example, when it is determined that the subject click data indicates a still click and a continuous click on the basis of the still/motion determination result and the continuous click determination result, the processing determination section 205 performs switching control of the selection switch 206 so that the subject click data is sent to a still object combining processing section 211, and performs switching control of the selection switch 207 so that the image data output from the image memory 201 is sent to the still object combining processing section 211. Furthermore, the processing determination section 205 performs switching control of the selection switch 208 so that the previous click data output from an object extraction result memory 214 (to be described later), an object number (a number which classifies (identifies) an object) which is assigned to the click data, and, and object image data corresponding to the object number are sent to the still object combining processing section 211.

Also, when it is determined based on the still/motion determination result and the continuous click determination result that the subject click data indicates a motion click and a continuous click, the processing determination section 205 performs switching control of the selection switch 206 so that the subject click data is sent to the motion object combining processing section 210 and the image data output from the image memory 201 is sent to the motion object combining processing section 210. Furthermore, the processing determination section 205 performs switching control of the selection switch 208 so that the previous click data output from the memory 214 for object extraction results, an object number which is assigned to the click data, and object image data corresponding to the object number are sent to the motion object combining processing section 210.

Additionally, when it is determined based on the still/motion determination result and the continuous click determination result that the subject click data indicates a still click and a noncontinuous click (a click such that the time difference between the click times is greater than or equal to a predetermined threshold value), the processing determination section 205 performs switching control of the selection switch 208 so that the subject click data is sent to the object number assignment section 209 and performs switching control of the selection switch 207 so that the image data output from the image memory 201 is sent to the still object combining processing section 211. At this time, switching control is performed on the selection switch 208 (the selection switch 208 is placed in an open state) so that the previous click data output from the memory 214 for object extraction results, the object number, and the object image data are not sent to the still object combining processing section 211.

When it is determined based on the still/motion determination result and the continuous click determination result that the subject click data indicates a motion click and a noncontinuous click (a click such that the time difference between the click times is greater than or equal to the predetermined threshold value), the processing determination section 205 performs switching control of the selection switch 206 so that the subject click data is sent to the object number assignment section 209, and performs switching control of the selection switch 207 so that the image data output from the image memory 201 is sent to the motion object combining processing section 210. At this time, switching control is performed on the selection switch 208 (the selection switch 208 is placed in an open state) so that the previous click data, the object number, and the object image data, output from the memory 214 for object extraction results, are not sent to the motion object combining processing section 210.

The object number assignment section 209 assigns a new object image to click data which is a noncontinuous click, other than that for the object of combining processing (to be described later) in the still object combining processing section 211 and the motion object combining processing section 210, and sends the object number and the click data to an object number memory 212.

When it is determined by the processing determination section 205 that the subject click data indicates a motion click and a continuous click, the motion object combining processing section 210 determines whether or not the previous click data is a motion click and whether or not the features of the image in the vicinity of the click position indicated by the subject click data are contained in the features of the area of the motion object image by the object number which is assigned to the previous click data or resemble those features. Then, when the determination result is true, the motion object combining processing section 210 determines that the subject click is such that the same object image is clicked on, and performs a motion object combining process for assigning the same object number as that of the previous click data, on the subject click data, and sends the object number and the subject click data to the object number memory 212.

When it is determined by the processing determination section 205 that the subject click data is a still click and a continuous click, the still object combining processing section 211 determines whether or not the previous click is a still click, and whether or not the click position indicated by the subject click data is contained within the area of the still object image formed by the object number which is assigned to the previous click data or is in the vicinity that area. Then, when the determination result is true, the still object combining processing section 211 determines that the subject click is such that the same object image as that by the previous click is clicked on, performs, on the subject click data, a still object combining process for assigning the same object number as that of the previous click data, and sends the object number and the subject click data to the object number memory 212.

The object number memory 212 stores click data corresponding to a plurality of previous frames to which the object number has been assigned in the object number assignment section 209, the motion object combining processing section 210, and the still object combining processing section 211, and sends the stored click data and the object number to the object image extraction section 213.

The object image extraction section 213 extracts, from the image data supplied from the image memory 201, a still object image, a motion object image, a background image, etc., on the basis of the click data for a plurality of previous frames to which the object number has been assigned, supplied from the object number memory 212 and supplies the extraction results to the memory 214 for object extraction results.

More specifically, the object image extraction section 213 determines a dominant object number within an image portion in which the density of the click data which has been determined to be a still click is high, on the basis of the click data for a plurality of previous frames to which the object number has been assigned, supplied from the object number memory 212. Then, the object image extraction section 213 creates object shapes on the basis of the distribution in the image of the click data to which that dominant object number is assigned, and extracts, from the image data, an image within the created object shapes, as an object image.

Furthermore, the object image extraction section 213 performs inter-frame pattern matching between images in the vicinity of the click position to which the same object number is assigned, within the click data which is determined to be a motion click, and performs motion compensation based on the matching result. Furthermore, the object image extraction section 213 determines the dominant object number, in which the click density is high, in the image area which is determined to resemble by pattern matching (the image area in which, so to speak, position alignment is performed by motion compensation). Then, the object image extraction section 213 creates object shapes on the basis of the distribution in the image of the click data to which the dominant object number is assigned, and extracts, as an object image, an image within the created shape of the objects from the image data.

Furthermore, the object image extraction section 213 assumes an image portion in which the click density of still clicks and motion clicks such as those described above to be a background image.

The memory 214 for object extraction results stores the object image data extracted by the object image extraction section 213 together with the click data, the object number, etc., and supplies them as necessary to a background extraction section 133 an additional information computation section 135, and a transmission processing section 136.

Next, referring to the flowchart in FIG. 28, a description is given below of the details of a process for extracting from image data an object image (an object area of interest) to which the user of the portable terminal 1 is interested in on the basis of click data in the object extraction section 135 shown in FIG. 27.

Initially, in step S131, the image memory 201 stores the image data of a frame (frame image data for each transmission time) input from the image data reading section 132 (FIG. 25). The image memory 201 stores image data for at least several frames, which becomes necessary during a still/motion determination process performed in step S131 at a later stage.

Also, in step S131, the click data memory 202 receives and stores the click data supplied from the neighboring frame click data retrieval section 128. In this click data memory 202, click data for at least a predetermined time (for example, 500 to 700 msec or more), which becomes necessary during a continuous click determination process performed in step S133 at a later stage, is stored.

Thereafter, the process proceeds to step S132, whereby it is determined whether or not click data which is not yet processed has been stored in the click data memory 202. When it is determined in step S132 that click data which is not yet processed does not exist in the click data memory 202, the process returns to step S131, whereby an input waiting state is reached. On the other hand, when it is determined in step S132 that there is click data which is not yet processed in the click data memory 202, the process proceeds to step S133 whereby, for example, the oldest click data within the click data which is not yet processed is assumed to be the subject click data, and a still/motion determination process and a continuous click determination process are performed on the target subject click data by the still/motion determination section 203 the continuous click determination section 204 and the processing determination section 205.

More specifically, in step S133 in a still/motion determination process, the still/motion determination section 203 uses click position (the coordinate values in the image) information contained in the subject click data in order to make a determination as to whether there is a motion in the image area of a small local block with the click position as the center or the block is still.

A more specific description will now be given. As shown in the flowchart in FIG. 29, initially, in step S141, when the process proceeds to the process of step S133 of FIG. 28 and has moved to the still/motion determination process, the still/motion determination section 203 reads the image data and the click data, which are stored in the image memory 201 and the click data memory 202, respectively, for several frames. That is, the still/motion determination section 203 reads the image data of several previous frames containing the frame of which a clicking corresponding to the subject click data was performed from the image memory 201, and reads the click data corresponding to the click which was performed on those several frames from the click data memory 202. When the image to be used is a color image, the still/motion determination section 203 reads R (red), G (green), and B (blue) image data of several frames, as shown in part (A) of FIG. 30.

Next, in step S142, the still/motion determination section 203 calculates the inter-frame difference between the image area which is one to several previous frames and the image area of the current frame with regard to a small local block composed of, for example, 16 pixels in the horizontal direction and 16 pixels in the vertical direction with the click position indicated by the current click data being as the center. When the image to be used is a color image, the still/motion determination section 203 in the process of step S142, determines the inter-frame difference with regard to the R, G, and B images, each being composed of 16×16 pixels, as shown in parts (B) and (C) of FIG. 30, and determines the average value of each absolute value of the inter-frame difference which is determined for each of R, G, and B.

Next, in the process of step S143, the still/motion determination section 203 determines whether or not the inter-frame difference value determined by the calculation in step S142 is less than or equal to a predetermined threshold value. Then, the process proceeds to step S144, whereby the still/motion determination section 203 determines that a small block containing the click position indicated by the subject click data (hereinafter referred to as a "current block" where appropriate) is still when the inter-frame difference value is less than or equal to the predetermined threshold value, and when, in contrast, the inter-frame difference is greater than the predetermined threshold value, the still/motion determination section 203 determines that there is a motion. Furthermore, when the still/motion determination section 203 determines that the current block is still, the click data corresponding to the image area of the current block which is determined to be still is assumed to be a still click, and when it is determined that there is a motion, the click data corresponding to the image area of the current block which is determined to be a motion is assumed to indicate a motion click, and the motion click data is output as a still/motion determination result.

Figure 30:
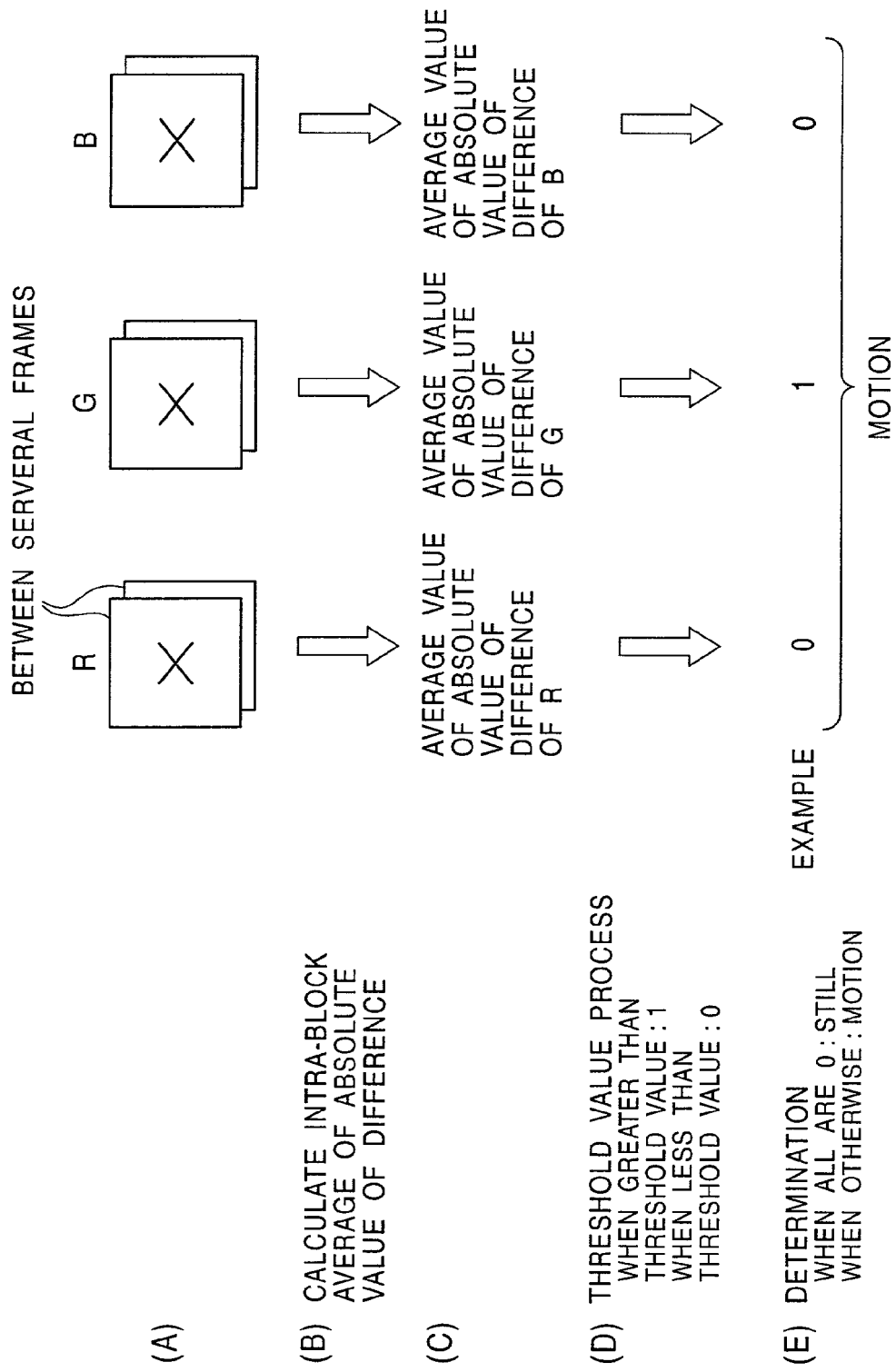
FIG. 30 illustrates a method for calculating an inter-frame difference.

In a case where the image to be used is a color image, when the average value of the absolute values of the inter-frame differences, which are determined for each current R, G, and B block, each being composed of 16×16 pixels, is less than or equal to a predetermined threshold value (for example, 10), for example, the still/motion determination section 203 sets a predetermined flag to "0" in step S144, as shown in part (D) of FIG. 30. When, in contrast, the average value is greater than the threshold value, for example, the still/motion determination section 203 sets the predetermined flag to "1". Furthermore, in step S144 as shown in part (E) of FIG. 30, the still/motion determination section 203 determines that the current block is still when all the predetermined flags which are set for each current R, G, and B block, each being composed of 16×16 pixels, are "0", and causes the click data corresponding to the image area of the current block which is determined to be still to indicate a still click. On the other hand, when any one of the predetermined flags which are set for each current R, G, and B block, each being composed of 16×16 pixels, is set to "1", the still/motion determination section 203 determines that there is a motion in the current block, and causes the click data, corresponding to the image area of the current block which is determined to be a motion, to indicate a motion click. Then, the still/motion determination section 203 outputs the information of the still click or the motion click as the still/motion determination result.

Referring back to FIG. 28, in step S133 the continuous click determination section 204 further performs a continuous click determination as to whether or not the click operation performed by the user is a continuous click operation on the basis of the click time contained in the subject click data.

Figure 31:
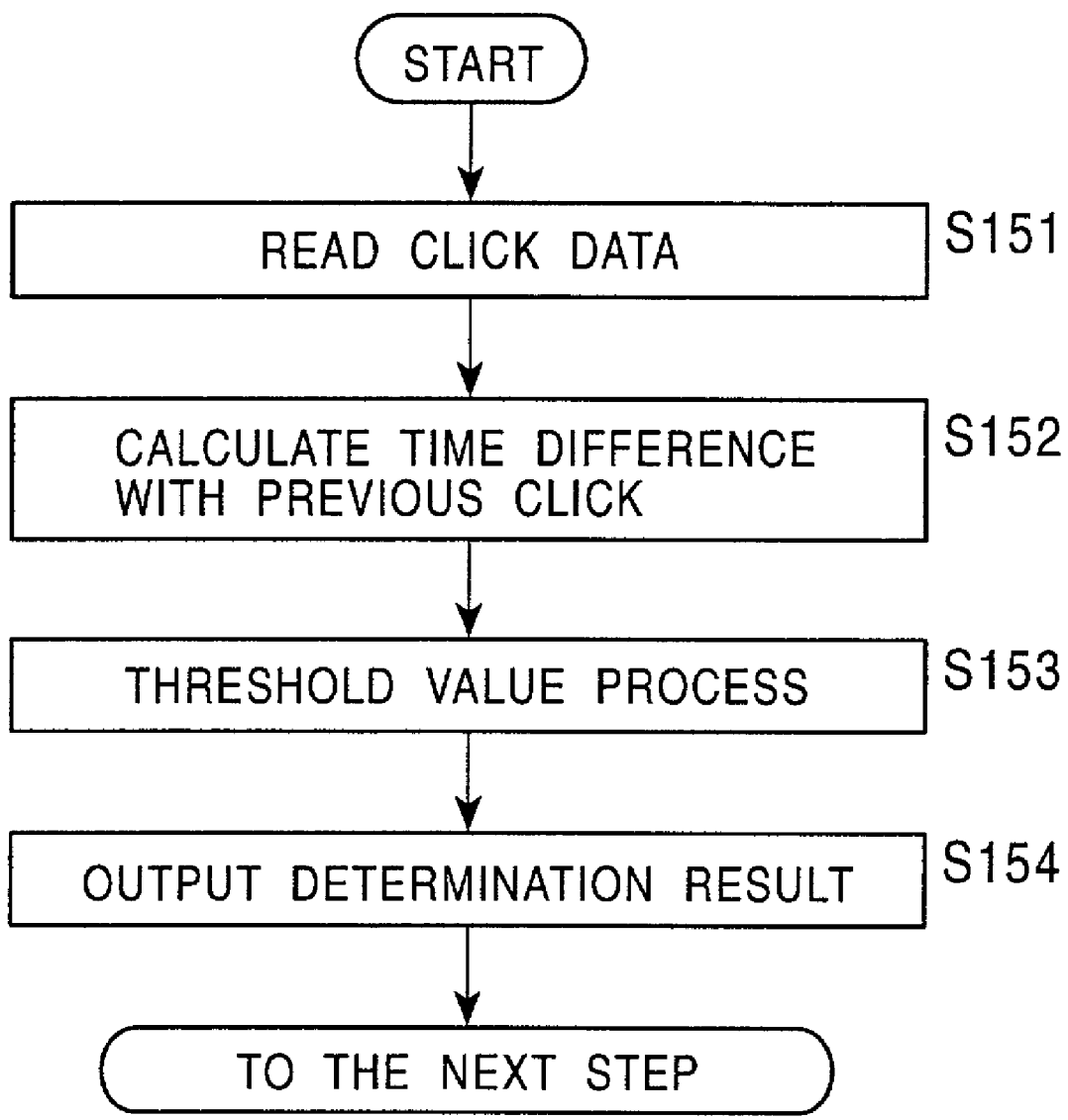
FIG. 31 is a flowchart illustrating a continuous click determination process.

A more specific description will now be given. As shown in the flowchart in FIG. 31, initially, in step S151, the continuous click determination section 204 in step S133 of FIG. 28 reads the click data stored in the click data memory 202.

Next, in step S152, the continuous click determination section 204 determines the time difference (the click interval) between the click time of the subject click data and the click time of the click data immediately before that (previous to that).

Next, in step S153, the continuous click determination section 204 makes a determination as to whether the time difference is less than or equal to a predetermined threshold value. When it is determined in step S153 that the time difference is less than or equal to the predetermined threshold value, the continuous click determination section 204 determines that the subject click data indicates a continuous click. When, on the other hand, the time difference is greater than the predetermined threshold value, the continuous click determination section 204 determines that the subject click data does not indicate a continuous click. Then, the continuous click determination section 204 proceeds to step S154, whereby information indicating a continuous click or a noncontinuous click is output as a continuous click determination result.

More specifically, when it is determined in step S153 that the subject click data is a continuous click, the possibility that the user is continuously performing a click operation on one particular object image is high. The reason for this is that there is a tendency for the user of the portable terminal 1 to continuously click an object image portion (an object area of interest) for which an improved spatial resolution is desired. Therefore, when it is determined in the continuous click determination process that the subject click data is a continuous click, the continuous click determination section 204 assumes that the current click data indicates a continuous click. When, on the other hand, it is determined that the subject click data is not a continuous click (the time difference between click times is greater than or equal to the predetermined threshold value), the continuous click determination section 204 assumes the subject click data to indicate a noncontinuous click, and outputs the data as a continuous click determination result.

Referring back to FIG. 28, when it is determined by the still/motion determination and the continuous click determination in step S133 in the still/motion determination section 203 and the continuous click determination section 204 that the subject click data is a continuous click and a still click, the processing determination section 205 controls the selection switches 206 to 208 in the above-described manner, so that, in step S135, the still object combining processing section 211 is made to perform a still object combining process. Furthermore, when it is determined that the subject click data indicates a continuous click and a motion click, the processing determination section 205 controls the selection switches 206 to 208, so that, in step S136, the motion object combining processing section 210 is made to perform a motion object combining process. Furthermore, when it is determined that the subject click data indicates a noncontinuous click, the processing determination section 205 controls the selection switch 206, so that, in step S134, the object number assignment section 209 is made to perform a new object number assignment process.

More specifically, when it is determined in step S133 that the subject click data indicates a noncontinuous click, the process proceeds to step S134, whereby the object number assignment section 209 assigns a new object number to the subject click data, and the process returns to step S131.

A description will now be given using a specific example. As shown in, for example, part (A) of FIG. 32, in a case where an object number which is assigned to previous click data CL1 indicated by the solid lined x mark in the figure is set to, for example, "0", when it is determined that subject click data CL2 indicated by the dotted lined x mark in part (A) of FIG. 32 (the click data before the object number is assigned) indicates a noncontinuous click, the object number assignment section 209 assigns a new object number ("1" in this example) to the current click data CL2 indicated by the solid lined x mark in part (B) of FIG. 32.

On the other hand, in a case where it is determined in step S133 that the subject click data indicates a continuous click and a still click, if the previous click is a still click and the click position indicated by the subject click data is contained within the image area formed by the object number which is assigned to the previous click data or is close to that area, the still object combining processing section 211 determines that a click corresponding to the subject click data is such that the same object image as that in which the previous click is contained was clicked on, and in step S135, the still object combining processing section 211 performs a still object combining process for assigning the same object number as that of the previous click data on the subject click data.

Figure 33:
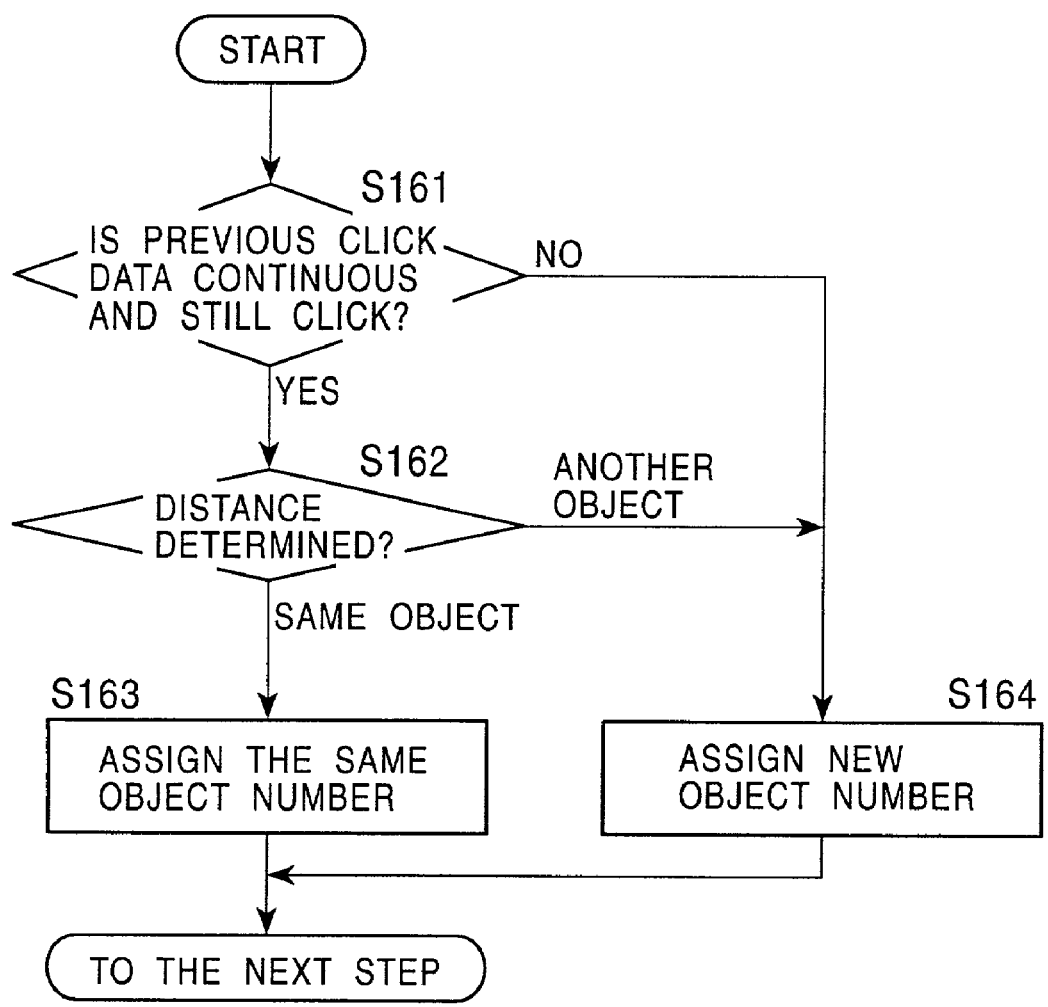
FIG. 33 is a flowchart illustrating a still object combining process.

More specifically, as shown in the flowchart in FIG. 33, initially, in step S161, the still object combining processing section 211 determines whether or not the previous click data (the click data which was previously made to be the subject click data) indicates a continuous click and a still click When it is determined in step S161 that the previous click data indicates a continuous click and a still click, the process proceeds to step S162, and when, on the other hand, it is determined that the previous click data does not indicate a continuous click and a still click, the process proceeds to the process of step S164.

Figure 32:
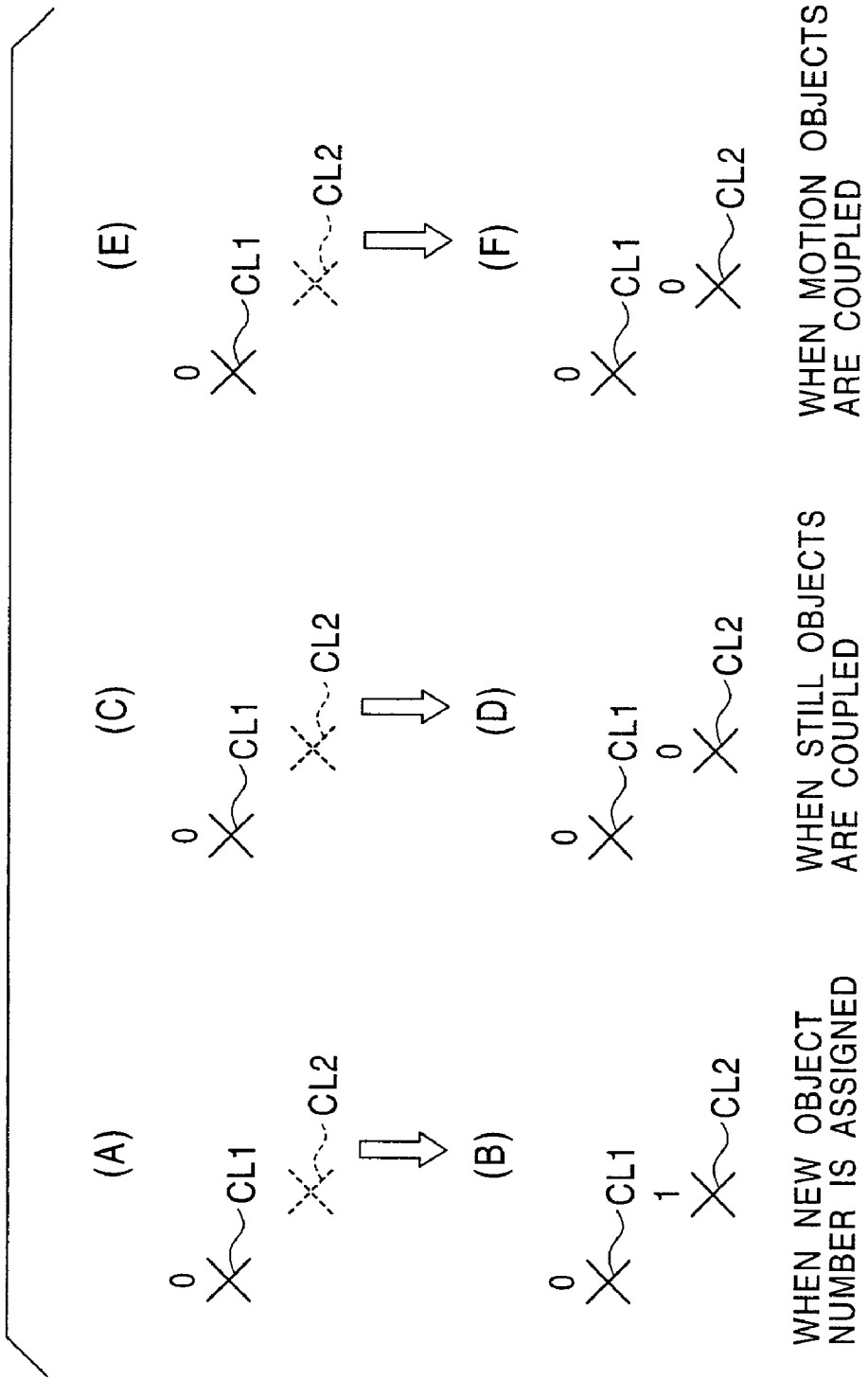
FIG. 32 illustrates a method for assigning an object number.

When it is determined in step S161 that the previous click data does not indicate a continuous click and a still click, in the process of step S164, the still object combining processing section 211 assigns a new object number to the subject click data in the same manner as described in parts (A) and (B) of FIG. 32. After the process of step S164, the process proceeds to the process of step S137 of FIG. 28.

Also, when it is determined in step S161 that the previous click data indicates a continuous click and a still click, and when the process proceeds to step S162, the still object combining processing section 211 determines a spatial distance between the click position indicated by the subject click data and the image area formed by the object number which is assigned to the previous click data. When, based on this distance, the click position indicated by the subject click data is contained in the image area formed by the object number which is assigned to the previous click data or is close to that area, it is determined that the subject click data indicates that the same object image as that in which the previous click is contained was clicked on. On the other hand, in a case where the click position indicated by the subject click data is not contained in the object image formed by the object number which is assigned to the previous click data and is far away from that area, the still object combining processing section 211 determines that the subject click data is such that an object image differing from that in which the previous click is contained was clicked on. When it is determined in step S162 that the subject click data is data indicating that the same object image as that in which the previous click is contained was clicked on, the process proceeds to step S163. When, on the other hand, it is determined that the subject click data is data indicating that an object image differing from that in which the previous click is contained was clicked on, the process proceeds to the process of step S164.

Figure 28:
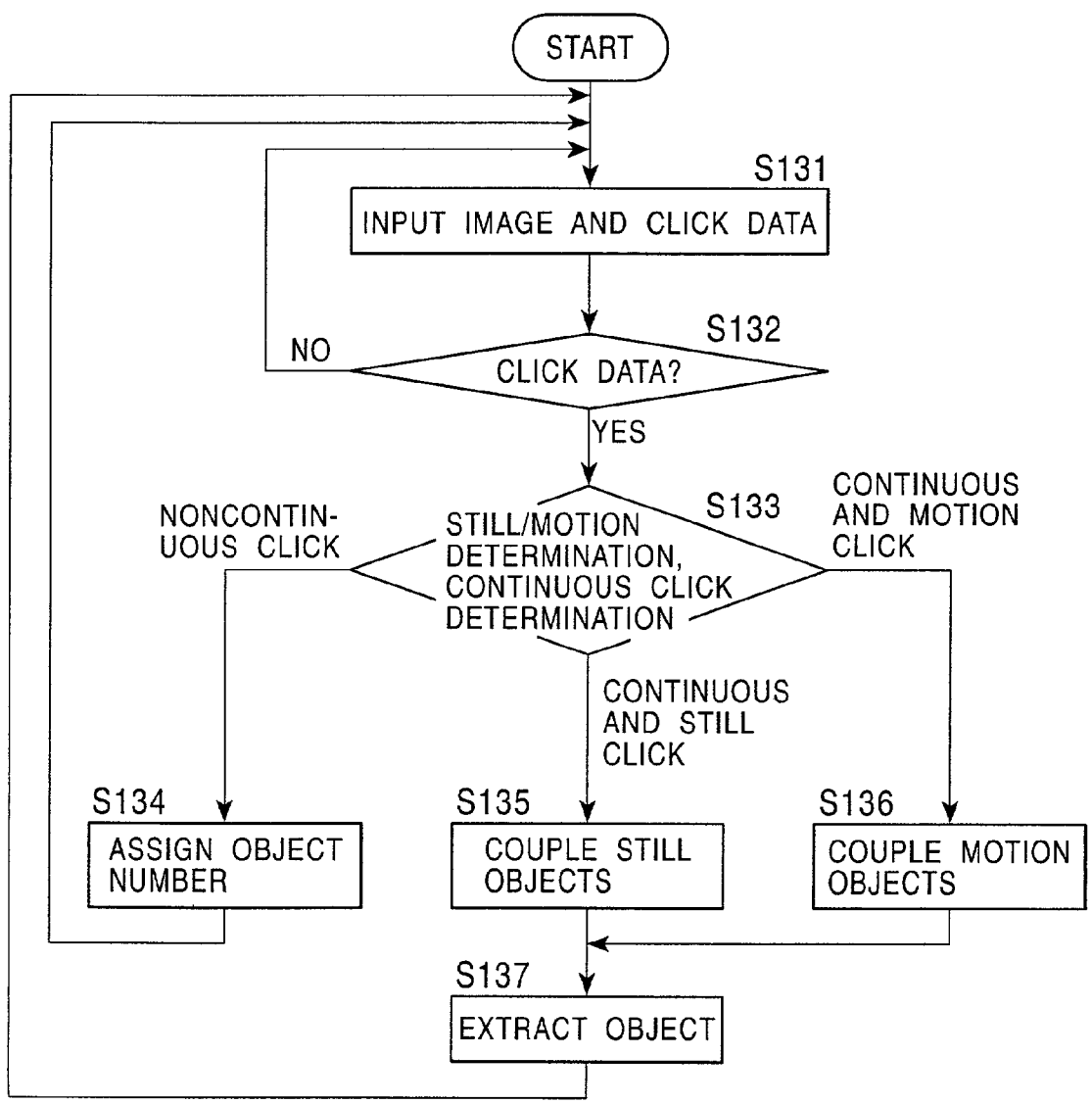
FIG. 28 is a flowchart illustrating a process for extracting a motion object image and a still object image.
Figure 29:
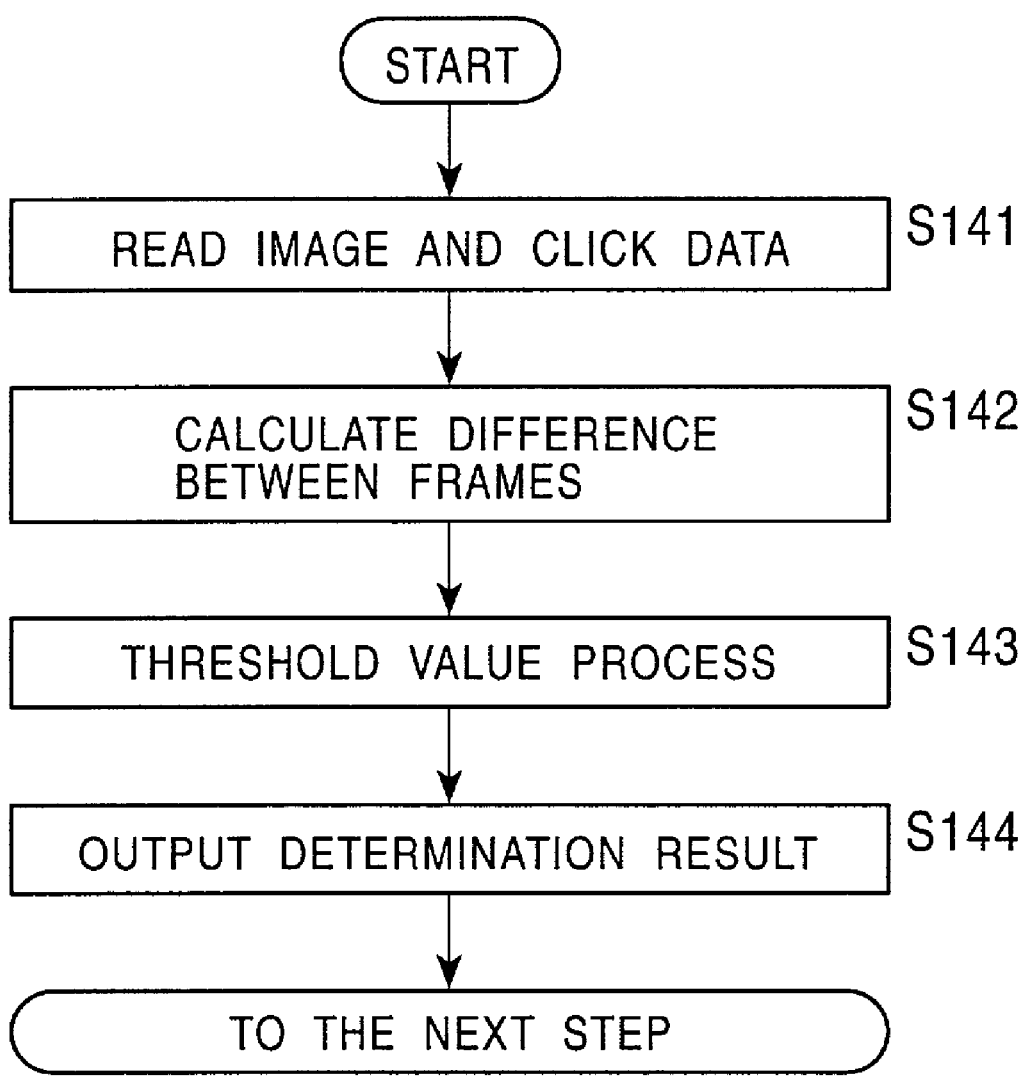
FIG. 29 is a flowchart illustrating a still/motion determination process.

When it is determined in step S162 that the subject click data is data such that an object image differing from that in which the previous click is contained was clicked on, and when the process proceeds to the process of step S164, the still object combining processing section 211 assigns a new object number to the subject click data, after which the process proceeds to the process of step S137 of FIG. 28.

Also, when it is determined in step S162 that the subject click data is data such that the same object image as that in which the previous click is contained was clicked on, the still object combining processing section 211, in the process of step S163, performs a still object combining process for assigning the same object number as that of the previous click data on the subject click data.

A description will now be given by using a specific example. As shown in, for example, part (C) of FIG. 32, in a case where the object number which is assigned to the previous click data CL1 indicated by the solid lined x mark in the figure is set to, for example, "0", when it is determined that the subject click data CL2 (the click data before the object number is assigned) indicated by the dotted lined x mark in part (C) of FIG. 32 indicates a continuous click and a still click, the previous click is a still click, and the click position indicated by the subject click data is contained in the image area formed by the object number which is assigned to the previous click data or is close to that area, the still object combining processing section 211 assigns the same object number as that of the previous click data ("0" in this example) to the subject click data CL2 indicated by the solid lined x mark in part (D) of FIG. 32.

After the same object number as that of the previous click data is assigned to the subject click data in step S163 in this manner, the process proceeds to the process of step S137 of FIG. 28.

Also, when it is determined in step S133 of FIG. 28 that the subject click data indicates a continuous click and a motion click, the previous click is a motion click, and the features of the image in the vicinity of the click position indicated by the subject click data resemble the features of the image area (16×16 pixels) formed by the object number which is assigned to the previous click, the motion object combining processing section 210 determines that the subject click data is such that the same object image as that in which the previous click is contained was clicked on, and performs, in step S136, a motion object combining process for assigning the same object number as that of the previous click data to the subject click data.

Figure 34:
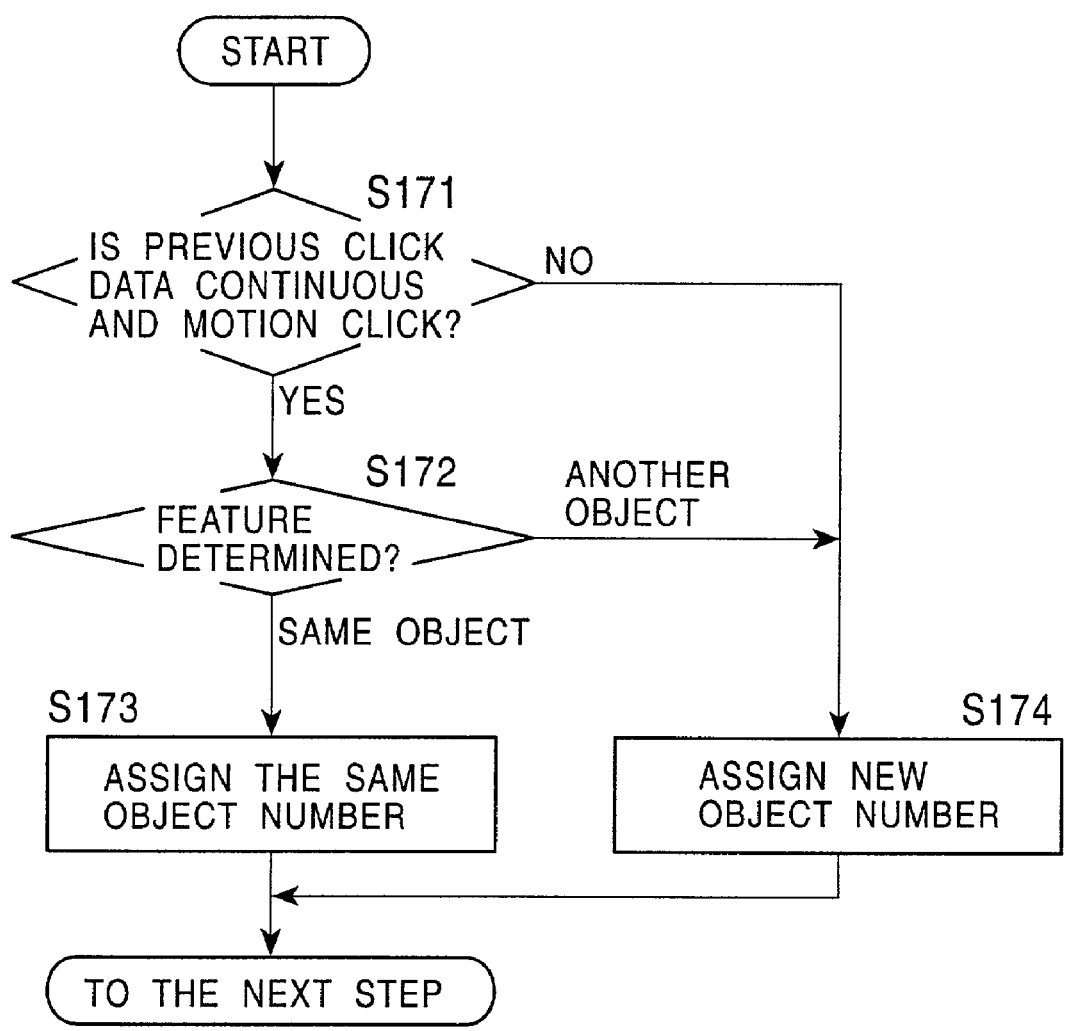
FIG. 34 is a flowchart illustrating a motion object combining process.

More specifically, when it is determined in step S133 that the subject click data is a continuous click and a motion click, the motion object combining processing section 210, as shown in FIG. 34, initially, in step S171, determines whether or not the previous click data indicates a continuous click and a motion click. When it is determined in step S171 that the previous click data indicates a continuous click and a motion click, the process proceeds to the process of step S172. When, on the other hand, it is determined that the previous click data does not indicate a continuous click and a motion click, the process proceeds to the process of step S174.

When it is determined in step S171 that the previous click data does not indicate a continuous click and a motion click and when the process proceeds to the process of step S174, the motion object combining processing section 210 assigns a new object number to the subject click data in a manner similar to that described in parts (A) and (B) of FIG. 32. After the process of step S174, the process proceeds to the process of step S137 of FIG. 28.

Also, when it is determined in step S171 that the previous click data indicates a continuous click and a motion click and when the process proceeds to the process of step S172, the motion object combining processing section 210 determines the features of the image area (16×16 pixels) in the vicinity of the click position indicated by the subject click data and the features of the image area formed by the object number which is assigned to the previous click. When, based on these features, the features of the image area in the vicinity of the click position indicated by the subject click data are similar to the features of the image area formed by the object number which is assigned to the previous click, it is determined that the subject click data indicates that the object image which is the same as that in which the previous click is contained was clicked on. When, on the other hand, the features of the image area in the vicinity of the click position indicated by the subject click data are not similar to the features of the image area formed by the object number which is assigned to the previous click, the motion object combining processing section 210 determines that the subject click data is data indicating that an object image differing from that of the previous click was clicked on.

The features of the image area herein are, for example, a histogram of colors (the average color, the representative color, etc.) and luminance, patterns, etc., in a local area (16×16 pixels) in the vicinity of the click position. Also, assigning the same object number to a plurality of motion clicks in the manner described above can be paraphrased to say that the tracking of an object is performed among these pieces of click data.

When it is determined in step S172 that the subject click data is data indicating that the same object image as that in which the previous click is contained was clicked on, the process proceeds to the process of step S173. When, on the other hand, it is determined that the subject click data is data indicating that an object image differing from that by the previous click was clicked on, the process proceeds to the process of step S174.

When it is determined in step S172 that the subject click data is data indicating that an object image differing from that by the previous click was clicked on and when the process proceeds to the process of step S174, the motion object combining processing section 210 assigns a new object number to the subject click data in a manner similar to that described above, and then, the process proceeds to the process of step S137 of FIG. 28.

Also, when it is determined in step S172 that the subject click data is data indicating that the same object image as that in which each previous click is contained was clicked on and when the process proceeds to the process of step S173, the motion object combining processing section 210 assigns the same object number as that of the previous click data to the subject click data.

A description will now be given by using a specific example. As shown in, for example, part (E) of FIG. 32, in a case where the object number which is assigned to the previous click data CL1 indicated by the solid lined x mark in the figure is set to, for example, "0", when it is determined that the subject click data CL2 (the click data before the object number is assigned) indicated by the dotted lined x mark in part (E) of FIG. 32 indicates a continuous click and a motion click, the previous click is a motion click, and the features of the image in the vicinity of the click position indicated by the subject click data are similar to the features of the object image formed by the object number which is assigned to the previous click, the motion object combining processing section 210 assigns the same object number ("0" in this example) as that of the previous click data, to the subject click data CL2 indicated by the solid lined x mark in part (F) of FIG. 32.

After the same object number as that of the previous click data is assigned to the subject click data in step S173, the process proceeds to the process of step S137 of FIG. 28.

Next, when the process proceeds from step S135 of FIG. 28 to the process of step S137, based on each piece of click data corresponding to several previous frames, to which the object number is assigned, stored in the object number memory 212 and image data for several previous frames stored in the image memory 201, the object image extraction section 213 extracts, from the image data of a frame to be transmitted to the subject portable terminal 1 of the click data (hereinafter referred to as a "subject frame" where appropriate), an object image which is still (a still object image), an object image which is in motion (a motion object image), and a background image other than those images. That is, since it is considered that a still object image exists in an image portion where the density of the click data which is determined to indicate a still click is high within the image of the subject frame to be transmitted to the subject portable terminal 1, the object image extraction section 213 determines the density of the click data (click density) which is determined to indicate still clicks on the basis of the click data for a plurality of previous frames to which the object number is assigned, and determines the dominant object number within the image portion where the click density is high. Then, the object image extraction section 213 creates the shape of the object on the basis of the distribution of the click data to which the dominant object number is assigned and extracts, from the image data of the subject frame, the image within the created shape of the object as a still object image.

Also, when the process proceeds from step S136 to the process of step S137, the object image extraction section 213 performs inter-frame pattern matching between images in the vicinity of the click position, to which the same object number is assigned, among pieces of click data which are determined to indicate motion clicks, and performs motion compensation, after which the object image extraction section 213 determines the dominant object number having a high click density in the image area which has been assumed to be similar in the pattern matching. Furthermore, the object image extraction section 213 creates the shape of the object on the basis of the distribution of the click data to which the dominant object number is assigned, and extracts, from the image data of the subject frame, the image within the created shape of the object as a motion object image.

Also, in step S137, the object image extraction section 213 assumes the above-described image portion where the click density of the click data which is determined to indicate still clicks or motion clicks is low to be a background image of the subject frame. In other words, the object image extraction section 213 assumes, as a background image, the remaining image portion in which the still object image and the motion object image are extracted from the subject frame.

The process of step S137 will now be described in detail. As shown in the flowchart in FIG. 35, initially, in step S181, the object image extraction section 213 captures each piece of click data and image data, corresponding to a plurality of several frames to which the object number is assigned, and then in step S182, the object image extraction section 213 classifies each piece of click data for each still click and for each motion click. Here, when the process proceeds from step S135 of FIG. 28 to the process of step S137, it follows that the process proceeds from step S182 to the process of step S184 and subsequent steps. When the process proceeds from step S136 of FIG. 28 to the process of step S137, it follows that the process proceeds from step S182 to the process of step S183 and subsequent steps.

When the process proceeds from step S135 of FIG. 28 to the process of step S137, and when the process proceeds from step S182 to the process of step S184 and subsequent steps in FIG. 35, first, the object image extraction section 213 determines, for the image for a plurality of previous frames, the density of the click data (hereinafter referred to as a "click density") which is determined to indicate still clicks within each piece of click data to which the object number is assigned to, for example, each block of 16×16 pixels. That is, a plurality of pieces of click data which is determined to indicate still clicks for a plurality of frames is loaded to a memory having the same size of the above-described frames possessed by the object image extraction section 213. Then, the object image extraction section 213 computes the click density for each block of 16×16 pixels on the basis of the click data stored in the memory.

Figure 36A:
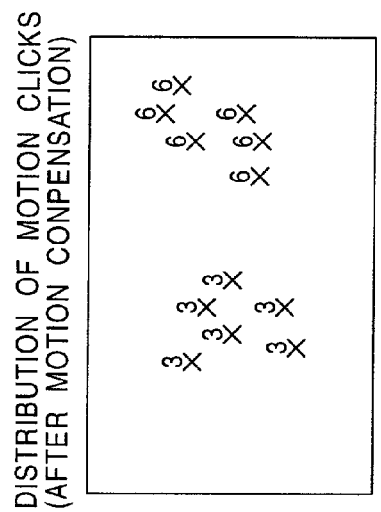
FIGS. 36A, 36B, 36C, 36D, and 36E illustrate the object combining extraction process.

Next, in step S185, as shown in FIG. 36A, the object image extraction section 213 determines whether or not the click density of the still clicks indicated by the x marks in the figure is greater than or equal to a predetermined value with regard to blocks bk each of 16×16 pixels, such as those indicated by the dotted lines in the figure, within the image.

Here, it is considered that a still object image exists in the image portion where the density of click data which is determined to indicate still clicks is high within the image to be transmitted to the subject portable terminal 1. Therefore, the object image extraction section 213 performs the process of step S186 with regard to a block in which the click density of still clicks is greater than or equal to a predetermined value, and, on the other hand, performs the process of step S190 with regard to a block in which the click density of still clicks is less than the predetermined value.

Figure 36D:
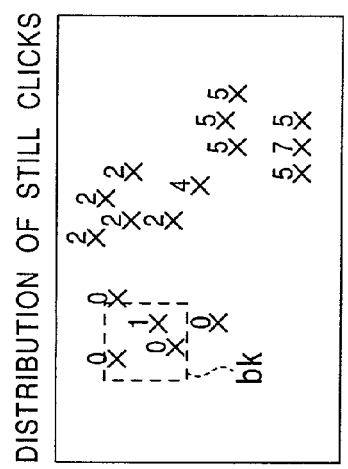
Figure 36B:
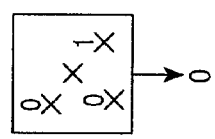
Figure 36C:
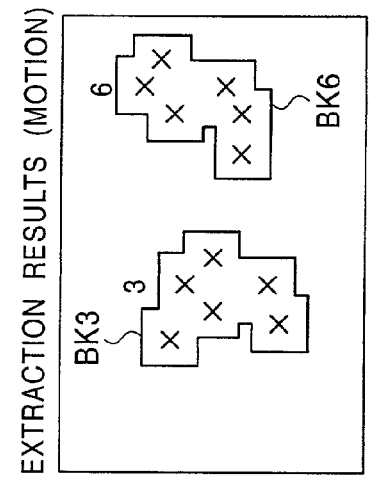

When the process proceeds to the process of step S186, as shown in FIG. 36B, with regard to a block in which the click density of still clicks is greater than or equal to the predetermined value, the object image extraction section 213 determines the dominant object number having the highest frequency of occurrence within the object numbers which are assigned to each piece of click data within the block, and further as shown in FIG. 36D, collects the blocks in which the dominant object numbers are the same (BK0, BK2, BK4, and BK5) in order to create object shapes. Then, based on the created object shapes, the object image extraction section 213 extracts a still object image from the image data of the subject frame. After the process of step S186, the process returns to the process of step S131.

Figure 35:
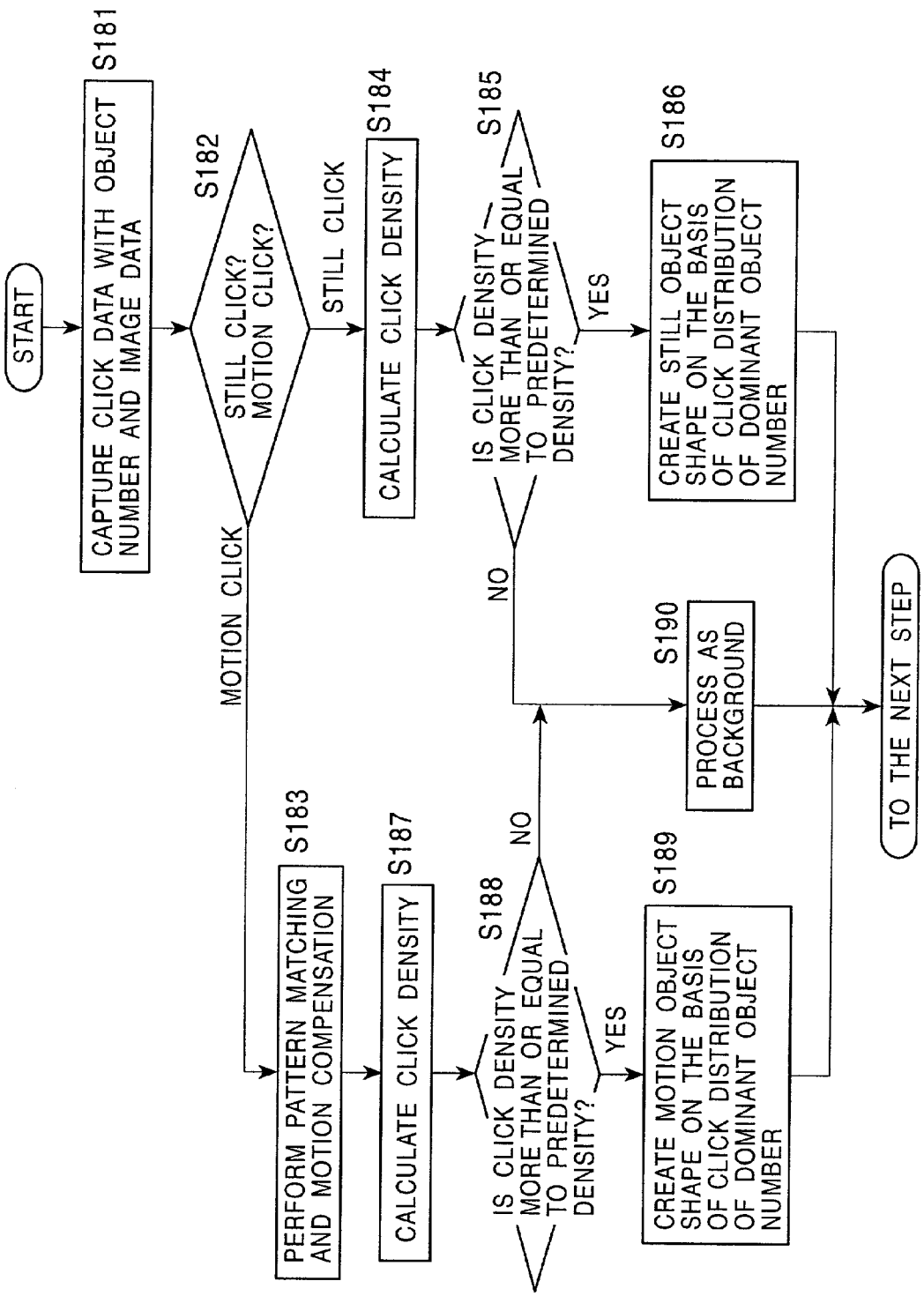
FIG. 35 is a flowchart illustrating an object combining extraction process.

When, on the other hand, the process proceeds from step S136 of FIG. 28 to the process of step S137, and when the process proceeds from step S182 to the process of step S183 and subsequent steps in FIG. 35, the object image extraction section 213, as shown in FIG. 36D, performs inter-frame pattern matching between images in the vicinity of the click position, to which the same object number is assigned, within the pieces of click data which are each determined to indicate a motion click, indicated by the x marks in the figure, and further performs motion compensation.

Next, in step S187, the object image extraction section 213 determines the click density of motion clicks within the image area which is assumed to resemble by pattern matching. That is, the object image extraction section 213 performs motion compensation on a plurality of pieces of click data which are determined to indicate motion clicks for a plurality of frames by inter-frame pattern matching between images in the vicinity of the click position, to which the same object number is assigned, and loads the data into a memory having the same size of the frames possessed by the object image extraction section 213. Then, the object image extraction section 213 computes the click density for each block of 16×16 pixels on the basis of the click data stored in the memory.

Thereafter, in step S188, as shown in FIG. 36D, the object image extraction section 213 determines whether or not the click density of motion clicks indicated by the x marks in the figure within the image is greater than or equal to a predetermined value.

Here, after the motion compensation is performed, it is considered that a motion object image exists in the image portion in which the click data which is determined to indicate a motion click is high. Therefore, with regard to an image area in which the click density of motion clicks is greater than or equal to the predetermined value in the image after motion compensation, the object image extraction section 213 performs the process of step S189, and on the other hand, with regard to an image area in which the click density of motion clicks is less than the predetermined value, performs the process of step S190.

Figure 36E:
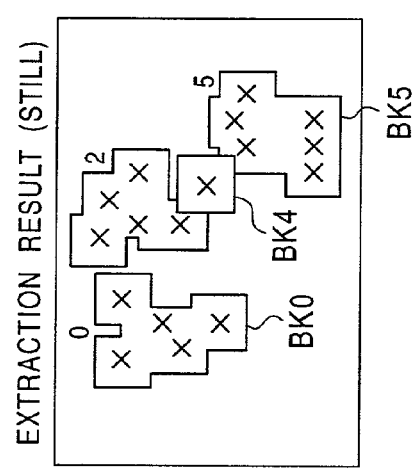

When the process proceeds to the process of step S189, with regard to an image area in which the click density of motion clicks is greater than or equal to the predetermined value, the object image extraction section 213 determines the dominant object number in which the frequency of occurrence is highest among the object numbers which are assigned to each piece of click data, and further as shown in FIG. 36E, collects the blocks in which the dominant object number is the same (BK3 and BK6) in order to create object shapes. Then, based on the created object shapes, the object image extraction section 213 extracts a motion object image from the image data of the subject frame. After the process of step S189, the process returns to the process of step S138 of FIG. 28.

When the click density is determined to be less than the predetermined value in both steps S185 and S188, the area of the subject frame corresponding to the image portion in which the click density of still clicks and motion clicks is low is used as a background image area in the process of step S190. In other words, the object image extraction section 213 assumes, as a background image, the remaining image portion in which the still object image and the motion object image are extracted from the subject frame. After the process of step S190, the process proceeds to the process of step S138 of FIG. 28.

After the still object image, the motion object image, and the background image are extracted by the object image extraction section 213 in this manner, the process returns to the process of step S131 of FIG. 28, whereby the same processes are repeated by assuming the next frame as a subject frame.

The processes shown in the flowchart in FIG. 28 are performed by assuming each user as a subject user.

As in the processing flow that has been described above, the object extraction section 134, based on the click data by the user of the portable terminal 1, extracts a still object image, a motion object image, and a background image to be transmitted. However, since it is difficult for the object extraction section 135 to extract objects unless there is a sufficient number of pieces of click data, the image data is supplied as it is to the transmission processing section 136 at a later stage when there is a sufficient number of pieces of click data. Therefore, in this case, the image data is provided in the state shown in FIG. 10.

The present invention can be applied to provide pieces of music and other audio data, and programs, in addition to electronic book data and image data. For the audio data, based on user input information, the sound quality of audio data to be provided can be controlled by varying, for example, the sampling frequency, the number of quantization bits, the frequency bandwidth thereof, etc. Also, for the programs, based on the user input information, for example, programs to be provided may be formed into a commonly called demonstration version or product version.

Furthermore, the data provided from the content server 7 to the portable terminal 1 can be stored in the memory card 23 in the portable terminal 1. That is, the data provided by the content server 7 can be downloaded in the portable terminal 1 so that playback thereof is performed later. In the portable terminal 1, data which is distributed by a push type from the content server 7 can also be downloaded, and furthermore, a request for a download can also be made from the portable terminal 1 to the content server 7, so that data transmitted from the content server 7 is downloaded.

In addition, as described above, the provision of contents which are processed in accordance with user input information from a plurality of users can be performed for only chargeable users.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus for providing content data to a terminal device, said information processing apparatus comprising:

content data storage means for storing a plurality of pieces of content data;

communication means for transmitting the content data stored in said content data storage means to a plurality of terminal devices and for receiving input information of each user for the transmitted content data;

input information storage means for storing said input information received by said communication means for each user;

analysis means for analyzing a preference of a target user on the basis of the input information of a similar user, which resembles the input information of said target user stored in said input information storage means; and processing means for processing content data to be transmitted to said terminal device according to the analysis results by said analysis means, wherein said content data storage means stores a plurality of pieces of image data, and said communication means receives positional information within said image data indicated by each of said users, wherein said analysis means comprises extraction means for extracting said positional information of said similar user, which indicates that an image area in the vicinity of said positional information of said target user, stored in said input information storage means, is indicated, wherein said extraction means extracts said positional information of said similar user, shows an image area resembling features of an image in the vicinity of said positional information of the target user, stored in said input information storage means, is indicated, wherein said processing means improves the image quality of a part of the image data specified on the basis of said positional information of said similar user, extracted by said extraction means, more than the image quality of the other parts of the image data, wherein said processing means comprises:

classification means for classifying image data specified on the basis of said positional information of said similar user, extracted by said extraction means, in predetermined block units;

coefficient storage means for storing a coefficient set for each class in advance, for computing pixel data of a part of a high-quality image by a first-order linear combination of a plurality of pieces of image data within the block of a low-quality image classified in said predetermined block units; and adaptive processing means for outputting image data having higher quality that said image data computed by the first-order linear combination between the image data within the block of said image data which is a target and a coefficient set within said coefficient storage means, corresponding to a class classified by said classification means.

2. An information processing apparatus comprising:

communication means for transmitting content data to a user terminal and for receiving a user ID transmitted from the user terminal and identification information which specifies a part of the content data;

an identification information database for storing said user ID and said identification information in such a manner as to correspond to each other; registration means for registering said user ID and said identification information received by said communication means in said identification information database;

an integrated database for integrating and storing said identification information of a plurality of user IDs, registered in said identification information database;

extraction means for extracting an ID of a similar user having a preference resembling that of a target user by comparing said identification information corresponding to a target user ID stored in said identification information database with said identification information corresponding to an ID of another user, stored in said identification information database, and for storing, in said integrated database, identification information which is unique to said identification information corresponding to said target user ID within said identification information corresponding to said extracted similar user ID, together with said identification information corresponding to said target user ID, to correspond to the target user ID;

preference information creation means for creating preference information corresponding to said target user ID according to said identification information of said target user ID stored in said integrated database;

a content database for storing a plurality of pieces of content data; and content data processing means for reading said content data stored in said content database at predetermined intervals from said content database, for processing the content data corresponding to said identification information contained in said preference information, and for outputting the processed content data to said communication means.

3. An information processing apparatus according to claim 2, wherein said communication means receives an electronic book identification code which specifies one piece of electronic book data within electronic book data as said content data, and said identification information database stores said user ID and said electronic book identification code in such a manner as to correspond to each other.

4. An information processing apparatus according to claim 3, wherein said extraction means detects a match between said electronic book identification code corresponding to the target user ID stored in said identification information database and said electronic book identification code corresponding to another user ID stored in said identification information database, extracts a user ID in which a predetermined number or more of electronic book identification codes match, as a similar user ID having a preference resembling of said target user, stores, in said integrated database, an identification code which is unique to said electronic book identification code corresponding to said target user ID within the electronic book identification codes of said electronic book corresponding to said extracted similar user ID, together with said electronic book identification code corresponding to said target user ID, to correspond to the target user ID, and stores, in said integrated database, each number of duplicates with said electronic book identification code corresponding to said target user ID, and said preference information creation means creates preference information corresponding to said target user ID on the basis of an electronic book identification code having a large number of duplicates within said electronic book identification codes of said target user IDs stored in said integrated database.

5. An information processing apparatus according to claim 2, wherein said communication means transmits moving image data composed of a plurality of frames to said user terminal and receives a user ID and positional information which specifies a position in time and space within the moving image data composed of the plurality of frames, and said identification information database stores said user ID and said positional information in such a manner as to correspond to each other.

6. An information processing apparatus according to claim 5, wherein said extraction means detects features of image data within a block in which said positional information of the target user ID registered in said identification information database is nearly the center, extracts, as a similar user ID, another user ID in which the features resembling one or more of those features is detected, and stores, in said integrated database, the features differing from the features detected on the basis of said target user ID among the features of the image data within the block in which the positional information corresponding to the similar user ID is nearly the center, together with the features corresponding to said target user ID, in such a manner as to correspond to said target user ID, and said preference information creation means retrieves said features corresponding to said target user ID from said integrated database and creates said preference information.

7. An information processing apparatus according to claim 5, wherein said extraction means detects said positional information of the target user ID registered in said identification information database, extracts, as a similar user ID, a user ID to which positional information indicating a frame in the vicinity of said detected positional information within the positional information of another user ID registered in said identification information database corresponds, and stores, in said integrated database, positional information differing from the positional information detected from said target user ID within the positional information corresponding to the similar user ID, together with the positional information corresponding to said target user ID in such a manner as to correspond to said target user ID, and said preference information creation means retrieves said positional information corresponding to said target user ID from said integrated database and creates said preference information.

8. An information processing apparatus comprising:

communication means for transmitting a plurality of pieces of electronic book data to a user terminal and for receiving a user ID transmitted from the user terminal and an electronic book identification code which specifies one piece of electronic book data within the plurality of pieces of electronic book data;

a preference database for storing said user ID and said electronic book identification code to correspond to each other;

registration means for registering said user ID and said electronic book identification code, received by said communication means, to said preference database;

an integrated preference database for integrating and storing said electronic book identification codes of a plurality of user IDs, registered in said preference database;

extraction means for detecting a match between said electronic book identification code corresponding to the target user ID stored in said preference database and said electronic book identification code corresponding to another user ID stored in said preference database, for extracting a user ID in which a predetermined number or more of the electronic book identification codes matches as a similar user ID having a preference similar to said target user, for storing, in said integrated preference database, an identification code which is unique to said electronic book identification code corresponding to said target user ID among the electronic book identification codes of said electronic book corresponding to the extracted similar user ID, together with said electronic book identification code corresponding to said target user ID, in such a manner as to correspond to the target user ID, and for storing the number of duplicates with said electronic book identification code corresponding to said similar user ID in said integrated preference database for each electronic book identification code corresponding to said target user ID;

preference information creation means for creating preference information corresponding to said target user ID on the basis of the electronic book identification codes with a large number of duplicates among said electronic book identification codes of said target user ID stored in said integrated preference database;

an electronic book database for storing said plurality of pieces of electronic book data; and electronic book data processing means for reading said electronic book data stored in said electronic book database at predetermined intervals from said electronic book database, for processing the electronic book data corresponding to said electronic book identification code contained in said preference information, and for outputting the processed electronic book data to said communication means.

9. An information processing apparatus comprising:

communication means for transmitting moving image data composed of a plurality of frames to a user terminal and for receiving a user ID and positional information which specifies a position in time and space within the moving image data composed of the plurality of frames, transmitted from the user terminal;

a click position database for storing said user ID and said positional information to correspond to each other;

registration means for registering said user ID and said positional information, received by said communication means, in said click position database;

an integrated feature database for integrating and storing the features of image data within a block in which said positional information of a plurality of user IDs registered in said click position database is nearly the center;

extraction means for detecting the features of image data within a block in which said positional information of a target user ID registered in said click position database is nearly the center, for extracting another user ID in which features resembling one or more of those features are detected as a similar user ID, and for storing, in said integrated feature database, features differing from the features detected on the basis of said target user ID among the features of the image data within the block in which the positional information corresponding to the similar user ID is nearly the center, together with the features corresponding to said target user ID, to correspond to said target user ID;

retrieval means for retrieving said features corresponding to said target user ID from said integrated feature database;

a moving image database for storing moving image data composed of said plurality of frames;

feature detection means for reading said moving image data at predetermined intervals from said moving image database and for detecting the features within said moving image database at said block units;

resembling feature detection means for detecting a block in which features resembling said features retrieved by said retrieval means are detected by said feature detection means; and conversion means for converting the image data within the block, detected by said resembling feature detection means, into a high quality.

10. An information processing apparatus comprising:

communication means for transmitting moving image data composed of a plurality of frames to a user terminal and for receiving a user ID and positional information which specifies a position in time and space within the moving image data composed of the plurality of frames, transmitted from the user terminal;

a click position database for storing said user ID and said positional information to correspond to each other;

registration means for registering said user ID and said positional information, received by said communication means, in said click position database;

an integrated click position database for integrating and storing said identification information of a plurality of user IDs, registered in said click position database;

extraction means for detecting said positional information of the target user ID registered in said click position database, for extracting, as a similar user ID, a user ID, to which positional information indicating a frame in the vicinity of said detected positional information corresponds, within the positional information of another user ID registered in said click position database, and for storing, in said integrated click position database, positional information differing from the positional information detected on the basis of said target user ID within the positional information corresponding to the similar user ID, together with the positional information corresponding to said target user ID, to correspond to said target user ID;

retrieval means for retrieving said positional information corresponding to said target user ID from said integrated click position database;

a moving image database for storing moving image data composed of said plurality of frames;

object image data extraction means for reading said moving image data at predetermined intervals from said moving image database, for extracting object image data from said moving image database on the basis of said positional information retrieved by said retrieval means, and for outputting the object image data to said communication means;

background image data extraction means for extracting background image data by subtracting the object image data extracted by said object image data extraction means from said moving image data and for outputting the background image data to said communication means; and motion vector detection means for detecting an object motion vector and a background motion vector on the basis of said object image data and said background image data and for outputting the object motion vector and said background motion vector to said communication means.

11. An information processing apparatus according to claim 10, wherein said object image data extraction means comprises:

an image memory for temporarily storing said moving image data composed of a plurality of frames, supplied from said moving image database;

a positional information memory for temporarily storing a plurality of pieces of positional information corresponding to said target user ID retrieved by said retrieval means;

a still/motion determination section for reading positional information corresponding to said target user ID from said positional information memory, for determining that, when the difference value between image data within a block of a target frame in which the read positional information within said image memory is nearly the center and image data of a block at the same position as said block previous to the target frame is greater than a predetermined threshold value, said positional information is determined to be a motion, and when said difference value is less than or equal to the predetermined threshold value, said positional information is determined to be a still, and for outputting the still/motion determination result; and a continuity determination section for reading positional information corresponding to said target frame of said target user ID from said positional information memory, for reading positional information corresponding to said frame previous to the target frame, for detecting the difference value, with respect to time, of each piece of positional information, for determining that the positional information is noncontinuous positional information when the difference value with respect to time is greater than a predetermined threshold value and the positional information is continuous positional information when the difference value with respect to time is less than or equal to the predetermined threshold value, and for outputting the determination result.

12. An information processing apparatus according to claim 11, further comprising:

when said still/motion determination section outputs the determination result of said still and when said continuity determination section outputs the determination result of said continuous positional information, a processing determination section for detecting a spatial distance between target frame positional information indicating a click position for said target frame of said target user ID and previous frame positional information indicating a click position for said previous frame;

an object number assignment section for assigning, to said target frame positional information, a new object number differing from the object number corresponding to said previous frame positional information by assuming the objects indicated by said target frame positional information and said previous frame positional information differ from each other when it is determined by said processing determination section that said spatial distance is greater than the predetermined threshold value; and a still object combining processing section for assigning, to said target frame positional information, the same object number as the object number corresponding to said previous positional information by assuming the when it is determined by said processing determination section that said spatial distance is less than or equal to the predetermined threshold value, the objects indicated by said target frame positional information and said previous frame positional information are the same.

13. An information processing apparatus according to claim 12, wherein, when said still/motion determination section outputs the determination result of said still and said continuity determination section outputs the determination result of said continuous positional information, said processing determination section compares the features of image data within a block in which target frame positional information indicating a click position for said target frame of said target user ID is nearly the center with the features of an object which is assigned to said previous positional information indicating a click position for said previous frame, said object number assignment section assigns, to said target frame positional information, a new object number differing from the object number corresponding to said previous frame positional information by assuming that, when it is determined by said processing determination section, said features differ, the objects indicated by said target frame positional information and said previous frame positional information differ from each other, and there is further provided a motion object combining processing section for assigning, to said target frame positional information, the same object number as the object number corresponding to said previous positional information by assuming, when it is determined by said processing determination section that said features resemble, the objects indicated by said target frame positional information and said previous frame positional information are the same.

14. An information processing apparatus according to claim 13, further comprising an object image extraction section for receiving positional information corresponding to a plurality of frames, output by said object number assignment section, said still object combining processing section, and said motion object combining processing section, and an object number corresponding to each piece of positional information, for loading a plurality of pieces of positional information which is determined to be still, of said plurality of frames into a memory having the same size as that of said frame and for computing the density of positional information for each predetermined block within said memory when it is determined by said still/motion determination section, said target frame positional information indicating a click position for said target frame of said target user ID is a still, for creating a still object shape on the basis of the distribution of positional information to which is assigned the object number with the maximum number within the object numbers which are assigned to a plurality of pieces of positional information within said block in which said density is determined to be greater than or equal to the predetermined threshold value, and for outputting a still object image.

15. An information processing apparatus according to claim 14, wherein, when it is determined by said still/motion determination section that said target frame positional information indicating a click position for said target frame of said target user ID is a motion, said object image extraction section performs motion compensation on a plurality of pieces of positional information, which is determined to be a motion, of said plurality of frames by inter-frame pattern matching between images in the vicinity of a plurality of pieces of positional information to which is assigned the same object number as the object number which is assigned to said target frame positional information, loads the information to a memory having the same size as that of said frame, computes the density of positional information for each predetermined block within said memory, creates a motion object shape based on the distribution of positional information to which is assigned an object number with the maximum number within the object numbers which are assigned to a plurality of pieces of positional information within said block in which said density is determined to be greater than or equal to the predetermined value, and outputs a motion object image.

16. An information processing apparatus according to claim 15, wherein said object image extraction section outputs, as a background image, an image corresponding to said block in which said density is determined to be less than the predetermined value.

17. An information processing method comprising the steps of:

transmitting content data to a user terminal;
receiving a user ID transmitted from said user terminal, and identification information which specifies a part of the content data;
registering said received user ID and said received identification information to correspond to each other;
integrating and storing said identification information of said plurality of registered user IDs;
extracting a similar user ID having a preference resembling of said target user by comparing said identification information corresponding to said stored target user ID with said identification information corresponding to said stored another user ID;
storing, together with said identification information corresponding to said target user ID, identification information which is unique to said identification information corresponding to said target user ID within said identification information corresponding to said extracted similar user ID;
creating preference information corresponding to said target user ID according to said identification information of said stored target user ID;
reading said content data stored in a content database at predetermined intervals from said content database for storing said plurality of pieces of content data; processing content data corresponding to said identification information contained in said preference information; and
outputting the processed content data.

18. A recording medium having stored therein a program for executing an information processing method, said program comprising the steps of:

transmitting content data to a user terminal;
receiving a user ID transmitted from said user terminal, and identification information which specifies a pan of the content data;
registering said received user ID and said received identification information to correspond to each other;
integrating and storing said identification information of said plurality of registered user IDs;
extracting a similar user ID having a preference resembling of said target user by comparing said identification information corresponding to said stored target user ID with said identification information corresponding to said stored another user ID;
storing, together with said identification information corresponding to said target user ID, identification information which is unique to said identification information corresponding to said target user ID within said identification information corresponding to said extracted similar user ID;
creating preference information corresponding to said target user ID according to said identification information of said stored target user ID;
reading said content data stored in a content database at predetermined intervals from said content database for storing said plurality of pieces of content data;
processing content data corresponding to said identification information contained in said preference information; and
outputting the processed content data.

* * * * *